(12) United States Patent
Chen

(10) Patent No.: US 11,741,808 B2
(45) Date of Patent: *Aug. 29, 2023

(54) LINKABLE LED LIGHTING SYSTEM DESIGNED WITH AN APP BASED FREE SETTING METHOD FOR ADJUSTING OPERATING PARAMETERS OF AT LEAST ONE LED SECURITY LIGHT

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,782

(22) Filed: Apr. 11, 2022

(65) Prior Publication Data

US 2022/0237998 A1    Jul. 28, 2022

Related U.S. Application Data

(60) Continuation of application No. 16/985,557, filed on Aug. 5, 2020, now Pat. No. 11,335,175, which is a
(Continued)

(51) Int. Cl.
*H05B 47/10*    (2020.01)
*G08B 15/00*    (2006.01)
(Continued)

(52) U.S. Cl.
CPC ............... *G08B 15/00* (2013.01); *F21S 9/03* (2013.01); *F21V 17/02* (2013.01); *G08B 5/36* (2013.01); *G08B 13/1895* (2013.01); *G08B 15/002* (2013.01); *H02J 7/35* (2013.01); *H05B 39/042* (2013.01); *H05B 39/044* (2013.01); *H05B 45/10* (2020.01); *H05B 45/12* (2020.01); *H05B 45/14* (2020.01); *H05B 45/20* (2020.01); *H05B 45/37* (2020.01); *H05B 45/44* (2020.01); *H05B 45/46* (2020.01); *H05B 45/48* (2020.01);
(Continued)

(58) Field of Classification Search
CPC ........ H05B 45/37; H05B 45/44; H05B 45/46; H05B 47/16; H05B 47/105; H05B 47/115
See application file for complete search history.

(56) References Cited

U.S. PATENT DOCUMENTS 5,491,463 A    2/1996 Sargeant et al.
5,668,446 A    9/1997 Baker
(Continued)

*Primary Examiner* — Tung X Le
(74) *Attorney, Agent, or Firm* — Rosenberg, Klein & Lee

(57) ABSTRACT

A linkable LED lighting system designed with an on line free setting method for adjusting operating parameters of at least one LED security light is disclosed. The linkable LED lighting system comprises at least one LED security light working in conjunction with a mobile phone loaded with an APP (software application) for controlling and setting at least one lighting characteristic of the at least one LED security light including time length settings, light intensity settings, color temperature settings, detection range settings, or signal frequency range or signal format settings for screening, accepting, and processing said wireless instruction signal(s) characterized with the same signal frequency range or the same signal format.

101 Claims, 24 Drawing Sheets

Related U.S. Application Data continuation-in-part of application No. 16/668,599, filed on Oct. 30, 2019, now Pat. No. 10,770,916, which is a continuation of application No. 16/244,671, filed on Jan. 10, 2019, now Pat. No. 10,516,292, which is a continuation of application No. 15/896,403, filed on Feb. 14, 2018, now Pat. No. 10,225,902, which is a continuation of application No. 15/785,658, filed on Oct. 17, 2017, now Pat. No. 10,326,301, which is a continuation of application No. 15/375,777, filed on Dec. 12, 2016, now Pat. No. 9,826,590, which is a continuation of application No. 14/836,000, filed on Aug. 26, 2015, now Pat. No. 9,622,325, which is a division of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.

| | | |
|---|---|---|
| *H05B 45/14* | (2020.01) | |
| *H05B 45/20* | (2020.01) | |
| *H05B 45/44* | (2020.01) | |
| *H05B 45/46* | (2020.01) | |
| *H05B 45/48* | (2020.01) | |
| *H05B 47/11* | (2020.01) | |
| *H05B 47/16* | (2020.01) | |
| *H05B 47/115* | (2020.01) | |
| *H05B 47/17* | (2020.01) | |
| *H05B 45/12* | (2020.01) | |
| *H05B 45/37* | (2020.01) | |
| *H05B 45/10* | (2020.01) | |
| *H05B 47/105* | (2020.01) | |
| *H05B 39/04* | (2006.01) | |
| *F21S 9/03* | (2006.01) | |
| *F21V 17/02* | (2006.01) | |
| *G08B 5/36* | (2006.01) | |
| *G08B 13/189* | (2006.01) | |
| *H02J 7/35* | (2006.01) | |
| *F21Y 115/10* | (2016.01) | |
| *G08B 13/00* | (2006.01) | |

(52) U.S. Cl.
CPC ........... *H05B 47/10* (2020.01); *H05B 47/105* (2020.01); *H05B 47/11* (2020.01); *H05B 47/115* (2020.01); *H05B 47/16* (2020.01); *H05B 47/17* (2020.01); *F21Y 2115/10* (2016.08); *G08B 13/00* (2013.01); *G08B 13/189* (2013.01); *Y02B 20/40* (2013.01)

(56) References Cited

U.S. PATENT DOCUMENTS

| | | | |
|---|---|---|---|
| 6,473,608 B1 | 10/2002 | Lehr et al. | |
| 6,548,967 B1 | 4/2003 | Dowling et al. | |
| 6,559,757 B1 | 5/2003 | Deller et al. | |
| 7,482,760 B2 * | 1/2009 | Jungwirth | G09G 3/32 |
| | | | 315/192 |
| 7,565,225 B2 | 7/2009 | Dushane et al. | |
| 7,880,394 B2 | 2/2011 | Sibalich et al. | |
| 7,940,167 B2 | 5/2011 | Steiner et al. | |
| 7,948,189 B2 | 5/2011 | Ahmed | |
| 8,035,320 B2 | 10/2011 | Sibert | |
| 8,035,513 B2 | 10/2011 | Raper | |
| 8,199,010 B2 | 6/2012 | Sloan et al. | |
| 8,203,445 B2 | 6/2012 | Recker et al. | |
| 8,222,832 B2 * | 7/2012 | Zheng | H02M 3/33523 |
| | | | 315/297 |
| 8,325,040 B2 | 12/2012 | Nassimi | |
| 8,352,850 B1 | 1/2013 | Creed et al. | |
| 8,487,546 B2 * | 7/2013 | Melanson | H05B 45/14 |
| | | | 315/297 |
| 8,805,351 B2 | 8/2014 | Sigal et al. | |
| 9,073,798 B1 | 7/2015 | Brooke | |
| 9,083,461 B2 | 7/2015 | Chin et al. | |
| 9,134,004 B2 | 9/2015 | Wacholder et al. | |
| 9,294,719 B2 | 3/2016 | Uhma et al. | |
| 9,311,167 B2 | 4/2016 | Kim et al. | |
| 9,323,421 B1 | 4/2016 | Cronin | |
| 9,453,615 B2 | 9/2016 | Chen et al. | |
| 9,706,617 B2 | 7/2017 | Carrigan et al. | |
| 9,832,844 B2 | 11/2017 | Mans et al. | |
| 10,154,564 B2 | 12/2018 | Chen | |
| 10,182,489 B1 | 1/2019 | Israni | |
| 10,271,404 B1 | 4/2019 | Forneck et al. | |
| 10,667,367 B2 | 5/2020 | Chen | |
| 11,076,467 B1 | 7/2021 | Tylicki et al. | |
| 2004/0003073 A1 | 1/2004 | Krzyzanowski et al. | |
| 2006/0123053 A1 | 6/2006 | Scannell, Jr. | |
| 2006/0146553 A1 * | 7/2006 | Zeng | B60Q 3/47 |
| | | | 362/545 |
| 2010/0141153 A1 | 6/2010 | Recker et al. | |
| 2010/0327766 A1 | 12/2010 | Recker et al. | |
| 2012/0049752 A1 * | 3/2012 | King | H05B 45/38 |
| | | | 315/210 |
| 2014/0159877 A1 | 6/2014 | Huang | |

* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS® E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG. 9

LINKABLE LED LIGHTING SYSTEM DESIGNED WITH AN APP BASED FREE SETTING METHOD FOR ADJUSTING OPERATING PARAMETERS OF AT LEAST ONE LED SECURITY LIGHT

CROSS-REFERENCE TO RELATED APPLICATION

This is a continuation application of prior application Ser. No. 16/985,557 filed on Aug. 5, 2020, which issued as U.S. patent Ser. No. 11/335,175 on May 17, 2022. Application Ser. No. 16/985,557 is a continuation in part application of prior application Ser. No. 16/668,599, filed Oct. 30, 2019, which issued as U.S. Pat. No. 10,770,916 on Sep. 8, 2020. Ser. No. 16/668,599 is a continuation of application Ser. No. 16/244,671, filed Jan. 10, 2019, which issued as U.S. Pat. No. 10,516,292 on Dec. 24, 2019. U.S. Pat. No. 10,516,292 is a continuation of application Ser. No. 15/896,403, filed Feb. 14, 2018, which issued as U.S. Pat. No. 10,225,902 on Mar. 5, 2019. U.S. Pat. No. 10,225,902 is a continuation of application Ser. No. 15/785,658, filed Oct. 17, 2017, which issued as U.S. Pat. No. 10,326,301 on Jun. 18, 2019. U.S. Pat. No. 10,326,301 is a continuation of application Ser. No. 15/375,777, filed Dec. 12, 2016, which issued as U.S. Pat. No. 9,826,590 on Nov. 21, 2017. U.S. Pat. No. 9,826,590 is a continuation of application Ser. No. 14/836,000, filed Aug. 26, 2015, which issued as U.S. Pat. No. 9,622,325 on Apr. 11, 2017. U.S. Pat. No. 9,622,325 is a divisional of application Ser. No. 14/478,150, filed Sep. 5, 2014, which issued as U.S. Pat. No. 9,445,474 on Sep. 13, 2016. U.S. Pat. No. 9,445,474 is a continuation of application Ser. No. 13/222,090, filed Aug. 31, 2011, which issued as U.S. Pat. No. 8,866,392 on Oct. 21, 2014.

INCORPORATION BY REFERENCE

The following prior arts with associated disclosures are herein requested to be incorporated into the current application:

1. U.S. Pat. No. 9,345,112 B2 titled "MICROCONTROLLER-BASED MULTIFUNCTIONAL ELECTRONIC SWITCH AND LIGHTING APPARATUS HAVING THE SAME" filed on Dec. 22, 2014 and granted on May 17, 2016. The '112 patent is a continuation in part of the original application of U.S. Pat. No. 8,947,000 which is the first founding patent for a large family collection of member patents involving using the technology of the microcontroller based electronic switch to control a light intensity of a light-emitting unit. The '112 patent is in turn the second founding patent for a subfamily of member patents involving using a technology of two LED loads emitting light with different color temperature to work with the technology of the microcontroller-based electronic switches to control a color temperature tuning and switching scheme of an LED load.

The applicant herein requests to incorporate the contents of the '112 patent including all disclosures, embodiments and drawings to the specification of the current application according to MPEP 2163.07(b).

2. U.S. Pat. No. 10,136,503 B2 titled "MICROCONTROLLER-BASED MULTIFUNCTIONAL ELECTRONIC SWITCH AND LIGHTING APPARATUS HAVING THE SAME" filed on Sep. 13, 2017 and granted on Nov. 20, 2018. The '503 patent is a member patent in the family collection of member patents under the first founding patent '000 and is also a member patent in the subfamily collection of member patents under the second founding patent '112.

The '503 patent teaches a system and a method of using two microcontroller based electronic switches respectively connected to two LED loads emitting light with different color temperatures to control and allocate different electric powers respectively delivered to the two LED loads for performing multiple working modes including on/off control mode, dimming mode, color temperature tuning mode, color temperature switching mode, color temperature dim to warm mode, commanding mode for controlling a lighting family comprising a plurality of member lamps remotely located or delay shut off mode.

The applicant herein requests to incorporate the contents of the '503 patent including all disclosures, embodiments and drawings to the specification of the current application according to MPEP 2163.07(b).

3. U.S. Pat. No. 10,470,276 B2 titled "METHOD OF TUNING LIGHT COLOR TEMPERATURE FOR LED LIGHTING DEVICE AND APPLICATION THEREOF" was filed on Oct. 17, 2018 and granted on Nov. 5, 2019. The '276 patent teaches a method and application of performing a light color temperature tuning control for an LED lamp includes using a first LED load emitting light with a low color temperature and a second LED load emitting light with a second color temperature thru a light diffuser, using a power allocation circuitry working with a power allocation algorithm to control different electric power respectively delivered to the first LED load while keeping the total electric power unchanged to generate different diffused light color temperatures.

Applicant herein requests to incorporate the contents of the '276 patent including all disclosures, embodiments and drawings by reference to the specification of the current application according to MPEP 2163.07(b).

4. U.S. Pat. No. 11,063,585 titled "METHOD OF TUNING LIGHT COLOR TEMPERATURE FOR LED LIGHTING DEVICE AND APPLICATION THEREOF" was continuation of application of the '276 patent, filed on Aug. 7, 2019 and granted on Jul. 13, 2021. The '585 patent discloses a theory and a technical foundation for building a technical frame of a color temperature tuning technology for an LED lamp composing a power allocation algorithm, a power allocation circuitry and at least one external control device for activating a color temperature tuning and switching scheme.

The applicant herein request to incorporate the contents of the '585 patent including all disclosures, all embodiments and all drawings to the specification of the current application according to MPEP 2163.07(b).

5. U.S. Pat. No. 8,866,392 B2 titled "TWO-LEVEL LED SECURITY LIGHT WITH MOTION SENSOR" was filed on Aug. 31, 2011 and granted on Oct. 21, 2014. The '392 patent discloses technologies for operating a two-level LED security light; at night the LED security light is automatically turned on for a low level illumination, when a motion intrusion signal is detected by the motion sensor, the LED security light is switched from the low level illumination with a low color temperature to a high level illumination with a high color temperature to maximize an effect of security alert for a short duration time, at dawn the LED security light is automatically turned off.

The '392 patent is the founding application for a large family collection of member patents involving automatic illumination control technologies including light intensity tuning and light color temperature tuning. The applicant herein requests to incorporate the contents of the '392 patent including all disclosures, embodiments and drawings to the specification of the current application according to MPEP 2163.07(b).

6. U.S. Pat. No. 10,516,292 B2 titled "TWO-LEVEL LED SECURITY LIGHT WITH MOTION SENSOR" was a member patent under the founding patent '392, filed on Jan. 10, 2019 and granted on Dec. 24, 2019. The '292 patent is a member patent in the family collection of patents under the founding patent '392.

The '292 patent discloses a lifestyle LED security light including a light-emitting unit configured with two sets of LED loads respectively emitting different color temperature light, at dusk the light-emitting unit is automatically turned on for a first level illumination with a low color temperature featuring an aesthetic night view with the motion sensor being deactivated for a first time duration, and then the light-emitting unit is changed to a second level illumination with motion sensor being activated, when the motion sensor detects a motion intrusion signal, the light-emitting unit is instantly switched to perform a third level illumination with a high light intensity and a high color temperature. The color temperatures of the first level illumination and the third level illumination are respectively adjustable by simultaneously and reversely adjusting the electric powers allocated to the two sets of LED loads.

The applicant herein request to incorporate the contents of the'292 patent to the specification of the current application according to MPEP 2163.07(b).

7. U.S. Pat. No. 10,770,916 B2 titled "TWO-LEVEL LED SECURITY LIGHT WITH MOTION SENSOR" was filed on Oct. 30, 2019 and granted on Sep. 8, 2020. The '916 patent is a member patent in the family collection of patents under the founding patent '392. The '916 patent teaches a method of configuring an LED light with a tunable diffused light color temperature. The method comprises using a light-emitting unit configured with a first LED load emitting light with a low color temperature and a second LED load emitting light with a high color temperature electrically connected in parallel, using a light diffuser to cover the first LED load and the second LED load create a diffused light with a diffused light color temperature, using two semiconductor switching devices working in conjunction with a controller to respectively control a first electric power delivered to the first LED load and a second electric power delivered to the second LED load to operate a color temperature tuning and switching scheme and using a first external control device to output at least one first external control signal to activate a selection of a diffused light color temperature.

The applicant herein requests to incorporate the contents of the '916 patent including all disclosures, all embodiments and all drawings to the specification of the current application according to MPED 2163.07((b).

8. U.S. Pat. No. 10,763,691 B2 titled "TWO-LEVEL LED SECURITY LIGHT WITH MOTION SENSOR" was filed on Mar. 19, 2020 and granted on Sep. 1, 2020. The '691 patent is a member patent in the family collection of patents under the original founding patent '392. The '691 patent discloses a technology of tuning the light color temperature of a lifestyle LED light by blending the two LED loads emitting light with different color temperatures thru a light diffuser with an arrangement that a first electric power delivered to a first LED load emitting light with a low color temperature and a second electric power delivered to a second LED load emitting light with a high color temperature are reversely and complementarily adjusted for tuning a diffused light color temperature such that a total light intensity generated by the LED light is kept essentially unchanged.

The applicant herein requests to incorporate the contents of the '691 patent including all disclosures, embodiments and drawings to the specification of the current application according to MPEP 2163.07(b).

9. U.S. Pat. No. 10,187,947 B2 titled "LIFE-STYLE LED SECURITY LIGHT" was issued on Jan. 22, 2019. The applicant herein requests to incorporate the contents of the '947 patent including all disclosures, embodiments and drawings to the specification of the current application according to MPEP 2163.07(b).

10. U.S. Pat. No. 10,491,032 B2 titled "LIFESTYLE SECURITY LIGHT" was issued on Nov. 26, 2019. The applicant herein requests to incorporate the contents of the '032 patent including all disclosures, embodiments and drawings to the specification of the current application according to MPEP 2163.07(b).

11. U.S. Pat. No. 10,225,902 B2 titled "TWO-LEVEL SECURITY LIGHT WITH MOTION SENSOR" was issued on Mar. 5, 2019. The applicant herein requests to incorporate the contents of the '902 patent including all disclosures, embodiments and drawings to the specification of the current application according to MPEP 2163.07(b).

12. U.S. Pat. No. 10,326,301 B2 titled "TWO-LEVEL LED SECURITY LIGHT WITH MOTION SENSOR" was issued on Jun. 18, 2019. The applicant herein requests to incorporate the contents of the '301 patent including all disclosures, embodiments and drawings to the specification of the current application according to MPEP 2163.07(b).

13. U.S. Pat. No. 9,326,362 B2 titled "TWO-LEVEL LED SECURITY LIGHT WITH MOTION SENSOR" was issued on Apr. 26, 2016. The applicant herein requests to incorporate the contents of the '362 patent including all disclosures, embodiments and drawings to the specification of the current application according to MPEP 2163.07(b).

14. U.S. Pat. No. 9,560,719 B2 titled "LED SECURITY LIGHT AND LED SECURITY LIGHT CONTROL DEVICE THEREOF" was issued on Jan. 31, 2017. The applicant herein requests to incorporate the contents of the '719 patent including all disclosures, embodiments and drawings to the specification of the current application according to MPEP 2163.07(b).

15. U.S. Pat. No. 10,154,564 B2 titled "APP BASED FREE SETTING METHOD FOR SETTING OPERATING PARAMETER OF SECURITY LIGHT" was issued on Dec. 11, 2018. The applicant herein requests to incorporate the contents of the '564 patent including all disclosures, embodiments and drawings to the specification of the current application according to MPEP 2163.07(b).

16. U.S. Pat. No. 10,667,367 B2 titled "APP BASED FREE SETTING METHOD FOR SETTING OPERATING PARAMETER OF SECURITY LIGHT" was issued on May 26, 2020. The applicant herein requests to incorporate the contents of the '367 patent including all disclosures, embodiments and drawings to the specification of the current application according to MPEP 2163.07(b).

BACKGROUND OF THE INVENTION

1. Technical Field

The present disclosure relates to an LED lighting apparatus, in particular, to a linkable LED lighting system designed with an on line free setting capacity of operating parameters. In the present disclosure, a total of 12 prior arts belonging to same family of patents under U.S. Pat. No. 8,866,392 and a total of 4 prior arts belonging to same family of patents under U.S. Pat. No. 8,947,000 are incorporated for reference according to MPEP 2163.07(b), in which the prior patents U.S. Pat. Nos. 10,667,367 and 10,154,564 are specifically written to teach an APP based free setting method for setting operating parameters of a security light.

2. Description of Related Art

Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY OF THE INVENTION

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, an external control unit, a loading and power control unit, and a light-emitting unit. The light-emitting unit further includes one or a plurality of series- and/or parallel-connected LEDs; when the light sensing control unit detects that the ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high or full level illumination for a predetermined duration.

Another exemplary embodiment of the present disclosure provides a two-level LED security light including a power supply unit, a light sensing control unit, a motion sensing unit, an external control unit, a loading and power control unit, a light-emitting unit. The light-emitting unit includes a plurality of series- and/or parallel-connected LEDs. When the light sensing control unit detects that the ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high or full level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes a phase controller and one or a plurality of parallel-connected alternating current (AC)LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto-turnoff at dawn. The PC mode may generate a high or a low level illumination for a predetermined duration then automatically switch to the PS mode by a control unit to generate a low level or a cutoff illumination. When the motion sensor detects a human motion, the disclosed LED security light may immediate switch to the high or full level illumination for a short predetermined duration thereby achieve illumination or warning effect. After the short predetermined duration, the LED security light may automatically return to the low level illumination for saving energy. Although ACLEDs are used in some embodiments, the present invention is not limited in applying on the ACLEDs. It can be implemented with DC LEDs or DC LEDs in AC module such as LED bulbs incorporating with adequate power sources and circuitries which commonly known by a person of skill in the art.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of the minimum forward voltages and maximum forward voltages collected from various LED manufacturers for generating a designated constant forward current to produce a required lumens output.

DETAILED DESCRIPTION OF PREFERRED EMBODIMENTS

Figure 1:
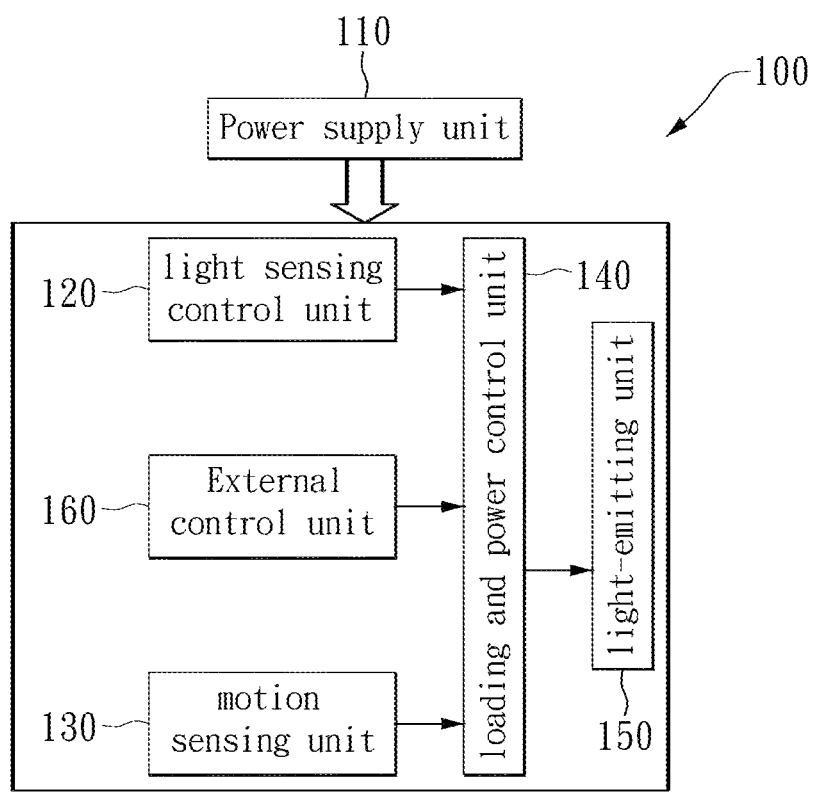
FIG. 1 schematically illustrates a block diagram of a two-level LED security light in accordance with an exemplary embodiment of the present disclosure.
Figure 1A:
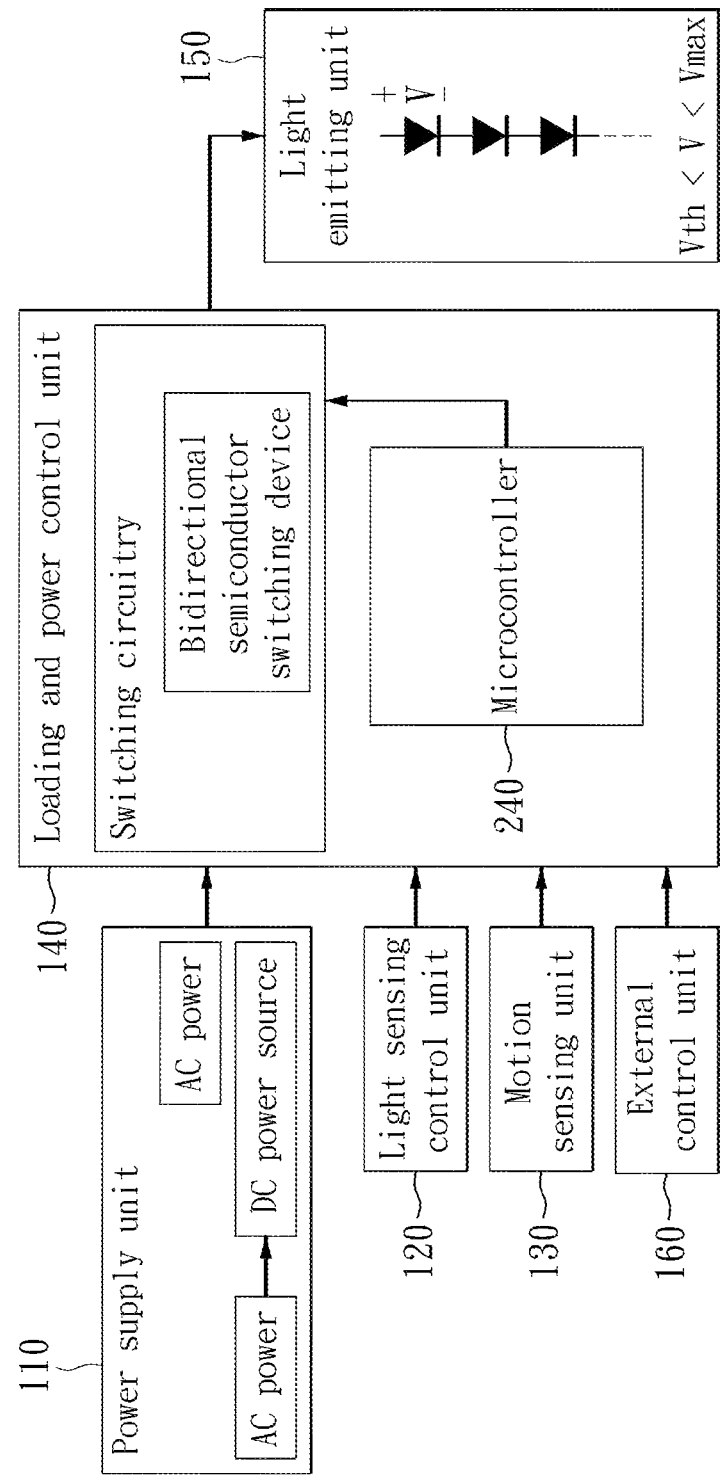
FIG. 1A is an enhanced block diagrammed under FIG. 1 to specifically illustrate an embodiment of FIG. 1 for a two-level LED security light, wherein the loading and power control unit comprises a switching circuitry and a microcontroller, wherein the switching circuitry further comprises a bidirectional semiconductor switching device for controlling an average electric power to be delivered to the LED.
Figure 1B:
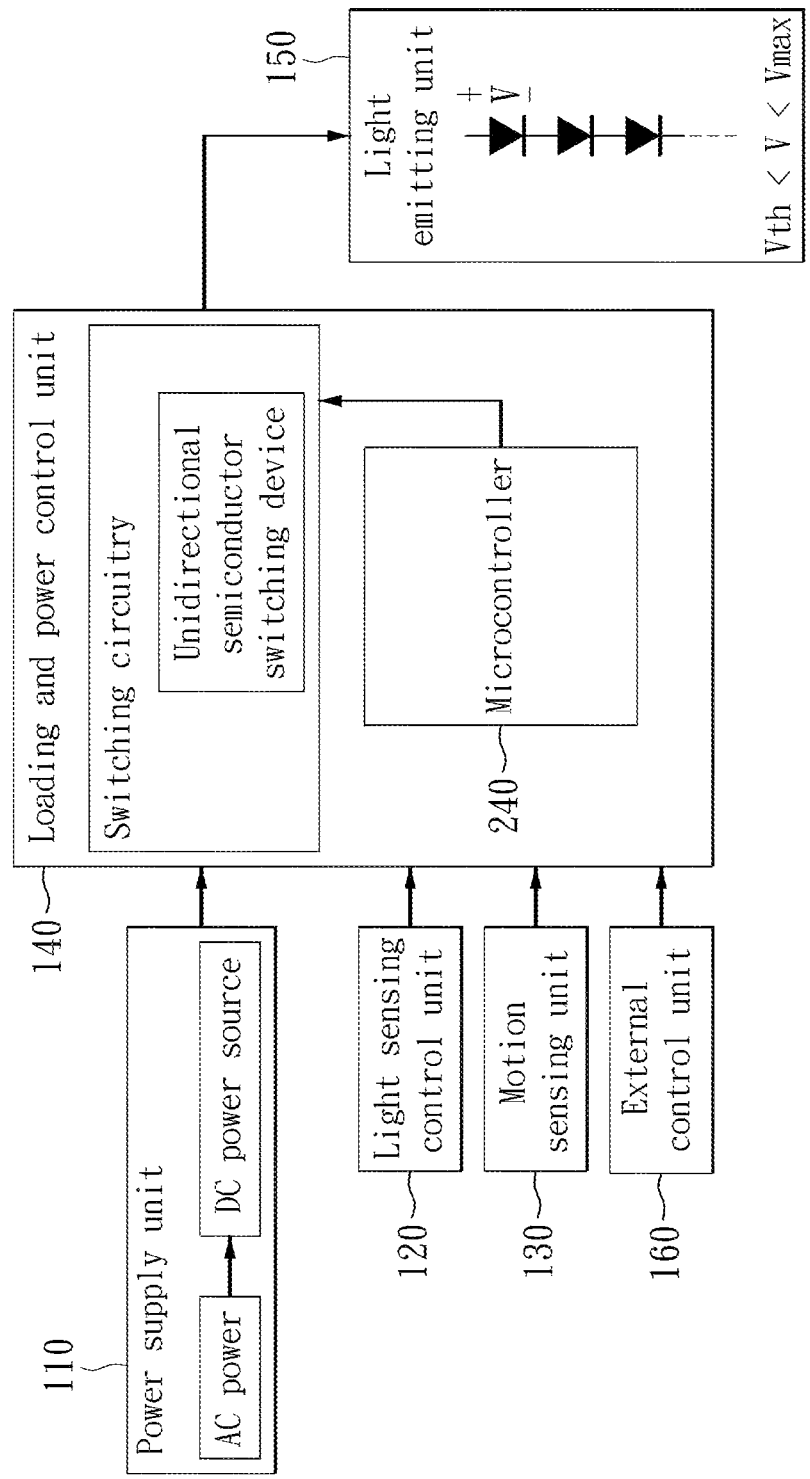
FIG. 1B is an enhanced block diagrammed under FIG. 1 to specifically illustrate an embodiment of FIG. 1 for a two-level LED security light, wherein the loading and power control unit comprises a switching circuitry and a microcontroller, wherein the switching circuitry further comprises an unidirectional semiconductor switching device for controlling an average electric power to be delivered to the LED.
Figure 1C:
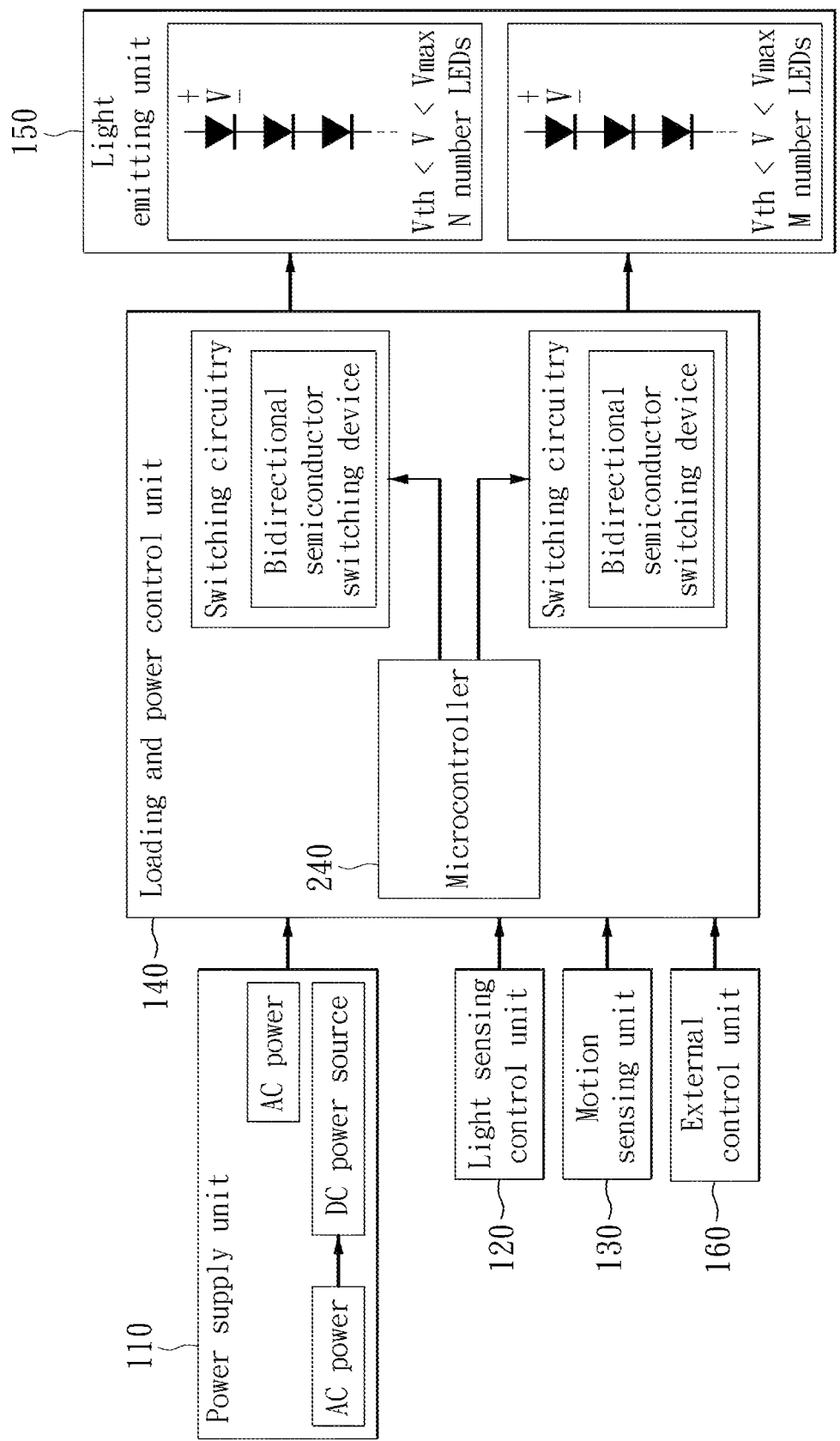
FIG. 1C is an enhanced block diagrammed under FIG. 1 to specifically illustrate an embodiment of FIG. 1 for a two-level LED security light including a first set having N number LEDs and a second set having M number LEDs, wherein the loading and power control unit comprises a switching circuitry and a microcontroller, wherein the switching circuitry further comprises bidirectional semiconductor switching devices for controlling an average electric power to be delivered to the LED.
Figure 1D:
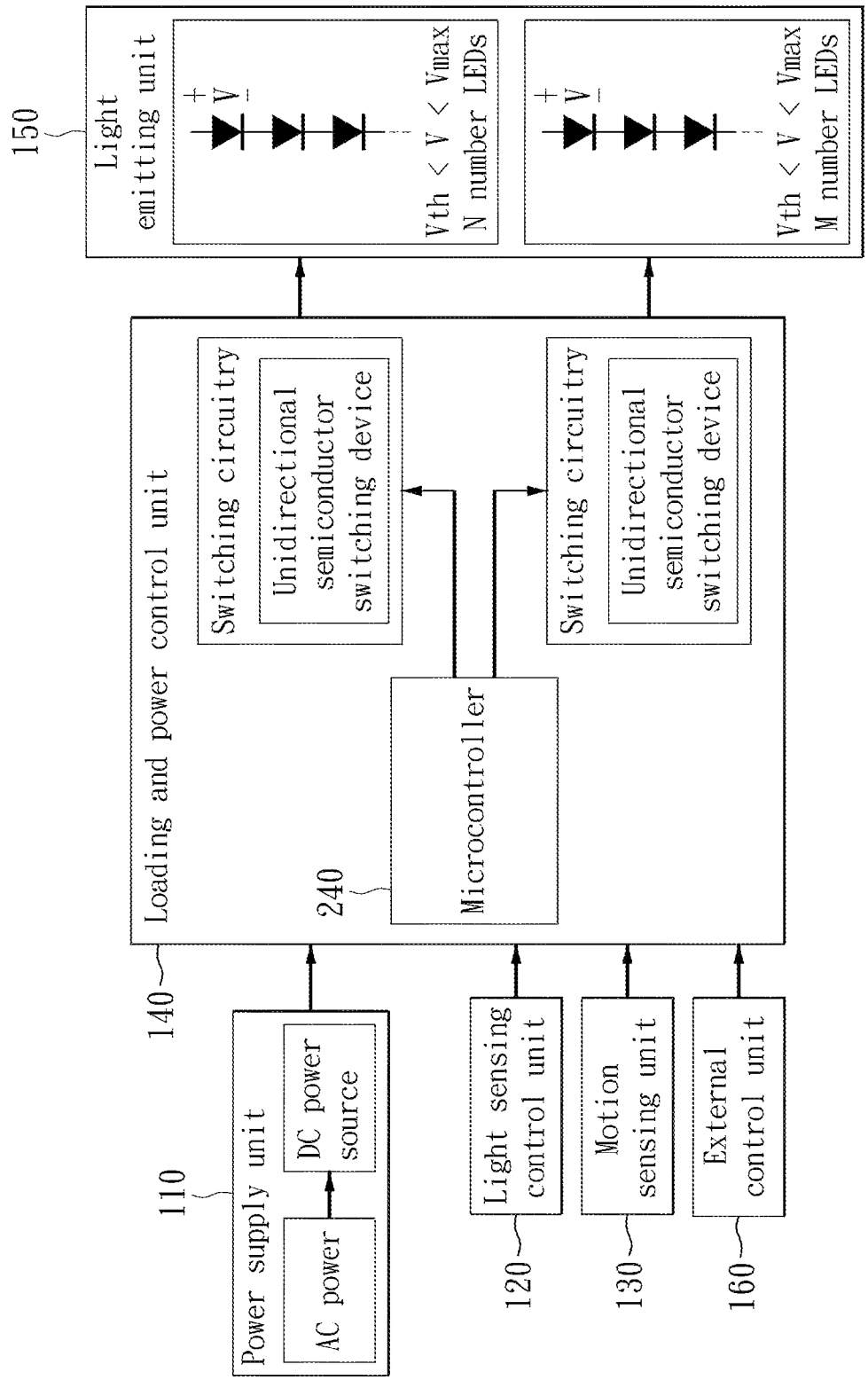
FIG. 1D is an enhanced block diagrammed under FIG. 1 to specifically illustrate an embodiment of FIG. 1 for a two-level LED security light including a first set having N number LEDs and a second set having M number LEDs, wherein the loading and power control unit comprises a switching circuitry and a microcontroller, wherein the switching circuitry further comprises unidirectional semiconductor switching devices for controlling an average electric power to be delivered to the LED.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, an external control unit 160, a loading and power control unit 140, and a light-emitting unit 150. The power supply unit 110 is used for supplying power required to operate the system, wherein the associated structure includes the known AC/DC power converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140. The external control unit 160 is coupled to the loading and power control unit 140 for setting various operating parameters of a security light including at least a time length setting (a time setting unit) for various illumination modes, at least a light intensity setting for various illumination modes and switching between illumination modes. The external control unit 160 may be configured with a push button, a touch sensor, a voltage divider, a power interruption detection circuitry or a wireless remote control receiver for processing signals interpretable by the loading and power control unit 140.

The loading and power control unit 140 which is coupled to the light-emitting unit 150 may be implemented by a microcontroller. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs and switching components. The loading and power control unit 140 may control the light-emitting unit 150 to generate at least two levels of illumination variations.

When the light sensing control unit 120 detects that the ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flow through the light-emitting unit 150, to generate the high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto.

Figure 2A:
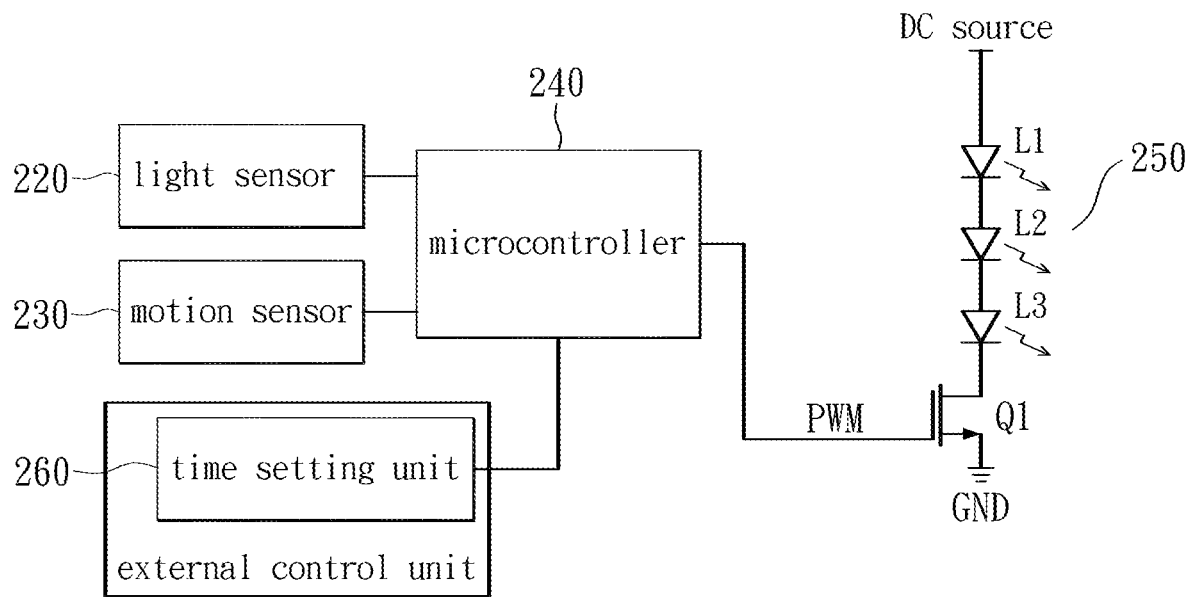
FIG. 2A illustrates a schematic diagram of a two-level LED security light in accordance to the first exemplary embodiment of the present disclosure.
Figure 2B:
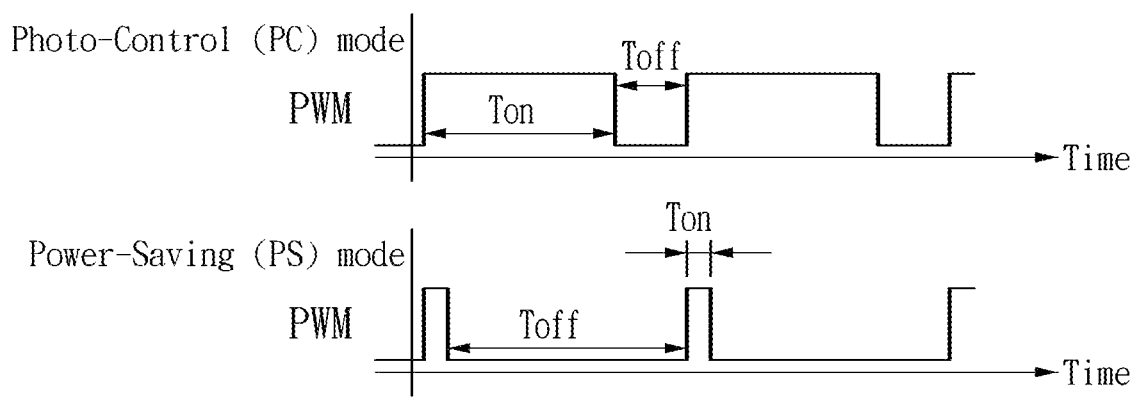
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow the user to configure the predetermined duration associated with the high level illumination in the PC mode, however the present disclosure is not limited thereto. The time setting unit is a type of external control units designed to process various external control signals interpretable by the controller for setting at least a time length setting for various illumination modes.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
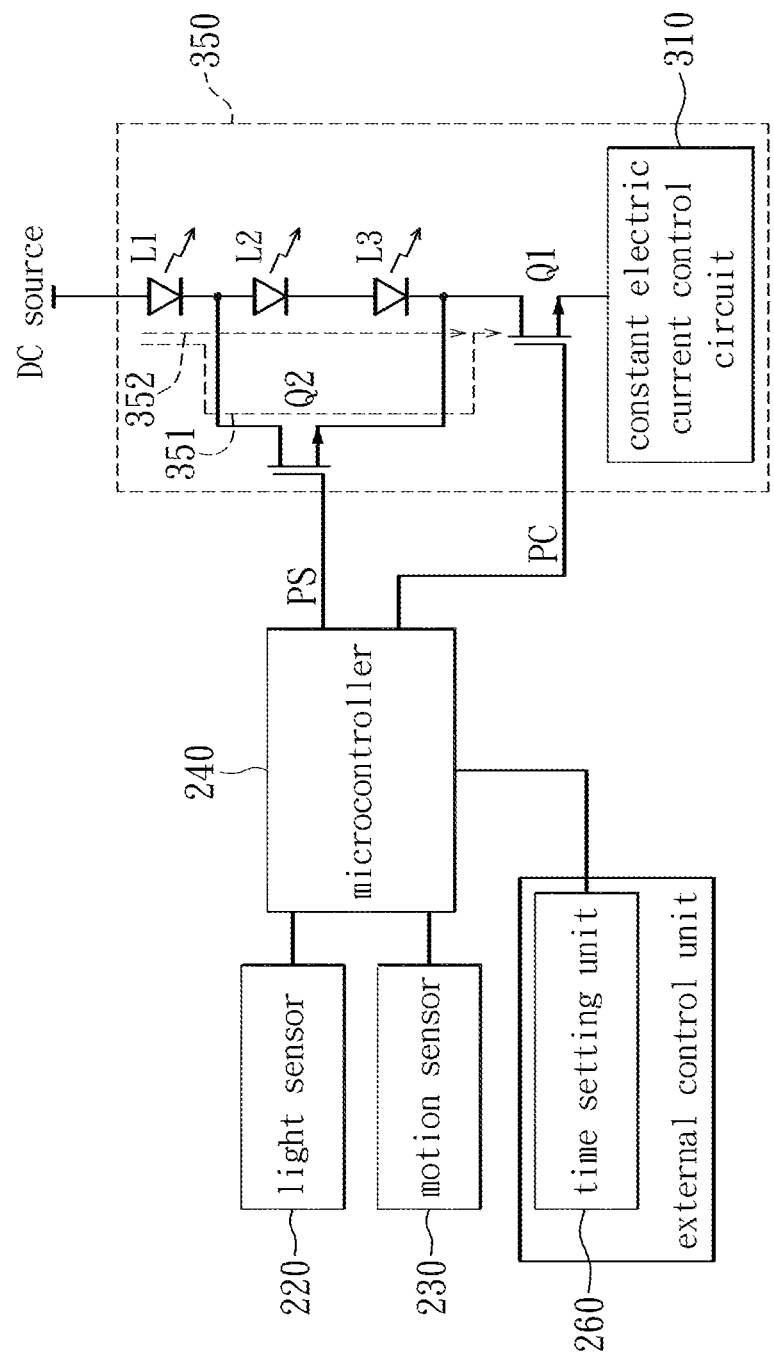
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
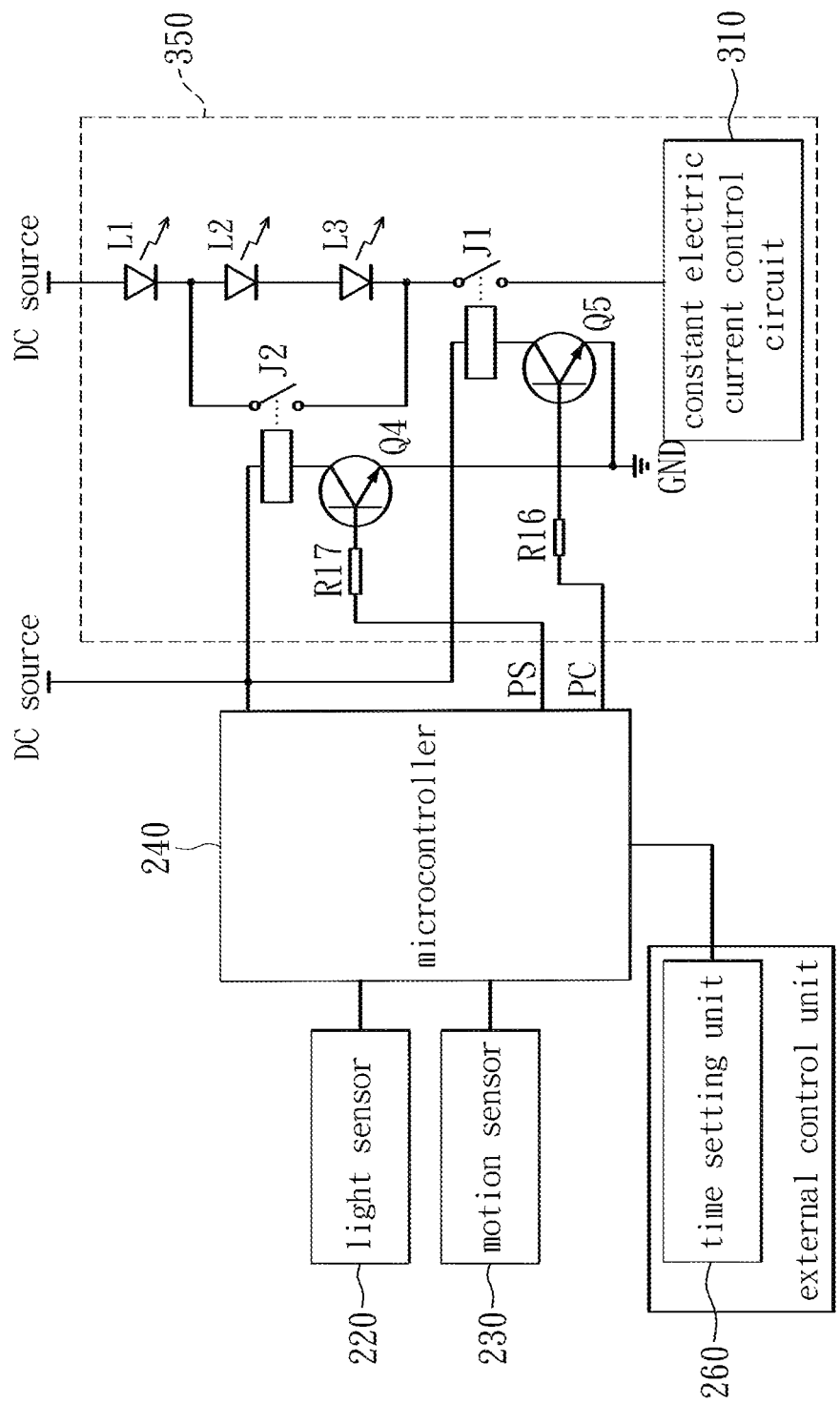
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having a color temperature in a range between 2000K and 3000K, while the LEDs L2 and L3 may adopt LEDs having a color temperature between 4000K and 6500K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
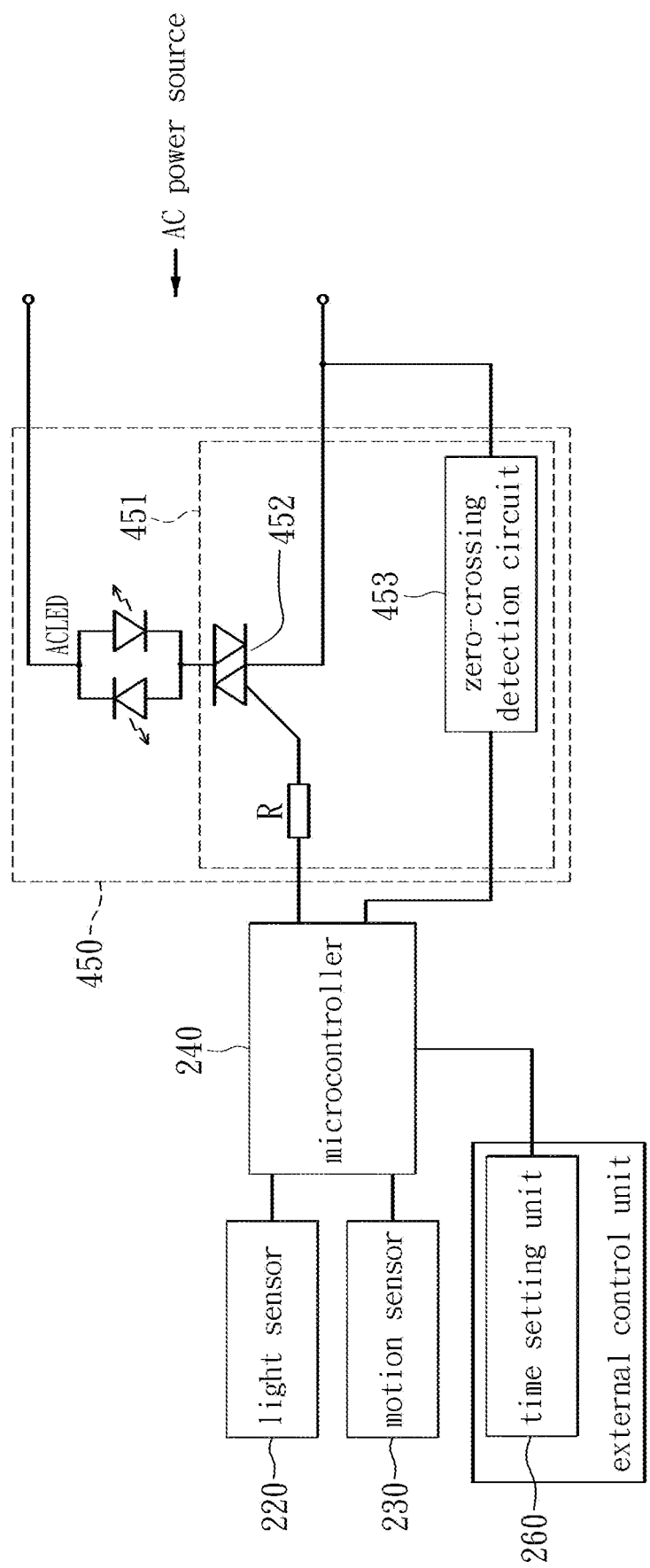
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 includes a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (1/2\pi f)\sin^{-1}(V_t/V_m)$. The described criterion is applicable to all types of ACLEDs to assure that the triac 452 can be stably triggered in both positive and negative half cycle of the AC power source. Take ACLED with $V_t$(rms)=80V as an example, and supposing the $V_m$(rms)=110V and f=60 Hz, then $t_o$=2.2 ms and (½f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
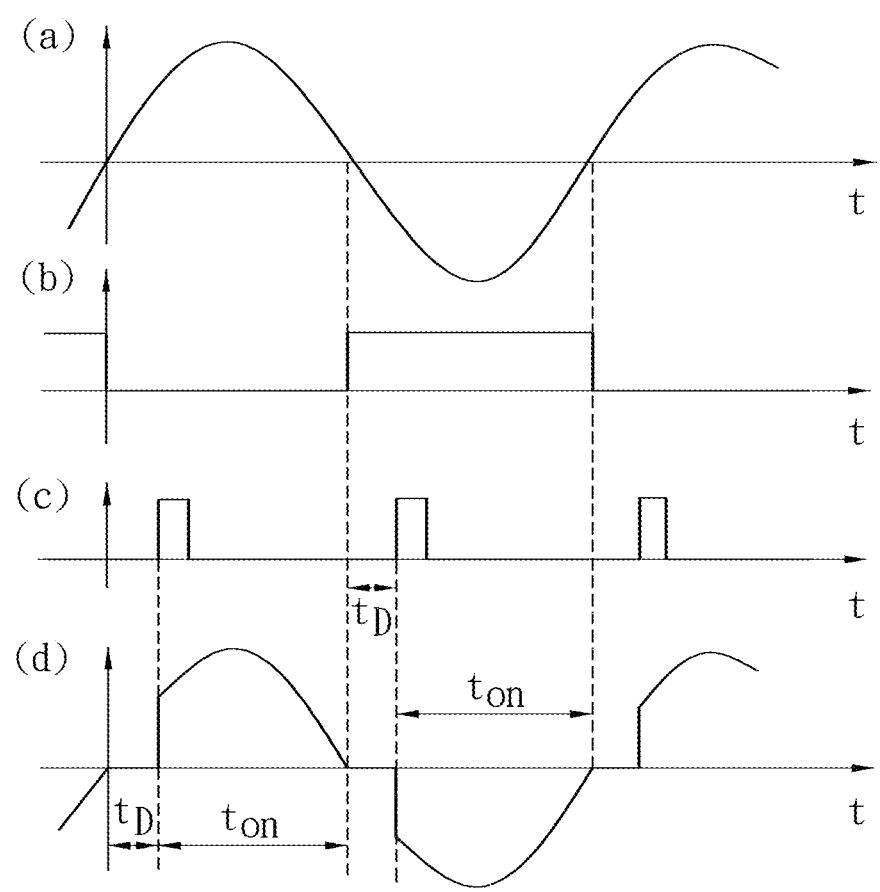
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
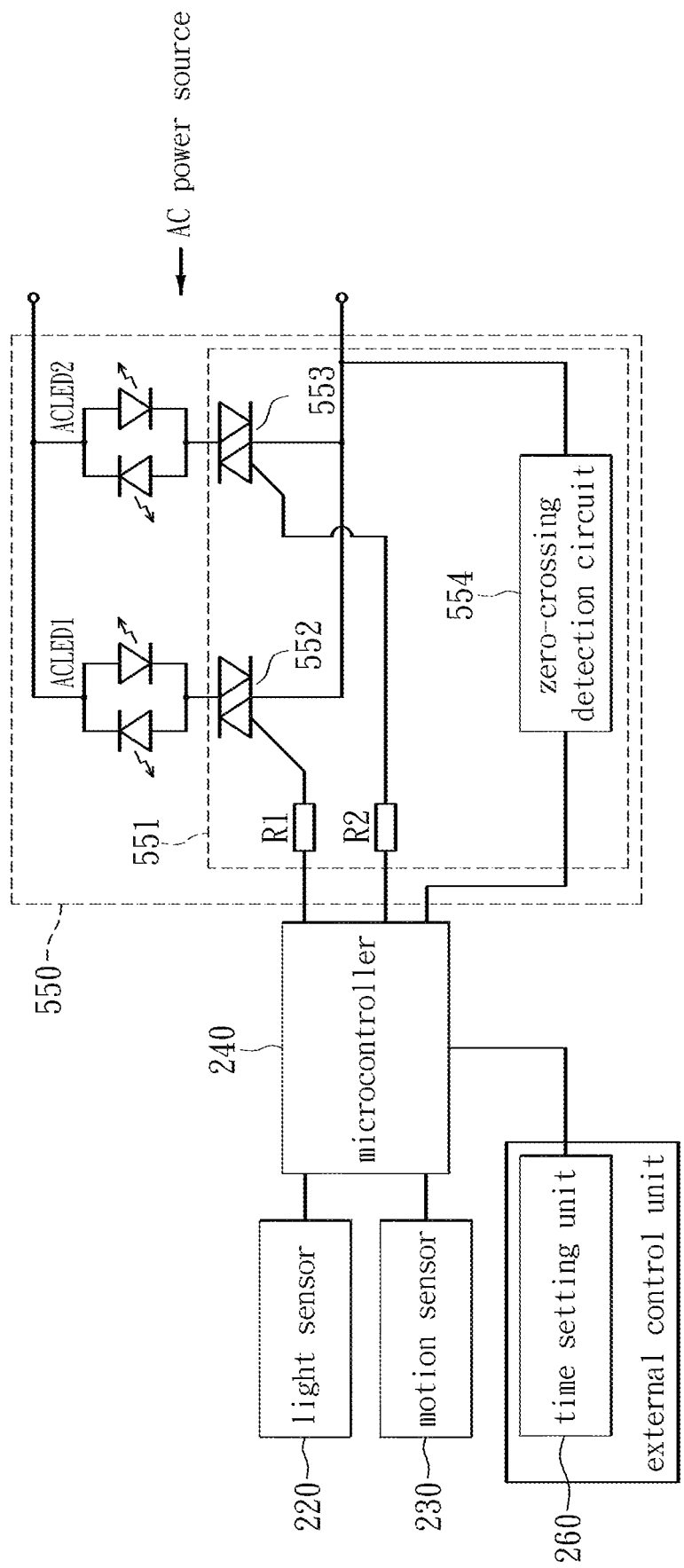
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
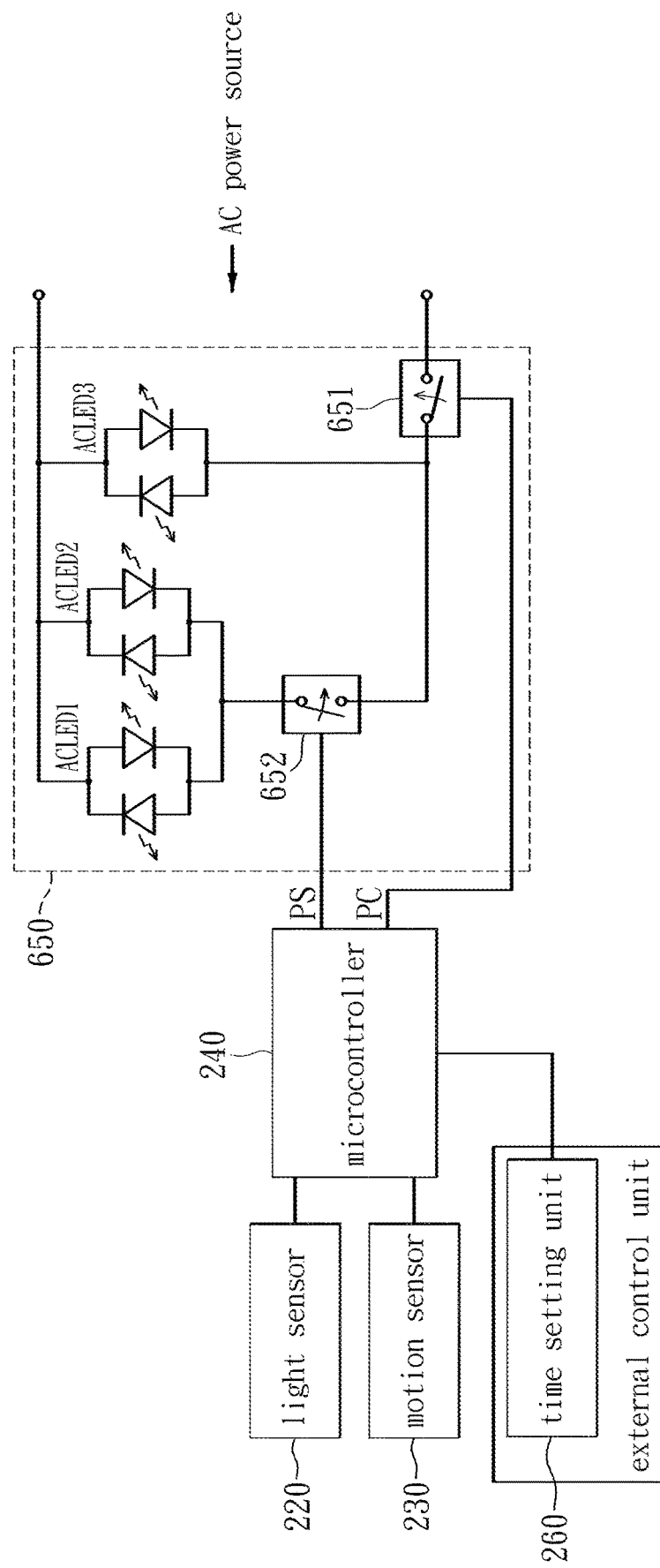
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having a color temperature in a range between 4000K and 6500K. The ACLED3 may be a low power lighting source having a color temperature between 2000K and 3000K. Consequently, the ACLED may generate two levels of illuminations with high illumination and hue contrast without using a zero-crossing detection circuit.

Fifth Exemplary Embodiment

Figure 7:
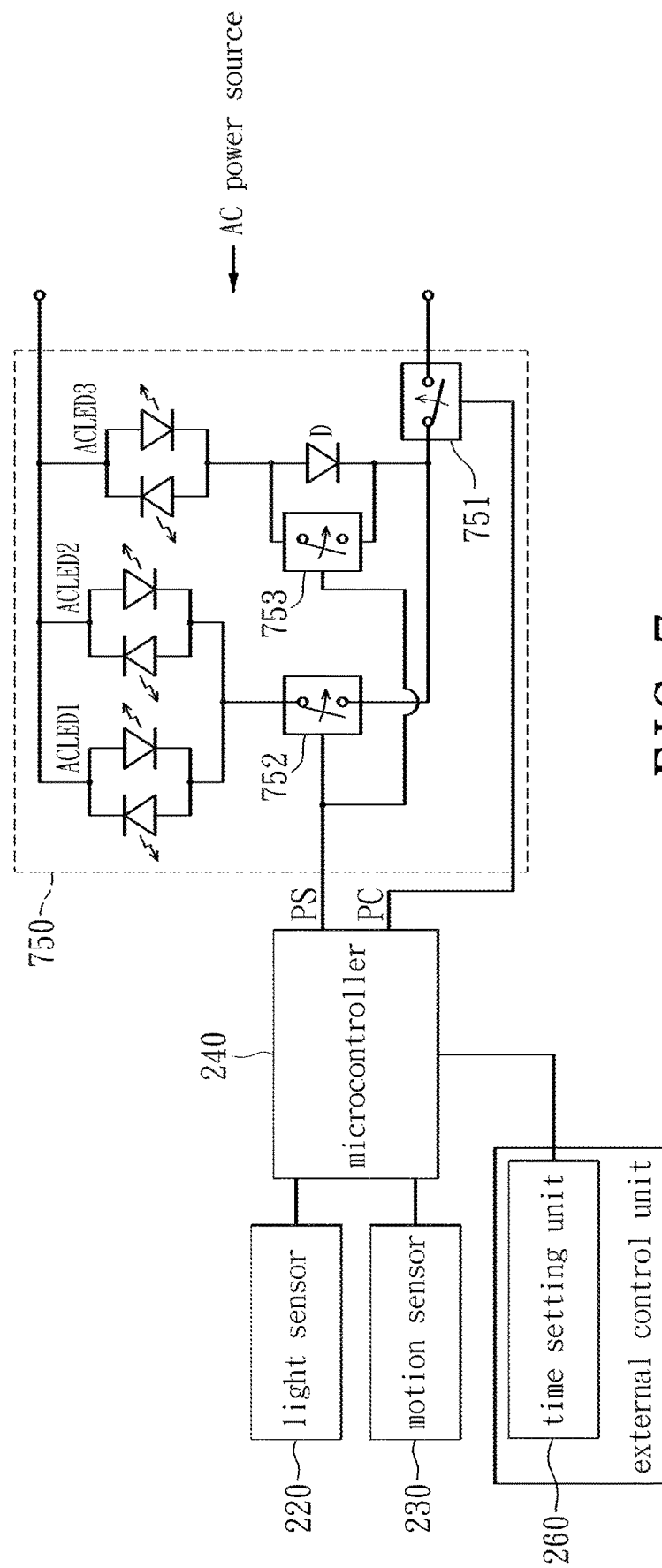
FIG. 7 illustrates a schematic diagram of a two-level LED security light in accordance to the fifth exemplary embodiment of the present disclosure.
Figure 8A:
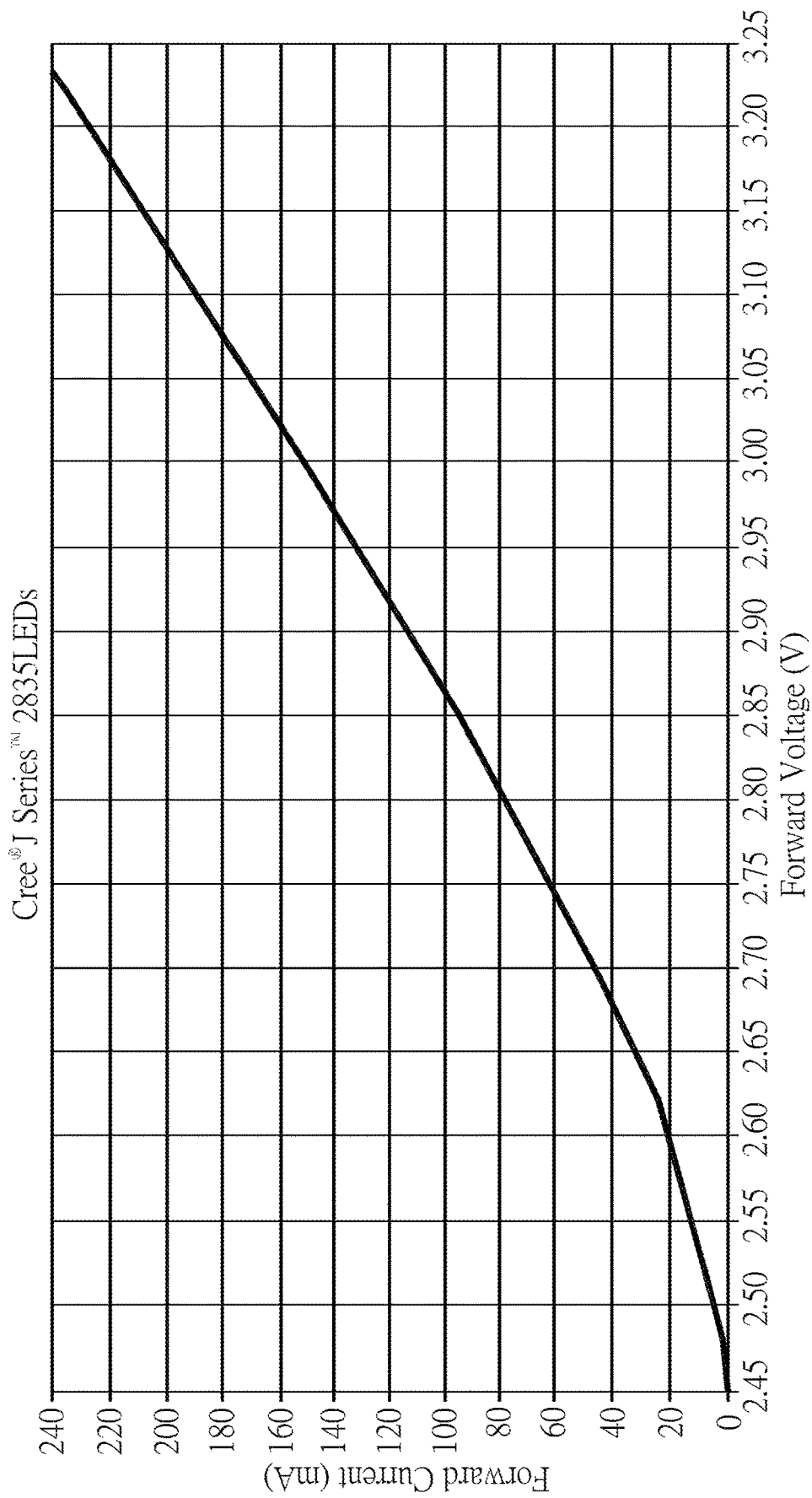
FIGS. 8A, 8B, 8C and 8D schematically and respectively show I-V relationship charts (Forward Current vs. Forward Voltage) for a white LED chip from each of 4 different LED manufacturers.
Figure 8B:
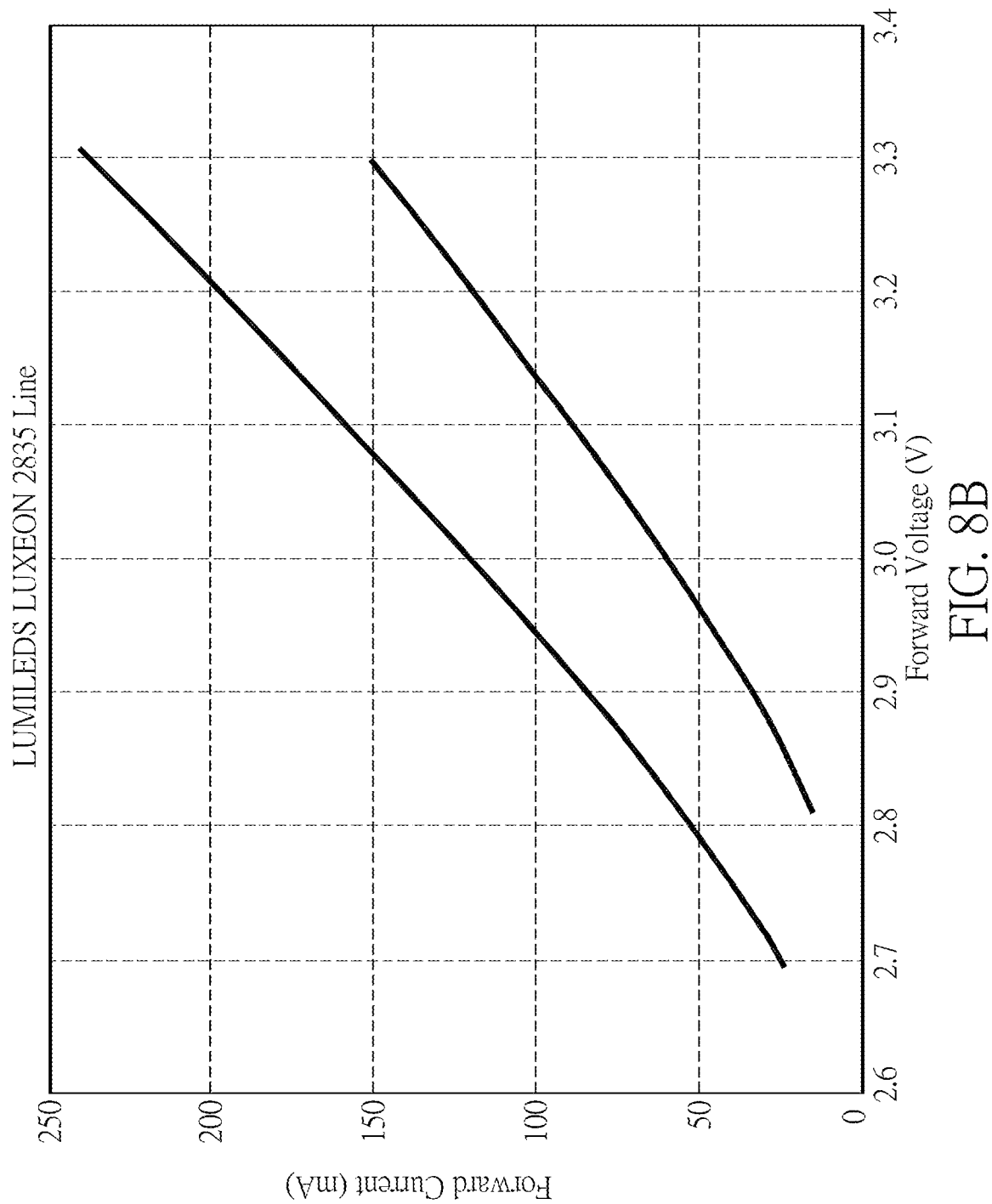
Figure 8C:
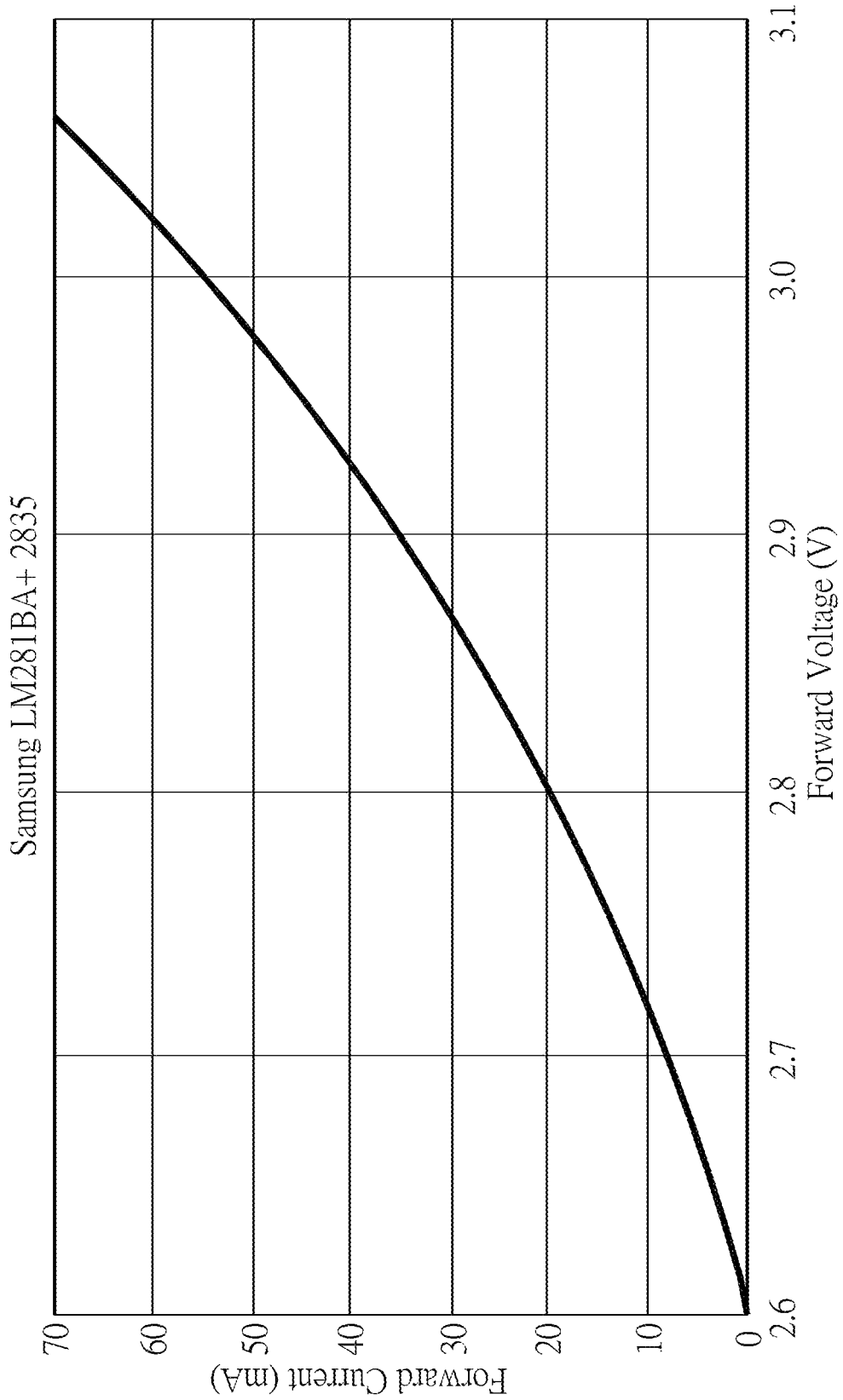
Figure 8D:
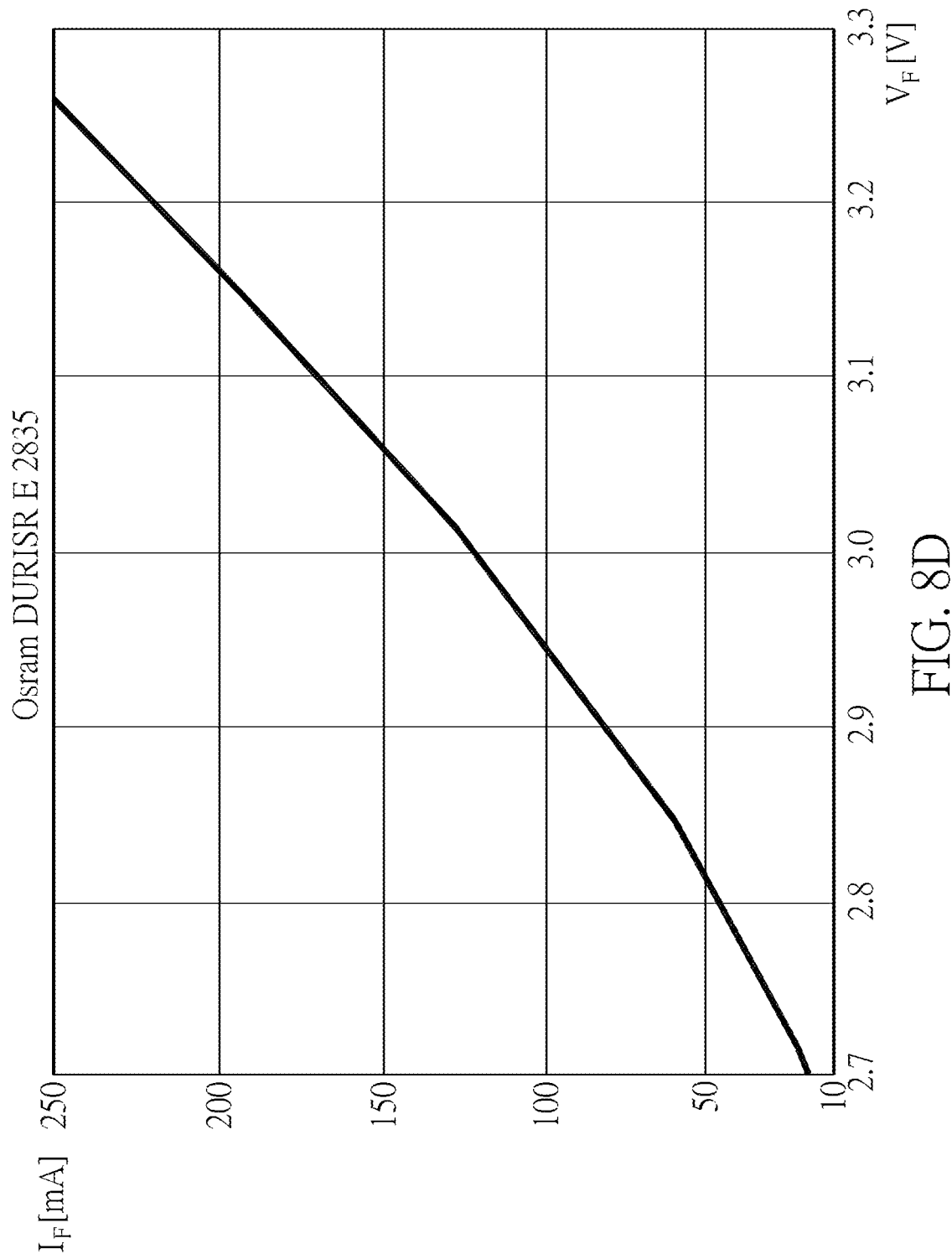

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

When the light source of the light-emitting unit 150 is confined to the use of an LED load, the compliance and satisfaction of a voltage operating constraint attributable to the unique electrical characteristics of the LED load is vital to a successful performance of an LED lighting device. Any LED lighting device failing to comply with the voltage operating constraint of the unique electrical characteristics is bound to become a trouble art. This is because the LED as a kind of solid state light source has completely different electrical characteristics for performing light emission compared with conventional light source such as incandescent bulbs or fluorescent bulbs. For instance, for a white light LED or blue light LED there exists a very narrow voltage domain ranging from a threshold voltage at around 2.5 volts to a maximum operating voltage at around 3.5 volts, which allows the LEDs to operate adequately and safely; in other words, when a forward voltage imposed on the LED is lower than the threshold voltage, the LED is not conducted and therefore no light is emitted, when the forward voltage exceeds the maximum operating voltage, the heat generated by a forward current could start damaging the construction of the LED. Therefore, the forward voltage imposed on the LED is required to operate between the threshold voltage and the maximum operating voltage.

In respect to the LED load of the light-emitting unit 150, the cut-in voltage $V_t$ of ACLEDs is technically also referred to as the threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is a threshold voltage $V_{th}$ required to trigger the LED to start emitting light and the third electrical characteristic is a maximum operating voltage $V_{max}$ allowed to impose on the LED to avoid a thermal runaway to damage or burn out the semiconductor construction of the LED. The described cut-in voltage $V_t$ has the same meaning as the above mentioned threshold voltage $V_{th}$ which is a more general term to be used for describing the second electrical characteristic of a PN junction semiconductor structure. Also because the cut-in voltage $V_t$ is specifically tied to forming a formula to transform the threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term Vm is related to the amplitude of the instant maximum voltage of an AC power source which has nothing to do with the third electrical characteristic $V_{max}$ of an LED load.

An LED chip is a small piece of semiconductor material with at least one LED manufactured inside the semiconductor material. A plurality of LEDs may be manufactured and packaged inside an LED chip for different levels of wattage specification to meet different illumination need. The LED can also be designed with a larger size of PN junction such that a higher forward current can be generated for higher wattage applications without damaging the LED structure but in such case less quantity of LEDs can be produced. For each LED designed with a different level of wattage specification there always exists a narrow voltage domain $V_{th}<V<V_{max}$, wherein V is a voltage across each LED, wherein $V_{th}$ is the threshold voltage to enable the LED to start emitting light and $V_{max}$ is the maximum operating voltage imposed on the LED to avoid the LED from being damaged or burned out by the heat generated by the high operating voltage at $V_{max}$. Such voltage constraints are attributable to the different semiconductor materials used, different manufacturing and packaging processes employed. Although the values of threshold voltage and maximum operating voltage may vary within a narrow dispersion of distribution among LEDs produced from different manufacturers, they can be represented by some reference values which are learned from cumulation of manufacturing and practicing experiences by the LED manufacturers. The reference values are necessary and useful to serve as guidelines for designing LED driver to ensure an LED voltage bin selected does comply with the narrow voltage domain $V_{th}<V<V_{max}$ for generating a constant forward current to produce a designated light intensity.

LEDs are batch-produced by wafers and each wafer is designed to produce a large quantity of LEDs which may respectively require different forward voltages within a narrow distribution range for generating a designated forward current. For instance if a batch of #2835 0.5 watt LEDs are used to generate a designated forward current at 150 mA, among the batch of LEDs produced from the same manufacturer, there exists a distribution range of required forward voltages from 2.9 volts (Minimum Forward Voltage, VFMIN) to 3.3 volts (Maximum Forward Voltage, VFMAX) to generate the same designated forward current, the batch of LEDs is further divided and grouped by the manufacturer into a few voltage bins with each voltage bin having a much smaller subrange of forward voltages bounded by a bin minimum forward voltage VBMIN and a bin maximum forward voltage VBMAX for generating the same forward current. For instance the distribution range may be divided into four voltage bins with a first bin accommodating a forward voltage subrange from 2.9 volts to 3.0 volts, a second voltage bin accommodating a forward voltage subrange from 3.0 volts to 3.1 volts, a third bin accommodating a forward voltage subrange from 3.1 volts to 3.2 volts, and a fourth bin accommodating a forward voltage subrange from 3.2 volts to 3.3 volts. The LEDs grouped in the first bin belong to the most efficient LEDs produced from the wafer as they only need lowest forward voltages to generate same designated forward current, then followed by the second bin, then followed by the third bin and then the fourth bin being the least efficient LEDs produced by the wafer as they need highest forward voltages to generate same forward current. LED manufacturers sell LEDs by voltage bins with each voltage bin containing a plurality of LEDs which requires different forward voltages to generate a designated forward current for emitting light. Such division of LEDs by voltage bins is necessitated in order to minimize a volatility of forward voltages for generating a designated constant forward current. Otherwise a large swing of forward voltages between the maximum forward voltage VFMAX and the minimum forward voltage VFMIN could easily cause an LED load fail because the VFMAX required for driving the least efficient LED(s) could be too close to or exceeding the maximum operating voltage $V_{max}$, which could cause the LED load damaged or burned out since all LEDs are electrically connected in series. In others words without the division of forward voltages by voltage bins it would be difficult to comply with the constraints of $V_{th}<V<V_{max}$. Similar bin arrangements are also applicable to color temperature performance and brightness performance for LEDs produced from a wafer. Generally speaking LED voltage bins with lower forward voltages can be priced higher than LED voltage bins with higher forward voltages. Both the minimum forward voltage VBMIN and the maximum forward voltage VBMAX in each voltage bin selected are required to comply with voltage operating constraint $V_{th}<V<V_{max}$, wherein V is a variable of forward voltage in the subrange of the voltage bin selected, wherein $V_{th}$ is a reference value of a threshold voltage required to trigger each LED in the batch of LEDs produced from the manufacturer to emit light and $V_{max}$ is a reference value of a maximum operating voltage across each LED in the batch of LEDs from the manufacturer at which the LED is vulnerable to a thermal damage. Please notice VBMIN and VBMAX respectively represent the lowest forward voltage and the highest forward voltage among the batch of LEDs for a selected voltage bin produced by the LED manufacturer to generate a designated constant forward current for outputting a designated lumens whereas the threshold voltage $V_{th}$ and the maximum operating voltage $V_{max}$ respectively refer to a minimum forward voltage to trigger any LED to start generating a forward current and a maximum forward voltage at which the LED is possibly vulnerable to a thermal damage.

When an LED load of an LED lighting device is configured with a plurality of N pieces of LEDs electrically connected in series or N sets of in parallel connected LEDs electrically connected in series, a working voltage $V_N$ imposed on the LED load is therefore required to be in a range between $N \times V_{th}$ and $N \times V_{max}$, namely, $N \times V_{th} < V_N \le N \times V_{max}$.

When the plurality of LEDs are white light LEDs produced by coating at least one phosphor compound on surfaces of blue light LEDs, a reference value of the threshold voltage $V_{th}$ is estimated at 2.5 volts and a reference value of the maximum operating voltage $V_{max}$ is estimated at 3.5 volts subject to an operating condition that a temperature of each LED connecting pin is controlled at or below 80 degrees centigrade thru an adequate design of a heat sink, therefore the voltage V across each LED of the N pieces of LEDs is thereby required to comply with an operating constraint of 2.5 volts<V<3.5 volts and the working voltage $V_N$ imposed on the LED load is thereby confined in a domain expressed by N×2.5 volts<$V_N$<N×3.5 volts.

For any LED lighting device comprising an LED load it is required that the LED load in conjunction with an adequate level of power source is configured with a combination of in series and/or in parallel connections of LEDs such that the electric current passing through each LED of the LED load remains at an adequate level such that a voltage V across each LED complies with the voltage operating constraint of $V_{th}$<V<$V_{max}$ featuring electrical characteristics of the LED and the working voltage $V_N$ across the LED load configured with N number of LEDs connected in series complies with an operating constraint of N× $V_{th}$<$V_N$<N×$V_{max}$.

FIGS. 8A, 8B, 8C and 8D comprises 4 drawings schematically and respectively showing a I-V relationship chart (Forward Current vs. Forward Voltage) for a #2835 0.5 watt white light LED from each of 4 different LED manufacturers; as can be seen from the chart when a forward voltage V is below a threshold voltage at around 2.5 volts, the LED is essentially not conducted so a forward current I is essentially equal to zero, as the forward voltage exceeds 2.5 volts the LED is activated to generate a current flow to emit light, as the forward voltage continues to increase, the forward current I increases exponentially at an accelerated pace, at a maximum forward voltage at around 3.5 volts the forward current I becomes 250 mA or higher, which could generate a heat that could start damaging the PN junction of the LED (Cree J Series 2835 LEDs). While an LED can be designed with a larger PN junction for operating a higher level of forward current for generating a higher lumens output, it is to be noticed the operating constraint of forward voltage has little to do with the dimensions of PN junction designed, therefore $V_{th}$<V<$V_{max}$ remains effective and necessary as such forward voltage constraint is attributable to the materials used in making the phosphor based white light LED. Although an LED is a current driven light emitter, it is to be recognized that ultimately it is the voltage that generates the current flow to drive the LED to emit light, no voltage no light emission so to speak. As shown in the I-V relationship chart, when the forward voltage is increased from 2.5 volts to 3.5 volts for the Cree 2835 LED, the corresponding forward current is substantially increased from 0 to 250 mA. Such feature of a high performance leverage of a large variation of forward current against a small variation of forward voltage makes it inappropriate to use a voltage as a variable to accurately control lumens output of an LED load. Instead it is more appropriate to use and to vary the constant current to operate the LED load. There are at least two reasons which support the use of the constant current source for operating the LED load: first, when a forward voltage varies by a 5% tolerance the forward current could vary in multiple like 40% to 50% for example. This could cause some LED(s) damaged in the LED load since we all know the LEDs from the same wafer have different forward voltages for generating same forward current; second, when the forward voltage varies a 5% tolerance the forward current could vary in multiple to result into a 40% to 50% fluctuation in light intensity which obviously cannot be accepted by consumers. A constant current source is always configured with a voltage power source to work in conjunction with a constant current control circuit which comprises a feedback circuit to provide a current information to the controller of the voltage power source for continuously adjusting output voltage level such that the current is kept constant.

In the semiconductor industry including the LED, the values of electrical parameters which characterize the natural inherent properties of semiconductor materials often are not precise or fixed, they always come with a range of distribution with a narrow dispersion, namely a reference range. For semiconductor devices in different categories of applications such as silicon based diode versus compound semiconductors based LED such as GaAs or GaP, their respective values of electrical parameters have very different distribution ranges though they all have the common features of having to operate in a conduction period between different threshold voltages and different maximum operating voltages. For semiconductor devices in the same category of application, the values are also different among different manufacturers though the variation ranges are much smaller and more predictable. Even the same white light LEDs produced from the same wafer there still exists a small yet predictable variation range of distribution as disclosed in the above descriptions for Cree 2835 LED about the structure of the LED voltage bins. They are just the natural inherent properties of semiconductor materials that the electrical parameters of semiconductor materials are impossibly represented by fixed values instead they always come with ranges of probability distribution with a narrow dispersion. With the above explanations being disclosed it is necessary to interpret or define the threshold voltage being a narrow interval comprised of a reference value plus a small tolerance e.g. 5% to 10%, or the reference ranges, therefore the reference value of threshold voltage at 2.5 volts with 5% tolerance would mean 2.5 volts+5%×2.5 volts=2.625 volts and the reference value of maximum operating voltage at 3.5 volts would mean 3.5 volts−5%×3.5 volts=3.325 volts, therefore the forward voltage V is interpretably operated as 2.5 volts<2.625 volts<V<3.325 volts<3.5 volts.

FIG. 9 is a data sheet showing data of the minimum forward voltages and maximum forward voltages for generating a designated forward current for LEDs produced from various LED manufacturers. They are the variation ranges of forward voltages formed by pairs of Maximum Forward Voltage and Minimum Forward Voltage of LEDs manufactured by different manufacturers before being divided and grouped into different voltage bins. Such variation ranges formed by each VFMAX and VFMIN are also required to satisfy the operating formula 2.5 volts<V<3.5 volts.

In summary, the compliance of voltage operating constraint $V_{th}$<V<$V_{max}$ featuring electrical characteristics of an LED is a critical technology for ensuring a normal performance of the LED load. Failing to comply with such voltage operating constraint can quickly age or seriously damage the semiconductor structure of the LED with a consequence of quick lumens depreciation of the LED bulbs and the product lifetime being substantially shortened, which will be unacceptable to the consumers. The compliance of the operating constraint $V_{th}$<V<$V_{max}$ is a necessary matter for any LED lighting device though it is not an obvious matter as it requires complicated technologies to calculate and coordinate among an adequate level of power source, a control circuitry and a non-linear I-V relationship of light-emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer for marketing deceptive LED lamps and making false claims with respect to the life time of their LED lamps and a huge amount of monetary relief was claimed with the Court in the complaint.

To further elaborate the importance of the constraints of operating formula $V_{th}<V<V_{max}$, it is necessary for the applicant to describe the following system operating flow chart to explain how the operating formula plays its indispensable role in LED driver design such that an LED light so designed is always ensured of being operated in a safety range when energized and the LED light can be expected as an energy saving and long lasting light source;

System Flowchart for designing an LED driver of an LED Light:

a) Step 1 Determine a maximum lumens output before a lumens loss by the light diffuser. For example use a maximum lumens $L_{max}$=3200 lumens.

b) Step 2 Select an LED capable of generating X lumens, e.g. X=80 lumens and then calculate a minimum quantity $Q_{min}$ of the LEDs for configuring the light emitting unit. $Q_{min}$=3200/80=40 LEDs.

c) Step 3 Obtain the corresponding value of the forward current I which generates the required lumens (e.g. 80 lumens) from the LED manufacturer's data pool.

d) Step 4 Select and obtain an LED voltage bin comprising a plurality of LEDs with different forward voltages able to produce same forward current on the I-V relationship curves to generate same lumens output (e.g. 80 lumens). The selected voltage bin comprising a plurality of LEDs with different forward voltages form a bin voltage domain bounded by the minimum forward voltage VBMIN and the maximum forward voltage VBMAX.

e) Step 5 At this stage both the LED manufacturer and the circuit designer of the LED light are obliged to carefully check both VBMIN and VBMAX are in full compliance with the operating constraints of 2.5 volts<V<3.5 volts, wherein V is a variable of forward voltages in the voltage domain bounded by VBMIN and VBMAX, or equivalently $V_{th}$<VBMIN and $V_{BMAX}<V_{max}$.

If V is within the domain between 2.5 volts and 3.5 volts, the selected LED voltage bin is acceptable. If V is outside of the domain then the LED voltage bin selected is not acceptable because the LED light would fail its performance as disclosed in the specification and claims. Under such circumstances either the lumens output level is to be reduced until the corresponding forward voltage falls in the domain or a different LED which can satisfy the voltage operating constraint needs to be selected.

f) Step 6 Determine a matrix of in parallel and in series connections of the minimum quantity of LEDs (e.g. 40 LEDs)

g) Step 7 Calculate the voltage and the total wattage required to successfully drive the LED light to perform the maximum lumens output.

The present disclosure of a two-level LED security light provides a unique lifestyle lighting solution. The motivation of creating such lifestyle lighting solution has less to do with the energy saving aspect of the low level illumination mode because an LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the life-style lighting solution of the present disclosure is featured with two innovations which meaningfully improve the exquisite tastes of living in the evening, the first innovation is the creation of an aesthetic scene for the outdoor living environment, wherein at dusk the LED security light is automatically turned on by the photo sensor to perform the low level illumination which is necessary for creating a soft and aesthetic night scene for the outdoor living area (such soft and aesthetic night view is not achievable by the high level illumination however), the second innovation is the creation of a navigation capacity similar to a light house effect for guiding people to safely move toward a destination in the outdoor living area without getting lost or encountering an accident. These two innovative functions coupled with the motion sensor to increase illumination when people enters into the short detection area make the present invention a perfect lifestyle lighting solution for enjoying an exquisite taste of evening life.

The technical infrastructure of a two-level LED security lights for various embodiments as disclosed can be further enhanced and applied to form a linkable LED security lighting system configured with a plurality of member LED security lights by incorporating a wireless transceiver, namely, a device including a wireless transmitter and a wireless receiver, for connecting and communicating with all neighboring member LED security lights to synchronously control on/off, dimming and color temperature tuning performances of all linked member LED security lights.

Prior art U.S. Pat. No. 10,271,404 disclosed a hardware based technology for a linked security lighting system established by using an interface including a channel selector switch for selecting a channel to which each lighting unit will be connected. In this way a network can be created by placing the lighting units proximate to each other and selecting the same channel at the interface at each lighting unit. In general, this hardware based technology would be limited in some aspects, such as less flexibility in extending channel number when a vast network connectivity is required. The present disclosure discloses a software based technology for establishing a linkable LED security lighting system using a connectivity APP (software application) designed and loaded in a mobile phone; wherein the connectivity APP is configured with two operating processes, wherein a first operating process is to establish a data base of installed locations for all of said plurality of LED security lights with each of the plurality of LED security lights being assigned a location code for identification and for individual control, wherein a second operating process is a grouping job to divide the plurality of LED security lights into at least one group of linkable LED security lights with each group being assigned a group code applicable to each LED security light in the same group for identification and for synchronously performing same illumination; wherein the connectivity APP is wirelessly connected with each LED security light of the plurality LED security lights for generating, assigning, receiving, setting and recording at least a location code, at least a group code and or at least one universal code to each LED security light of the plurality of LED security lights, wherein the location code, the group code and or the at least one universal code are stored in a memory unit of each LED security light, wherein after the data base of installed locations for the plurality of LED security lights being fully established each LED security light displayed visually on a screen of the mobile device becomes identifiable on the connectivity APP to a user to perform a grouping or re-grouping job.

The connectivity APP is a software tool to configure a linkable structure of a plurality of LED security lights of a lighting system installed in an outdoor living space. The connectivity APP involves a necessary process including to assign a location code and a group code for each LED security light installed in the outdoor living space and to key in correspondingly a location code for each LED security light shown on the screen of the connectivity APP. The linkable structure, for instance, represented by a tree map of LED security lights interlinked and displayed visually on the connectivity APP, can be changed by modifying the location codes or the group codes to create new linkable groups of the plurality of LED security lights. Using modifiable location code assigned to each LED security light, the connectivity APP has the advantages to efficiently and almost unlimited establish a linkable LED security lighting system.

Specifically, the plurality of LED security lights of the linkable LED security lighting system are divided into N groups of member LED security lights to be linked. Each group of member LED security lights is assigned a location code to be applied to each member LED security light in the group by operating the connectivity APP for identification and communication, such that within the group the member LED security lights are interlinked preferably created via wireless control signals prefixed with a same location code transmitted thru a transceiver in each of the member LED security lights, wherein when a member LED security light first receives a sensing signal for operating an illumination mode, the member LED security light acts as a commanding member LED security light to activate all member LED security lights assigned with the same location code to operate the illumination mode, wherein upon receiving the sensing signal the controller of the commanding member LED security light operates to output a control signal to activate the illumination mode, at the same time the controller manages to wirelessly transmit an instruction signal prefixed with the location code to remotely activate at least one neighboring member LED security light with same location code to synchronously operate the illumination mode as performed by the commanding member LED security light.

It is to be noticed that the software based technology disclosed in the present disclosure has at least four advantages over the hardware based technology disclosed in the U.S. Pat. No. 10,271,404.

First, the present disclosure allows a user to expand a linking space of N groups unlimitedly at any time while the Prior Art of U.S. Pat. No. 10,271,404 is very much fixed and restricted to a limited number of selections according to a configuration of the channel selector.

Second, the connectivity APP of the present disclosure can be designed to enable a cross-group illumination option, wherein the controller of at least one selected security light is designed to be additionally responsive to at least one wireless instruction signal with a different location code transmitted from at least one separate group.

Third, the present disclosure can be designed to operate a hybrid linkable security lighting system, wherein the controller is programmed to respond to at least two wireless instruction signals including a first wireless signal with a universal code which can synchronously activate every security light in the lighting system to be turned on at dusk and to be turned off at dawn, and a second wireless signal prefixed with a location code or a group code to synchronously activate the security lights in a linkable group to perform same illumination when a security light in the linkable group first detects a motion signal.

Fourth, once a location code has been assigned and set with every security light in the lighting system and the connectivity APP, the user can easily change or modify a grouping arrangement on the connectivity APP without going to each security light for adjusting each channel selector one by one which may require using a ladder for accessing to each security light for performing manual adjustment.

Figure 10A:
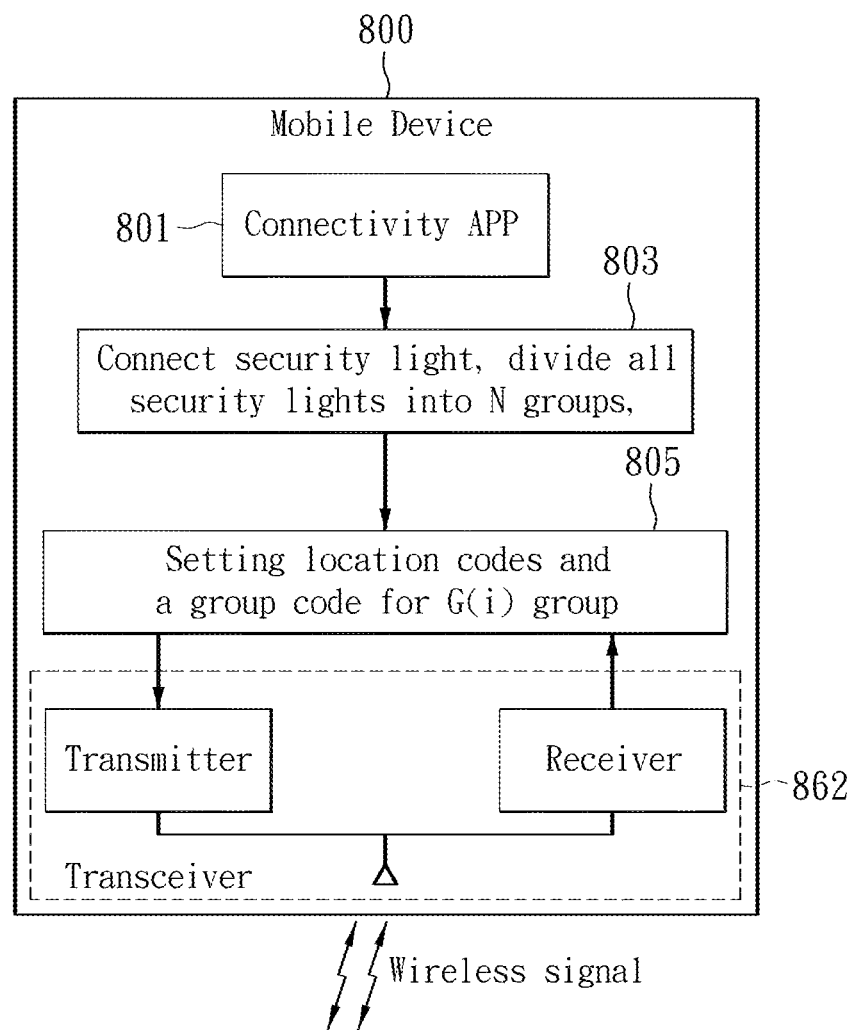
FIG. 10A illustrates a block diagram of a connectivity APP loaded in a mobile device in accordance to an exemplary embodiment of the present disclosure.
Figure 10B:
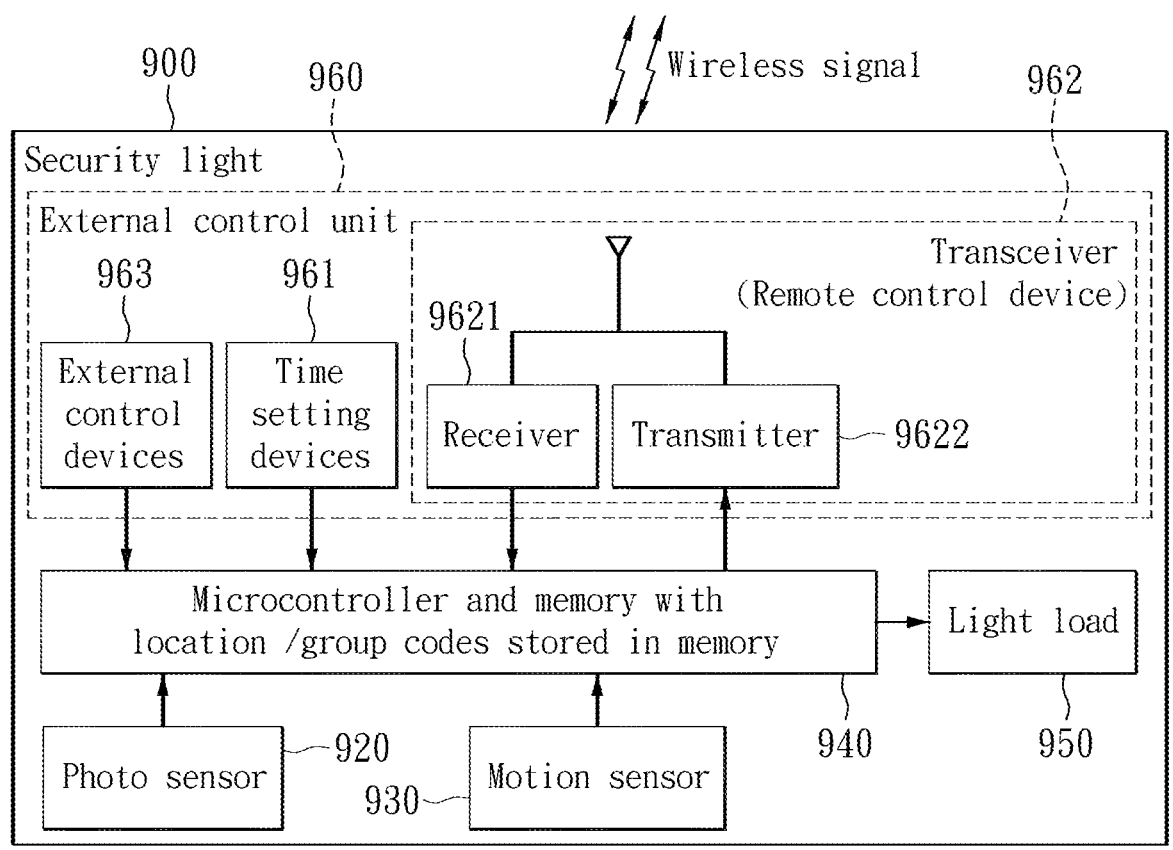
FIG. 10B illustrates a schematic diagram of an LED security light in accordance to an exemplary embodiment of the present disclosure.
Figure 10C:
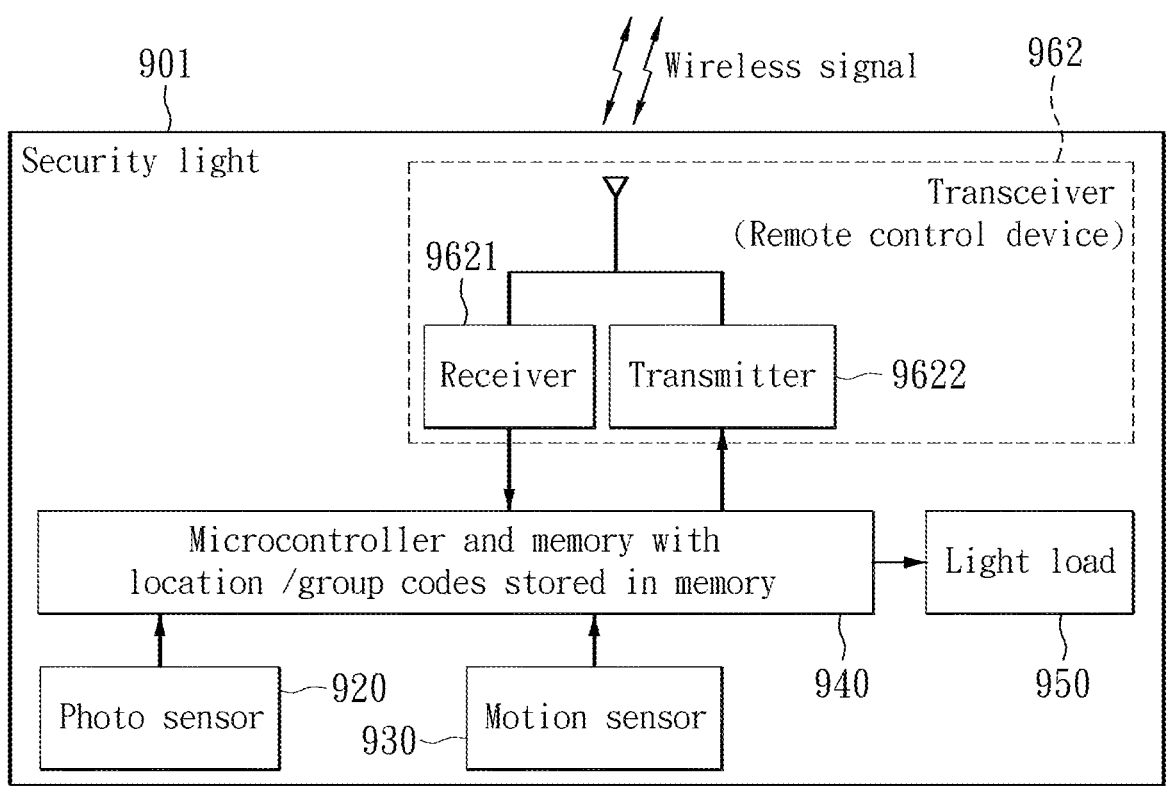
FIG. 10C illustrates a schematic diagram of another LED security light in accordance to an exemplary embodiment of the present disclosure.

Referring to FIGS. 10A, 10B, 10C and 10D which illustrate a framework for establishing a linkable security light system in accordance to an exemplary embodiment of the present disclosure. Please refer to FIG. 10A. A connectivity APP 801 is loaded in a mobile device 800, for instance, a mobile phone, for configuring a linkable structure of a plurality of LED security lights of a lighting system. The plurality of LED security lights are divided into a plurality of linkable groups 803 with each linkable group G(i) designated by a location code for each security light of G(i) group and a group code 805. The mobile device is equipped with a transceiver 862, wherein the transceiver includes a wireless transmitter and a wireless receiver, as shown in FIG. 10A, for bi-directional communications during configuring the linkable structure when operating the connectivity APP. To enable bi-directional communication, a wireless signal processed by the transceiver comprises a group code to identify a linkable group G(i), a location code to identify a single LED security light to be linked in the linkable group G(i) and an instruction code for executing an operation. The location codes and the group codes of the linkable groups are transmitted via wireless signal thru the transceiver of the mobile device to each LED security light in the linkable group. Please refer to FIG. 10B. The LED security light 900 is basically composed of a loading and power control unit 940, a light-emitting unit 950 comprising an LED light load, a plurality of sensors 920, 930, an external control unit 960 including time setting devices 961, external control devices 963 and a transceiver 962. The transceiver 962 is further composed of a receiver 9621 and a transmitter 9622. The loading and power control unit 940 including a controller and a switching circuitry, wherein the controller is preferably a microcontroller with embedded memory unit, wherein the location codes and the group codes transmitted from the connectivity APP are received by the receiver 9621 and memorized by the controller of the LED security light for coding an outgoing wireless signal and verifying an incoming wireless signal thru the transceiver of the LED security light during processing a setting of the location codes and the group codes, as shown in FIG. 10B, for enabling a linkable operation. Please further refer to FIG. 10C. The LED security light 901 is basically similar to the LED security light 900 in FIG. 10B. The only difference is that the LED security light 901 does not have external control devices and time setting devices. All the functional parameters are set thru the connectivity APP of the mobile device 800.

The location codes and the group codes of the linkable structure can be changed or modified by operating the connectivity APP for creating a new linkable structure, and the group belonging of the LED security lights is then changed accordingly. This is a great advantage of the present disclosure when rearranging a tree map of the LED security lights is required, wherein desired linked groups can be easily created and tested on a software basis without resorting to adjusting the installation positions of the LED security lights to be linked.

Figure 10D:
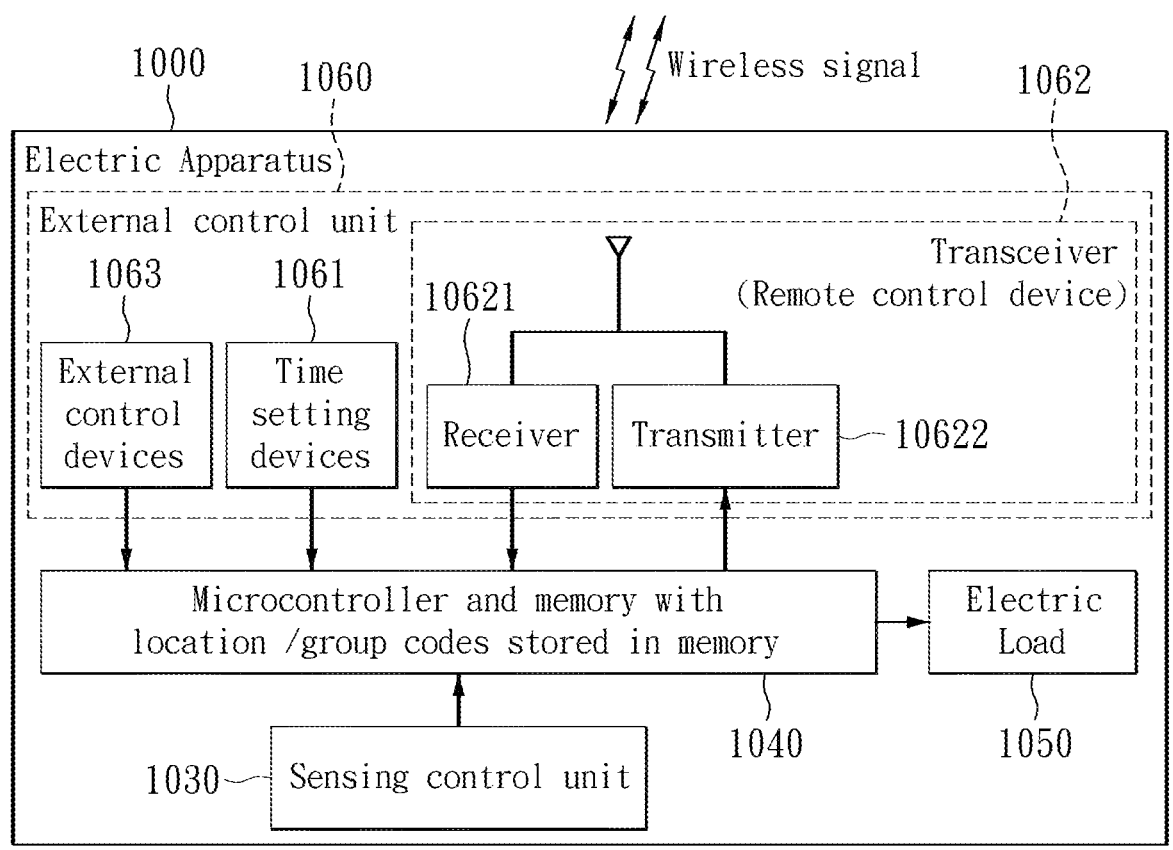
FIG. 10D illustrates a system block for establishing a linkable electric apparatuses system in accordance to a generalized exemplary embodiment of the present disclosure.

Referring to FIG. 10D which illustrates a system block 1000 for establishing a linkable electric apparatuses system. FIG. 10D shows a general block 1000 with capability to bi-directionally communicate with a connectivity APP and proximate general blocks of the same type 1000. The general block 1000 is composed of a loading and power control unit 1040, an electric load 1050, a sensing control unit 1030 and an external control unit 1060. The loading and power control unit 1040 includes a controller and a switching circuitry electrically coupled to the electric load 1050. The electric load 1050 may be an LED light load, a ceiling fan, or any electric appliance used in house. The external control unit 1060 is designed for adjusting operation parameters of the electric load 1050 and includes at least a time setting device 1061, a transceiver 1062 and at least an external control device 1063. The transceiver 1062 of the external control unit 1060 enables thru wireless signals creating a network of different electric apparatuses with different electric load types linkable and programmable by the connectivity APP.

Figure 11:
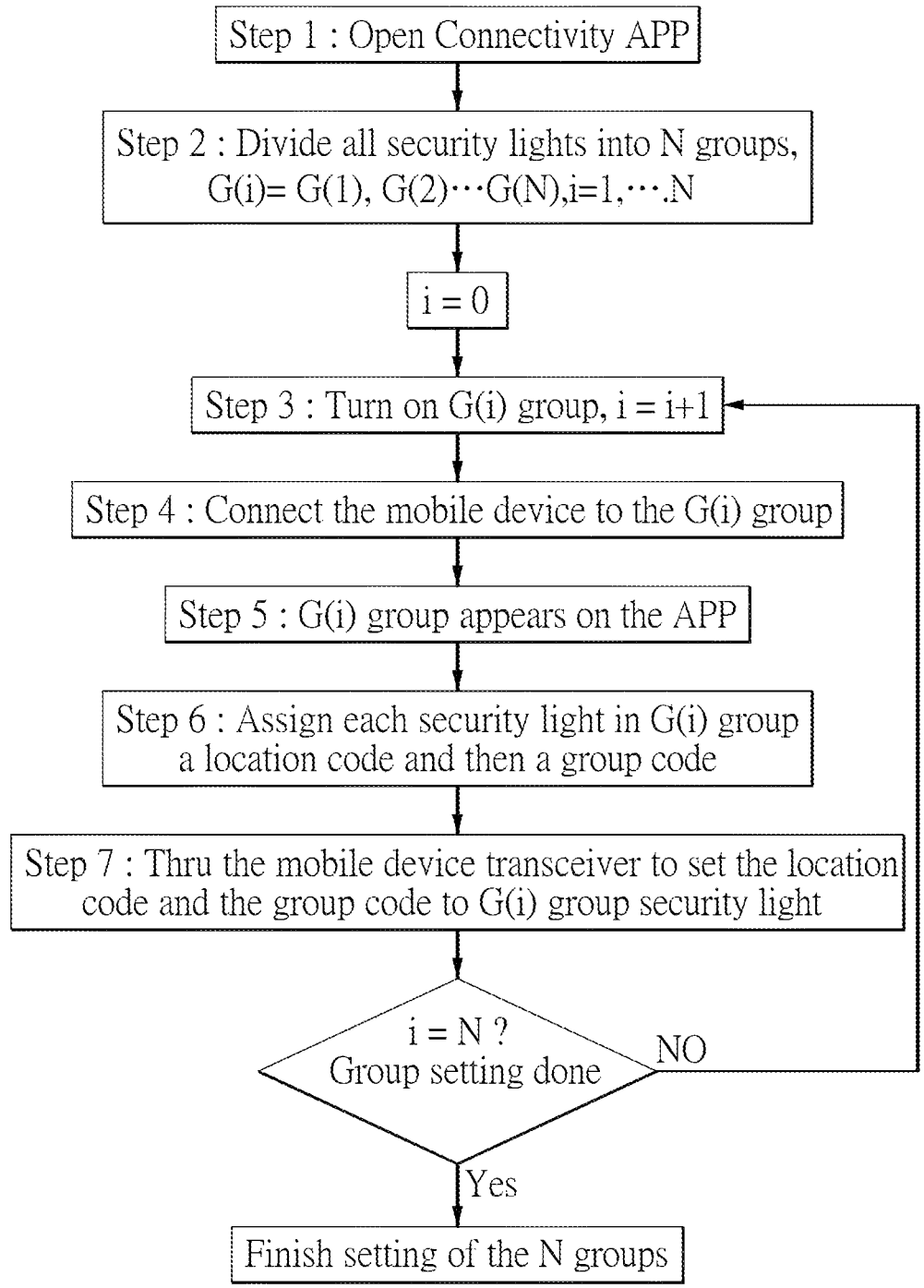
FIG. 11 illustrates a system flow chart to elucidate a method in setting identification codes for grouping and interlinking LED security light based on FIG. 10A and FIG. 10B in accordance to an exemplary embodiment of the present disclosure.

Referring to FIG. 11 in view of FIG. 10A and FIG. 10B which illustrates a system flow chart for a method for setting a location code or a group code in accordance to an exemplary embodiment of the present disclosure. The method starts with Step 1 to open the connectivity APP on the mobile phone. Then, Step 2 is to divide the plurality of LED security lights in the lighting system into N linkable groups of illumination zone with each linkable group comprising at least two LED security lights to be linked for synchronously performing same illumination options, such as, on/off control, dimming control or color temperature tuning control, triggered by various sensors. The setting of N linkable group is starting from a process index i=0. Step 3 is to turn on all LED security lights in a first linkable group G(i), wherein i=1. Step 4 is thru wireless signal transmitted from a transceiver 862, as shown in FIG. 10A, to wirelessly connect the connectivity APP 801 to a first linkable group of selected LED security lights 900, wherein G(i)=G(1). Step 5 is to display the selected LED security lights in G(i) group to appear on APP control page of a mobile phone. Step 6 is to assign identification codes to the first linkable group of selected LED security lights with each of the selected LED security lights being assigned a location code and a first group code. Step 7 is for transmitting the location code and the first group code thru wireless signal transmitted from the transceiver to each LED security light in the first linkable group G(i), wherein the location code and the first group code are received and memorized by a controller, being a microcontroller 940 as shown in FIG. 10B, of the LED security light for coding an outgoing wireless signal and verifying an incoming wireless signal for enabling a linkable operation. After completing the setting of the first group code for the first linkable group and after checking the process index i≠N, the process resumes to Step 3 for setting a second group code for a second group of selected LED security lights thru Step 7. The recurring process continues till all N linkable groups and all LED security lights have completed setting of relevant location and group codes for identification and communication. When a plurality of selected LED security lights in a linkable group are interlinked, each LED security light installed at different locations around an outdoor living area can perform both roles of being a commander as well as being a follower to synchronously perform on/off control, dimming control or color temperature tuning control.

Figure 12:
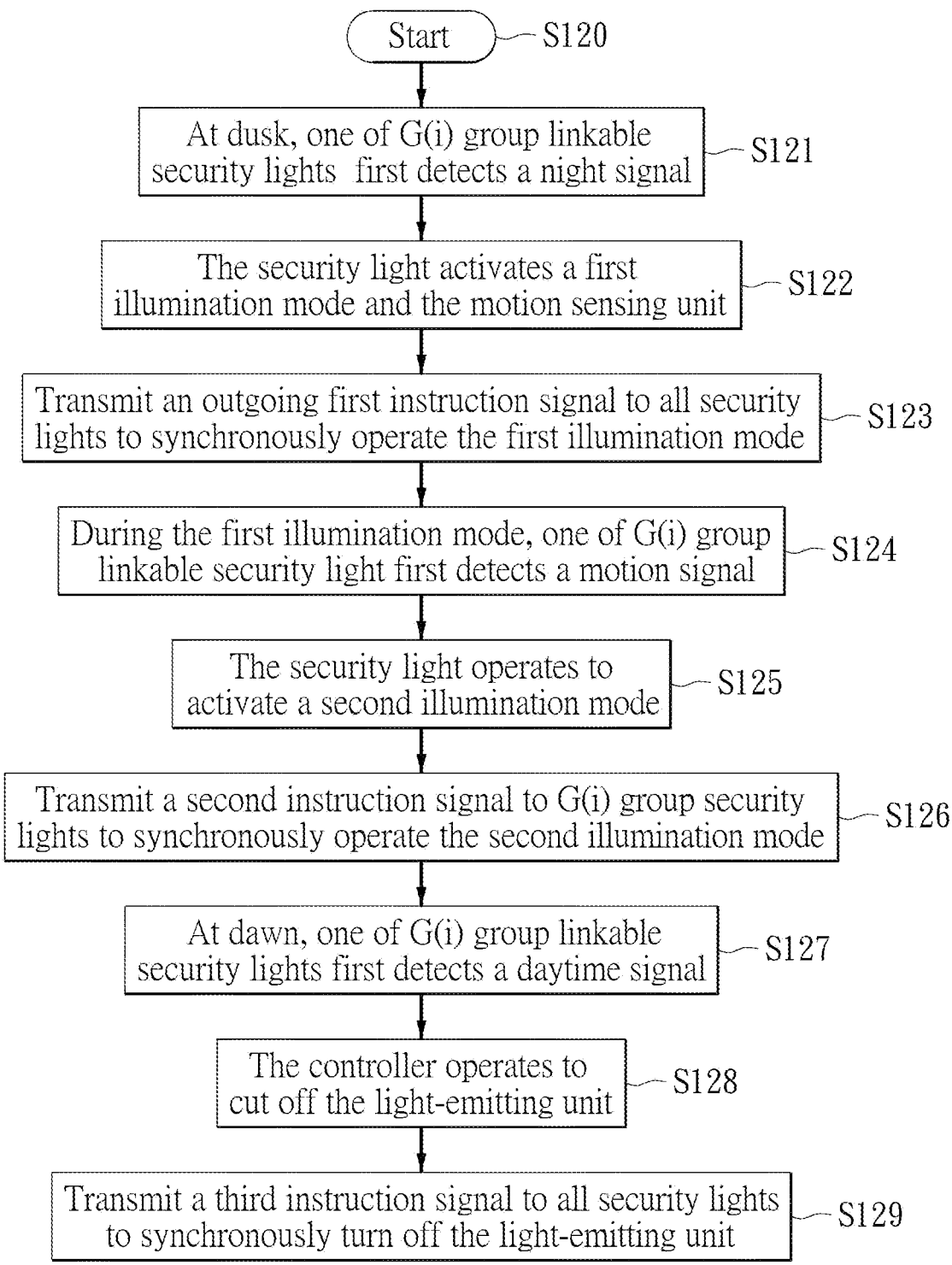
FIG. 12 illustrates a flow chart to elucidate a system dynamic for operating a linkable LED security lighting system based on FIG. 10A and FIG. 10B in accordance to an exemplary embodiment of the present disclosure.

Referring to FIG. 12 in view of FIG. 10A and FIG. 10B in accordance to an exemplary embodiment of the present disclosure which uses a block diagram to briefly illustrate a system dynamic for configuring and operating a linkable LED security lighting system following a completion of setting all location codes for all LED security lights in the system flow chart FIG. 11.

At dusk when a light sensing control unit 920 of one of the plurality of LED security lights in a linkable group first detects a night time signal (S121), in other words, the ambient light of the operating location detected by the light-sensing control unit being lower than a first predetermined value, the LED security light is responsively switched for operating a low level illumination mode to perform a low level illumination (S122), and at the same time the LED security light acts as a commanding LED security light to activate all LED security lights in the linkable group, each recognizable with same group code of the one of the commanding LED security light, as followers in the lighting system to synchronously operate the low level illumination mode to perform the low level illumination, wherein a controller of the commanding LED security light operates to output a first wireless signal prefixed with a universal code recognizable by the LED security lights in the linkable group, wherein the LED security lights in the linkable group are activated to synchronously operate the low level illumination mode to perform the low level illumination (S123); wherein during a performance of the low level illumination mode when an LED security light in a linkable group first detects a motion signal thru a motion sensor (S124), the LED security light accordingly is switched to a motion sensor mode for operating a high level illumination for a preset time length and then resuming to the low level illumination (S125), and at the same time the LED security light acts as a commanding LED security light to order all linked LED security lights in the linkable group to temporarily switch to activate the motion sensor mode to perform a high level illumination for the preset time length before resuming to the low level illumination mode (S126), wherein the commanding LED security light operates to transmit a second wireless signal coded with a group code of the one of the commanding LED security light thru the transceiver recognizable by the LED security lights assigned with the same group code in the linkable group, wherein the LED security lights in the linkable group are activated synchronously to operate the motion sensor mode.

At dawn when a light sensing control unit of an LED security light in the lighting system first detects a daytime signal meaning the ambient light detected by the light sensing control unit being higher than a second predetermined value (S127), the LED security light acts as a commanding LED security light to synchronously deactivate the plurality of LED security lights in the lighting system; wherein the controller of the commanding LED security light operates to stop outputting the first wireless signal and the second wireless signal to turn off the light-emitting units (S128), at the same time the controller of the commanding LED security light operates to generate and transmit thru the transceiver a third wireless signal coded with a universal code to deactivate at least one LED security light to turn off the at least one LED light-emitting unit (S129).

The above disclosed embodiments and technologies are able to provide home owners with a 360 degree illumination surrounding a house for a great security protection as all linked member LED security lights can brighten instantly at the same time when a motion intrusion at any spot is detected by one of the plurality of member LED security lights. If the home owner does not need a full surrounding illumination the home owner can simply manage to divide the plurality of member LED security lights into linked group and non-linked group such that a partial surrounding illumination can be performed by the linked group of member LED security lights while the non-linked group of LED security lights simply operate the two-level illumination individually and independently. The technology of connectivity APP is not limited to the application of the linkable outdoor security lighting system working with photo sensor and or motion sensor. In fact, it can also be used to generally replace traditional channel selection switch for remotely controlling individual light or grouped lights among a plurality of lights, or individual ceiling fan or grouped ceiling fans installed in a living space; similar processes may be employed to create a location code, a group code and/or at least one universal code as a communication medium for executing a control decision of a lighting control decision between a connectivity APP designed and loaded in a mobile device such as mobile phone and each of the plurality of lights and or ceiling fans, wherein said location code is used for controlling only one lighting device or one ceiling fan, wherein said group code is used for controlling all lighting devices or ceiling fans in the same group, wherein said at least one universal code is used for controlling all lighting devices or ceiling fans.

Referring again to FIG. 11 in view of FIG. 10A and FIG. 10B which illustrates a system flow chart for a method for setting a location code and a group code in accordance to an exemplary embodiment of the present disclosure. The method starts with Step 1 to open the connectivity APP on the mobile phone. Then, Step 2 is to divide the plurality of LED security lights or ceiling fans in the lighting and/or ceiling system into N linkable groups of operating zone with each linkable group comprising at least one member LED light, at least one ceiling fan or both to be individually operating a performance or to be linked for synchronously performing same illumination options, such as, on/off control, dimming control or speed control. The setting of N linkable group is started from a process index i=0. Step 3 is to turn on the at least one LED light or at least one ceiling fan in a first round selection, wherein i=1. Step 4 is thru wireless signal transmitted from a transceiver of the mobile phone to wirelessly connect the connectivity APP to the first round selection of the at least one LED light or the at least one ceiling fan, wherein G(i)=G(1). Step 5 is to display the at least one LED light or the at least one ceiling fan to appear on APP control page of the mobile phone. Step 6 is to assign a location code and a first group code to the first round selection of the at least one LED light or the at least one ceiling fan with the at least one LED light or the at least one ceiling fan being assigned the first group code. Step 7 is for transmitting the first group code thru wireless signal transmitted from the transceiver to the at least one LED light or the at least one ceiling fan in the first round selection, wherein the first group code is received and memorized by a controller, being a microcontroller shown in FIG. 10B, of the at least one LED light or the at least one ceiling fan for coding an outgoing wireless signal and verifying an incoming wireless signal for enabling an individual or a linkable synchronous performance. After completing the setting of the first group code for the first round selection and after checking the process index i≠N, the process resumes to Step 3 for setting a second group code for a second round selection of at least one LED light or at least one ceiling fan thru Step 7. The recurring process continues till all N groups and all LED lights or all ceiling fans have completed settings of relevant location codes for identification and communication. When a plurality of selected member LED lights or member ceiling fans in a linkable group are interlinked, each member LED light or each member ceiling fan installed at different locations around a living area can perform both roles of being a commander as well as being a follower to synchronously perform on/off control, dimming control, speed control or color temperature tuning control.

When each linkable item of said plurality of lights or ceiling fans is designed with a transmittable item code to identify itself, each linkable item may become identifiable by its unique item code on the connectivity APP when connected, a software can be further developed to make each linkable item further controllable on a screen of the connectivity APP. However, it is still missing a location information for each linkable item and therefore a user is still not able to meaningfully make use of such information on the screen of the connectivity APP. A satellite positioned system, such as GPS with map, may be employed to generate a location information for each linkable item shown on the screen of the connectivity APP such that a user can respectively control a functional performance of each linkable item on the connectivity APP. However, it is to be noticed that people tends to control illumination performance in a living space by area not item by item. Therefore, the same process as the above described is still needed and the connectivity APP can be designed with a capacity to divide the plurality of lights or ceiling fans into different linked groups to be respectively assigned a group code. The user may touch on a touch panel displaying the connectivity APP to select the lights or ceiling fans to be linked in each group and push a setting button to wirelessly assign a unique group code to each member light or member ceiling fan in the same group to synchronously operate same illumination performance.

The above mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An LED security lighting system including at least one LED security light comprising at least:
 a light-emitting unit, including at least one LED load configured with a plurality of LEDs emitting light with at least one color temperature in a color temperature range between 2000K and 6500K;
 a loading and power control unit;
 a light sensing control unit;
 a motion sensing unit;
 an external control unit comprising at least a wireless remote control device configured with at least a wireless signal receiver; and
 a power supply unit;
 wherein said loading and power control unit comprises a controller and a switching circuitry, wherein said controller is electrically coupled with said light sensing control unit, said motion sensing unit, said switching circuitry and at least said wireless remote control device, wherein said switching circuitry is electrically connected with a power source of said power supply unit and said light-emitting unit to control and output an electric power to said light-emitting unit, wherein said switching circuitry comprises at least one semiconductor switching device, wherein said controller outputs at least one control signal to control at least one conduction rate of said at least one semiconductor switching device to enable said switching circuitry to deliver different electric powers from said power source to said light-emitting unit for generating different illuminations characterized by at least different light intensities according to signals respectively received from said light sensing control unit, said motion sensing unit and at least said wireless remote control device;

wherein at dusk when said light sensing control unit detects a night time signal defined as an ambient light detected by said light sensing control unit being lower than a first predetermined value, said loading and power control unit operates said switching circuitry to deliver an electric power to said light-emitting unit to perform a first illumination mode to generate a first level illumination for a first predetermined time duration, wherein when a motion signal is detected by said motion sensing unit, said loading and power control unit responsively operates said switching circuitry to increase said electric power delivered to said light-emitting unit to perform a second illumination mode to generate a second level illumination for a second predetermined time duration, wherein a light intensity of said second level illumination is higher than a light intensity of said first level illumination, wherein at dawn when said light sensing control unit detects a day time signal defined as said ambient light detected by said light sensing control unit being higher than a second predetermined value, said loading and power control unit respectively operates to switch off said light-emitting unit;

wherein at least said wireless remote control device is electrically coupled with said controller to receive and convert at least one wireless instruction signal into an operating variable interpretable to said controller, wherein said controller further comprises at least one subroutine for processing said operating variable and adjusting a control signal for performing at least one operating parameter according to said operating variable received from said wireless signal receiver, wherein said operating variable represents a setting decision of a capacity operating rate for each functional performance of each of said at least one operating parameter of said at least one LED security light by a user thru an APP (software application) loaded in a user's mobile device for adjusting and setting at least one operating parameter of said at least one LED security light, wherein said at least one operating parameter is at least one lighting characteristic of said at least one LED security light including at least time length settings, light intensity settings, color temperature settings, detection range settings, signal frequency range or signal format settings for screening, accepting, responding and processing said at least one wireless instruction signal characterized with the same signal frequency range or the same signal format;

wherein a configuration of said plurality of LEDs of said at least one light-emitting unit is designed with a combination of in series and/or in parallel connections such that when incorporated with a level setting of a DC power for driving said at least one LED load, an electric current passing through each LED of said at least one LED load remains at a level such that a voltage V across each LED complies with an operating constraint of $V_{th}<V<V_{max}$ featuring an electrical characteristic of each LED, wherein $V_{th}$ is a reference value of a threshold voltage required to trigger each LED to emit light and $V_{max}$ is a reference value of a maximum operating voltage across each LED at which at least one LED construction in said plurality of LEDs is vulnerable to a thermal damage;

wherein when said at least one LED load of said light-emitting unit is configured with N pieces of LEDs electrically connected in series or N sets of in parallel connected LEDs electrically connected in series, a working voltage $V_N$ imposed on said at least one LED load for driving said plurality of LEDs is confined in a domain between a minimum voltage equal to a sum of each of said threshold voltages of all LEDs electrically connected in series or sets of in parallel connected LEDs electrically connected in series and a maximum voltage equal to a sum of each of all said maximum operating voltages of all LEDs electrically connected in series or sets of in parallel connected LEDs electrically connected in series, expressed by $N \times V_{th} < V_N < N \times V_{max}$, wherein N is a positive integer.

2. The LED security lighting system including at least one LED security light according to claim 1, wherein when said plurality of LEDs are white light LEDs produced by coating at least one phosphor compound on surfaces of LEDs, said reference value of said threshold voltage Vth is estimated at 2.5 volts and said reference value of said maximum operating voltage is estimated at 3.5 volts subject to an operating condition that a temperature of each LED is controlled at or below 80 degrees centigrade, wherein said voltage V across each LED of said N pieces of LEDs complies with an operating constraint of 2.5 volts<V<3.5 volts and said working voltage $V_N$ imposed on said at least one LED load is thereby confined in a domain expressed by $N \times 2.5$ volts$<V_N<N \times 3.5$ volts.

3. The LED security lighting system including at least one LED security light according to claim 1, wherein said at least one LED security light working in conjunction with said mobile device is designed with an on line free setting method for setting at least one operating parameter of said at least one LED security light, comprising:

a user interface APP (software application) comprising at least one free setting algorithm loaded in said mobile device to make and transform at least one user's setting decision into at least one operating variable;

wherein when said user interface APP is activated and concluded with said at least one user's setting decision, said user interface APP manages to transmit via said mobile device at least one wireless instruction signal carrying at least one message of said at least one operating variable to said at least one LED security light, wherein said at least one operating variable is used for processing or setting said at least one operating parameter of said at least one LED security light, or for activating a pick and play process for selecting an illumination performance mode in an illumination performance switching scheme programmed in said controller.

4. The LED security lighting system including at least one LED security light according to claim 3, wherein said user interface APP is operable on a touch screen panel of said mobile device, wherein said free setting algorithm is a capacity scale simulation process implemented by a visual configuration of a free setting operator incorporated with a capacitor scale simulator and an indicator of said capacity operating rate to facilitate making said at least one user's setting decision in setting at least one desired level of said at least one operating parameter, wherein when said free setting operator is activated by said user to interact with said capacity scale simulator, said user interface APP responsively manages to gradually adjust a value of said capacity operating rate according to an instantaneous state of interaction between said free setting operator and said capacity scale simulator with said indicator of said capacity operating rate simultaneously showing said instantaneous state of said capacity operating rate, wherein said capacity operating rate shown in said indicator can be an operating percentage, an operating chart or an actual operating value of a relevant operating parameter or an illumination performance mode of an illumination performance switching scheme comprising a plurality of different illumination performance modes, wherein when a free setting motion of said free setting operator is ceased with at least one setting decision, the user interface APP manages to generate said at least one operating variable corresponding to a selection of said at least one capacity operating rate and accordingly operates to transmit said at least one wireless instruction signal carrying said at least one message of said operating variable to said at least one LED security light for setting a relevant operating parameter or for selecting a relevant illumination performance mode programmed in said controller.

5. The LED security lighting system including at least one LED security light according to claim 4, wherein said capacity scale simulator is a virtual track, wherein said virtual track is configured with a linear virtual track or an arc virtual track, wherein said free setting algorithm is implemented by operating said free setting operator to interact with said virtual track and said indicator of said capacity operating rate, wherein said free setting operator is slidable by said user's finger along said virtual track with said indicator of said capacity operating rate simultaneously showing said instantaneous state of said capacity operating rate while said sliding motion of said free setting operator is being conducted, wherein said state shown in said indicator of said capacity operating rate can be an operating percentage, an operating chart or an actual operating value of said relevant operating parameter or a selection of said illumination performance mode in said illumination performance switching scheme, wherein a full length of said virtual track represents a simulation of a value of said maximum operating capacity of said at least one operating parameter, wherein said capacity operating rate is determined by a parking location of said free setting operator on said virtual track when said sliding motion stops; wherein said capacity scale simulator is further designed with at least one capacity operating rate switching scheme comprising N different capacity operating rates with each capacity operating rate corresponding to a parking location on said virtual track, wherein N is a positive integer.

6. The LED security lighting system including at least one LED security light according to claim 4, wherein said capacity scale simulator is a capacity operating rate running process of said at least one capacity operating rate switching scheme comprising N different capacity operating rate, wherein N is a positive integer, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein when said virtual button is continuously touched by a user's finger or a touch pen, said free setting algorithm operates to activate said capacity operating rate running process of said at least one capacity operating rate switching scheme to stepwisely increase said capacity operating rate from a minimum level to a maximum level, or to stepwisely decrease said capacity operating rate from said maximum level to said minimum level, or to increase stepwisely from said minimum level to said maximum level and then to decrease stepwisely from said maximum level to said minimum level to complete a full running cycle of said capacity operating rate running process of said at least one capacity operating rate switching scheme; wherein during said capacity operating rate running process said instantaneous state of said capacity operating rate is simultaneously shown in said indicator of said capacity operating rate, wherein said instantaneous state of said capacity operating rate can be said operating percentage, said operating chart, said operating value or said actual functional performance of said relevant operating parameter, wherein at the moment when said user's finger or said touch pen is removed from said virtual button, said capacity operating rate running process is instantly ceased with said capacity operating rate thereby being locked in at said instantaneous level of said last step of said capacity operating rate running process.

7. The LED security lighting system including at least one LED security light according to claim 4, wherein said capacity scale simulator is a capacity operating rate running process of said at least one capacity operating rate switching scheme comprising N different capacity operating rate, wherein N is a positive integer, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein each time when said virtual button is clicked, said free setting algorithm operates to alternately pick and play a corresponding capacity operating rate according to a sequential order of a clicking motion with an increasing pattern or with a decreasing pattern of said N different capacity operating rates in said at least one capacity operating rate switching scheme, or according to a running cycle performance from a minimum level of said capacity operating rate to increase stepwisely to a maximum level of said capacity operating rate and then from said maximum level of said capacity operating rate to decrease stepwisely to said minimum level of said capacity operating rate to complete said running cycle performance of said capacity operating rate switching scheme.

8. The LED security lighting system including at least one LED security light according to claim 4, wherein said capacity scale simulator is a virtual keyboard, wherein said virtual keyboard is configured with N virtual keys representing said free setting operator operable and selectable by said user, wherein each virtual key is indicated with a corresponding capacity operating rate easily recognizable by said user, wherein when a virtual key is clicked by said user, said capacity operating rate is determined by said free setting algorithm, wherein when a setting decision is concluded, said user interface APP (software application) manages to generate said at least one operating variable corresponding to a selection of said at least one capacity operating rate in said at least one capacity operating rate switching scheme and accordingly operates to transmit said at least one wireless instruction signal carrying said at least one message of said operating variable to said LED security light for setting said at least one operating parameter.

9. The LED security lighting system including at least one LED security light according to claim 4, wherein said capacity scale simulator is a capacity operating rate running process of said at least one capacity operating rate switching scheme comprising N different capacity operating rates, wherein N is a positive integer, wherein said free setting operator is a touch sensor configured with a sensing zone designed in a neighborhood of said indicator of said capacity operating rate on said touch screen panel of said mobile device, wherein said free setting algorithm is implemented by said touch sensor interacting with said capacity operating rate running process of said at least one capacity operating rate switching scheme and said indicator of said capacity operating rate; wherein when said user touches said sensing zone of said touch sensor to operate a forward slide on said touch screen panel of said mobile device, said free setting algorithm responsively operates to alternately select a next higher capacity operating rate according to a sequence of an increasing pattern of said N different capacity operating rates in said at least one capacity operating rate switching scheme, wherein when said user touches said sensing zone of said touch sensor to operate a backward slide on said touch screen panel of said mobile device, said free setting algorithm responsively operates to alternately select a next lower capacity operating rate according to a sequence of a decreasing pattern of said N different capacity operating rates in said at least one capacity operating rate switching scheme.

10. The LED security lighting system including at least one LED security light according to claim 3, wherein said free setting algorithm of said user interface APP comprises a voice recognition software to transform a voice instruction of said user's setting decision into at least one operating variable of said at least one operating parameter of said at least one LED security light and convert said at least one operating variable into said at least one wireless instruction signal for transmitting to said wireless signal receiver of said at least one LED security light.

11. The LED security lighting system including at least one LED security light according to claim 1, wherein said mobile device is a mobile phone, a pad, a PDA, a notebook, a smart watch, a smart speaker or a remote controller, featured with a capacity to download a user interface APP from an Internet or a cloud server for controlling and setting said at least one operating parameter of said at least one LED security light.

12. The LED security lighting system including at least one LED security light according to claim 1, wherein said wireless signal receiver is a Wi-Fi wireless signal receiver, a Blue Tooth wireless signal receiver, a Zig Bee wireless signal receiver or a RF wireless signal receiver.

13. The LED security lighting system including at least one LED security light according to claim 1, wherein said at least one operating parameter is a timer for performing a manual override illumination mode to temporarily deactivate said motion sensing unit, wherein said at least one LED security light is controlled by said light sensing control unit and said timer for performing a general illumination mode with said motion sensor being temporarily disabled.

14. The LED security lighting system including at least one LED security light according to claim 1, wherein said at least one operating parameter is a time length timer or a clock time timer for converting said at least one security light from operating a motion sensing illumination mode to operating a general illumination mode or from operating said general illumination mode to operating said motion sensing illumination mode controlled by said light sensing control unit, said time length timer or said clock time timer.

15. The LED security lighting system including at least one LED security light according to claim 1, wherein said LED security lighting system is configured with at least two LED security lights, wherein each wireless remote control device of said at least two LED security lights is further installed with a wireless signal transmitter to wirelessly transmit at least a first instruction signal, a second instruction signal and a third instruction signal, wherein said first instruction signal represents said nighttime signal detected by said light sensing control unit, wherein said second instruction signal represents said motion signal detected by said motion sensing unit, wherein said third instruction signal represents said daytime signal detected by said light sensing control unit;

wherein when said controller of one of said at least two LED security lights first receives said nighttime signal, said controller operates to output said at least one control signal to conduct said switching circuitry to deliver a first electric power to said light-emitting unit to perform said first illumination mode to generate said first level illumination for said first predetermined time duration, at the same time said controller of said at least one LED security light manages to wirelessly transmit said first instruction signal thru said wireless transmitter to at least one neighboring LED security light to perform said first illumination mode to generate said first level illumination for said first predetermined time duration;

wherein when said controller receives said motion signal, said controller operates to increase said conduction rate of said switching circuitry to increase said first electric power delivered to said light-emitting unit to perform said second illumination mode to generate said second level illumination for said second predetermined time duration and simultaneously said controller operates to wirelessly transmit said second instruction signal thru said transmitter to said at least one neighboring LED security light to perform said second illumination mode to generate said second level illumination for said second predetermined time duration;

wherein when said controller receives said daytime signal, said controller operates to switch off said light-emitting unit and simultaneously said controller operates to wirelessly transmit said third instruction signal to said at least one neighboring LED security light to simultaneously switch off said light-emitting unit of said at least one neighboring LED security light.

16. The LED security lighting system including at least one LED security light according to claim 1, wherein said LED security lighting system further includes at least one LED lighting device comprising a light-emitting unit configured with at least one LED load emitting light with a first color temperature, a power supply unit, a loading and power control unit and a remote control device configured with at least a wireless signal receiver; wherein said loading and power control unit of said at least one LED lighting device comprises a controller and a switching circuitry, wherein said controller is electrically coupled with said switching circuitry and at least said wireless remote control device, wherein said switching circuitry is electrically connected with a power source of said power supply unit and said light-emitting unit to control and output an electric power delivered to said light-emitting unit, wherein said power source is a DC power outputting a constant current, wherein said switching circuitry comprises at least one semiconductor switching device, wherein said controller outputs a control signal to control a conduction rate of said at least one semiconductor switching device for delivering different electric powers from said power source to said light-emitting unit for generating different illuminations characterized by different light intensities according to different instruction signals received from said wireless signal receiver of at least said wireless remote control device;

wherein when said controller of an LED lighting device of said at least one LED lighting device receives a first instruction signal being said nighttime signal from a neighboring LED security light of said at least one LED security light thru said wireless signal receiver of said LED lighting device, said controller operates to conduct said switching circuitry to perform said first illumination mode to generate said first level illumination for said first predetermined time duration, wherein when said controller receives a second instruction signal being said motion signal from said wireless signal receiver, said controller operates said switching circuitry to perform said second illumination mode to generate said second level illumination for said second predetermined time duration, wherein when said controller receives a third instruction signal being said daytime signal, said controller operates to turn off said at least one LED lighting device.

17. The LED security lighting system including at least one LED security light according to claim 1, wherein said first predetermined time duration is ended at a time point when said controller receives the daytime signal at dawn.

18. The LED security lighting system including at least one LED security light according to claim 1, wherein said power source is an AC power source, wherein said at least one semiconductor switching device is a bidirectional semiconductor switching device, wherein said controller outputs a zero-crossing point time delay pulse to control a conduction rate of said bidirectional semiconductor switching device in each half cycle of AC power, wherein said switching circuitry outputs a phase-cut AC power delivered to said light-emitting unit, wherein said light-emitting unit is designed with a capacity to convert said phase-cut AC power into a DC power with a corresponding constant current for driving said at least one LED load.

19. The LED security lighting system including at least one LED security light according to claim 18, wherein said light-emitting unit is an LED bulb comprising an LED driver circuitry electrically connected with said at least one LED load, wherein said LED driver circuitry is configured with at least a rectifier and a constant current control circuit to output said DC power with said corresponding constant current.

20. The LED security lighting system including at least one LED security light according to claim 19, wherein said LED bulb is configured with a first LED load emitting light with a first color temperature in a range between 2000K and 3000K and a second LED load emitting light with a second color temperature in a range between 4000K and 6500K respectively connected to said LED driver circuitry, wherein said LED driver circuitry further includes a second controller designed with a capacity to operate a power allocation of said DC power converted from said phase-cut AC power between said first LED load and said second LED load, wherein when a first phase-cut AC power is received when said light-emitting unit is in a cutoff state said LED driver circuitry operates to deliver said DC power to said first LED load to perform said first level illumination with said first color temperature for said first predetermined time duration, wherein when a second phase-cut AC power is received when said light-emitting unit is in a state of performing said first level illumination with said first color temperature, said LED driver circuitry operates to switch said DC power to said second LED load to perform said second level illumination with said second color temperature for said predetermined time duration before switching back to said first LED load to resume said first level illumination with said first color temperature.

21. The LED security lighting system including at least one LED security light according to claim 1, wherein said power source is a DC power source with a constant current, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power source.

22. The LED security lighting system including at least one LED security light according to claim 1, wherein said power source is an AC power source connected with an AC/DC power converter with a constant current control circuit to output a DC power with a constant current to said switching circuitry, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power.

23. The LED security lighting system including at least one LED security light according to claim 1, wherein said at least one operating parameter is said light intensity of said first level illumination.

24. The LED security lighting system including at least one LED security light according to claim 1, wherein said at least one operating parameter is said light intensity of said second level illumination.

25. The LED security lighting system including at least one LED security light according to claim 1, wherein said at least one operating parameter is a detection sensitivity of said motion sensing unit.

26. The LED security lighting system including at least one LED security light according to claim 1, wherein said at least one operating parameter is a color temperature of said first level illumination or said second level illumination; wherein said light-emitting unit includes a first LED load emitting light with a first color temperature in a range between 2000K and 3000K and a second LED load emitting light with a second color temperature in a range between 4000K and 6500K, wherein said first LED load and said second LED load are electrically connected and covered by a light diffuser to create an effect of a mingled light color temperature; wherein said switching circuitry includes at least a first semiconductor switching device and a second semiconductor switching device respectively connected to said first LED load and said second LED load, wherein said controller outputs a first control signal to control a first conduction rate of said first semiconductor switching device to deliver a first electric power to said first LED load and a second control signal to control a second conduction rate of said second semiconductor switching device to deliver a second electric power to said second LED load to create said mingled light color temperature;

wherein said controller operates a power allocation algorithm to reversely and complementarily adjust said first conduction rate of said first semiconductor switching device and said second conduction rate of said second semiconductor switching device for tuning said mingled light color temperature of said first level illumination or said second level illumination; wherein for tuning said mingled light color temperature to a lower mingled light color temperature said controller operates to increase said first conduction rate of said first semiconductor switching device to increase said first electric power delivered to said first LED load and simultaneously operate to decrease said second conduction rate of said second semiconductor switching device to decrease said second electric power delivered to said second LED load with the same pace such that a total light intensity generated by said light-emitting unit remains unchanged while said mingled light color temperature is accordingly adjusted to said lower mingled light color temperature; wherein for tuning said mingled light color temperature to a higher mingled light color temperature said controller operates to decrease said first conduction rate of said first semiconductor switching device to decrease said first electric power delivered to said first LED load and simultaneously operate to increase said second conduction rate of said second semiconductor switching device to increase said second electric power delivered to said second LED load with the same pace such that said total light intensity generated by said light-emitting unit remains unchanged while said mingled light color temperature is accordingly adjusted to said higher mingled light color temperature;

wherein said controller is designed with at least one mingled light color temperature switching scheme comprising a plurality of different mingled light color temperature performances with each mingled light color temperature performance being operated with a paired combination of said first conduction rate and said second conduction rate controlled by said power allocation algorithm for tuning and switching said mingled light color temperature of said first level illumination or said second level illumination, wherein said controller in response to said at least one wireless instructional signal of said at least one operating variable received from said wireless signal receiver operates a pick and play process to select a corresponding mingled light color temperature performance in said at least one color temperature switching scheme.

27. The LED security lighting system including at least one LED security light according to claim 1, wherein said at least one operating parameter is a time length of said first predetermined time duration.

28. The LED security lighting system including at least one LED security light according to claim 1, wherein said at least one operating parameter is a time length of said second predetermined time duration.

29. An LED security lighting system including at least one LED security light comprising at least:

a light-emitting unit, including at least one LED load configured with a plurality of LEDs emitting light with at least one color temperature in a color temperature range between 2000K and 6500K;

a loading and power control unit;

a light sensing control unit;

a motion sensing unit;

a wireless remote control device configured with at least a wireless signal receiver; and a power supply unit;

wherein said loading and power control unit comprises a controller and a switching circuitry, wherein said controller is electrically coupled with said light sensing control unit, said motion sensing unit, said switching circuitry and said wireless remote control device, wherein said switching circuitry is electrically connected with a power source of said power supply unit and said light-emitting unit to control and output an electric power delivered to said light-emitting unit, wherein said switching circuitry comprises at least one semiconductor switching device, wherein said controller outputs a control signal to control at least one conduction rate of said at least one semiconductor switching device for delivering different electric powers from said power source to said light-emitting unit for generating different illuminations characterized by different light intensities according to signals respectively received from said light sensing control unit, said motion sensing unit and said wireless remote control device;

wherein at dusk when said light sensing control unit detects a nighttime signal defined as an ambient light detected by said light sensing control unit being lower than a first predetermined value, said loading and power control unit responsively operates to activate said motion sensing unit with said at least one LED security light remaining in a turned off state; wherein when a motion signal is detected by said motion sensing unit, said controller responsively operates said switching circuitry to deliver a first electric power to said light-emitting unit to perform a first illumination mode to generate a first level illumination for a first predetermined time duration, wherein a light intensity of said first level illumination is designed in a range being greater than zero but less than or equal to a maximum light intensity designed for said at least one LED security light; wherein at dawn when said light sensing control unit detects a daytime signal defined as said ambient light detected by said light sensing control unit being higher than a second predetermined value, said loading and power control unit respectively operates to switch off said at least one LED security light;

wherein said wireless remote control device is electrically coupled with said controller to receive and convert at least one wireless instruction signal into at least one operating variable interpretable to said controller, wherein said controller further comprises at least one subroutine for processing said at least one operating variable and adjusting a control signal for performing at least one operating parameter according to said at least one operating variable received from said wireless signal receiver, wherein said at least one operating variable represents a setting decision of a capacity operating rate for each functional performance of each of said operating parameters of said at least one LED security light by a user thru an APP (software application) loaded in a user's mobile device for adjusting and setting at least one operating parameter of said at least one LED security light, wherein said at least one operating parameter is at least one lighting characteristic of said at least one LED security light including at least time length settings, light intensity settings, color temperature settings, detection range settings, signal frequency range or signal format settings for screening, accepting, responding and processing said at least one wireless instruction signal characterized by the same signal frequency range or the same signal format;

wherein a configuration of said plurality of LEDs of said light-emitting unit is designed with a combination of in series and/or in parallel connections such that when incorporated with a level setting of a DC power for driving said at least one LED load, an electric current passing through each LED of said at least one LED load remains at a level such that a voltage V across each LED complies with an operating constraint of $V_{th}<V<V_{max}$ featuring an electrical characteristic of each LED, wherein $V_{th}$ is a reference value of a threshold voltage required to trigger each LED to emit light and $V_{max}$ is a reference value of a maximum operating voltage across each LED at which at least one LED construction in said plurality of LEDs is vulnerable to a thermal damage;

wherein when said at least one LED load of said light-emitting unit is configured with N pieces of LEDs electrically connected in series or N sets of in parallel connected LEDs electrically connected in series, a working voltage $V_N$ imposed on said at least one LED load for driving said plurality of LEDs is confined in a domain between a minimum voltage equal to a sum of each of said threshold voltages of all LEDs electrically connected in series or sets of in parallel connected LEDs electrically connected in series and a maximum voltage equal to a sum of each of all said maximum operating voltages of all LEDs electrically connected in series or sets of in parallel connected LEDs electrically connected in series, expressed by $N \times V_{th} < V_N < N \times V_{max}$, wherein N is a positive integer.

30. The LED security lighting system including at least one LED security light according to claim 29, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage is estimated at 3.5 volts subject to an operating condition that a temperature of each LED is controlled at or below 80 degrees centigrade, wherein said voltage V across each LED of said N pieces of LEDs complies with an operating constraint of 2.5 volts<V<3.5 volts and said working voltage $V_N$ imposed on said at least one LED load is thereby confined in a domain expressed by $N \times 2.5$ volts $< V_N < N \times 3.5$ volts.

31. The LED security lighting system including at least one LED security light according to claim 29, wherein said at least one LED security light working in conjunction with said mobile device is designed with an on line free setting method for setting at least one operating parameter of said at least one LED security light, comprising:

a user interface APP (software application) comprising at least one free setting algorithm loaded in said mobile device to transform at least one user's setting decision into at least one operating variable;

wherein when said user interface APP is activated and concluded with said at least one user's setting decision, said user interface APP manages to transmit via said mobile device at least one wireless instruction signal carrying at least one message of said at least one operating variable to said at least one LED security light, wherein said at least one operating variable is used for processing or setting said at least one operating parameter of said at least one LED security light.

32. The LED security lighting system including at least one LED security light according to claim 31, wherein said user interface APP is operable on a touch screen panel of said mobile device, wherein said free setting algorithm is a capacity scale simulation process implemented by a visual configuration of a free setting operator incorporated with a capacitor scale simulator and an indicator of said capacity operating rate to facilitate making said at least one user's setting decision in setting at least one desired level of said at least one operating parameter, wherein when said free setting operator is activated by said user to interact with said capacity scale simulator, said user interface APP responsively manages to gradually adjust a value of said capacity operating rate according to an instantaneous state of interaction between said free setting operator and said capacity scale simulator with said indicator of said capacity operating rate simultaneously showing said instantaneous state of said capacity operating rate, wherein said capacity operating rate shown in said indicator can be an operating percentage, an operating chart, an actual operating value of a relevant operating parameter or a selection of an illumination performance mode in an illumination performance switching scheme comprising a plurality of different illumination performance modes, wherein when a free setting motion of said free setting operator is ceased with at least one setting decision, said user interface APP manages to generate said at least one operating variable corresponding to a selection of said at least one capacity operating rate and accordingly operates to transmit said at least one wireless instruction signal carrying said at least one message of said at least one operating variable to said at least one LED security light for setting a relevant operating parameter or selecting said illumination performance mode programmed in said controller.

33. The LED security lighting system including at least one LED security light according to claim 32, wherein said capacity scale simulator is a virtual track, wherein said virtual track is configured with a linear virtual track or an arc virtual track, wherein said free setting algorithm is implemented by operating said free setting operator to interact with said virtual track and said indicator of said capacity operating rate, wherein said free setting operator is slidable by said user's finger along said virtual track with said indicator of said capacity operating rate simultaneously showing said instantaneous state of said capacity operating rate while said sliding motion of said free setting operator is being conducted, wherein said state shown in said indicator of said capacity operating rate can be said operating percentage, said operating chart, said actual operating value of said relevant operating parameter or said selection of said illumination performance mode in said illumination performance switching scheme, wherein a full length of said virtual track represents a simulation of a value of a maximum operating capacity of said at least one operating parameter, wherein said capacity operating rate is determined by a parking location of said free setting operator on said virtual track when said sliding motion stops; wherein said capacity scale simulator is further designed with at least one capacity operating rate switching scheme comprising N different capacity operating rates with each capacity operating rate corresponding to a parking location on said virtual track, wherein N is a positive integer.

34. The LED security lighting system including at least one LED security light according to claim 32, wherein said capacity scale simulator is a capacity operating rate running process of said at least one capacity operating rate switching scheme comprising N different capacity operating rate, wherein N is a positive integer, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein when said virtual button is continuously touched by a user's finger or a touch pen, said free setting algorithm operates to activate said capacity operating rate running process of said at least one capacity operating rate switching scheme to stepwisely increase said capacity operating rate from a minimum level to a maximum level, or to stepwisely decrease said capacity operating rate from said maximum level to said minimum level, or to increase stepwisely from said minimum level to said maximum level and then to decrease stepwisely from said maximum level to said minimum level to complete a full running cycle of said capacity operating rate running process of said at least one capacity operating rate switching scheme; wherein during said capacity operating rate running process said instantaneous state of said capacity operating rate is simultaneously shown in said indicator of said capacity operating rate, wherein said state of said capacity operating rate can be said operating percentage, said operating chart, said operating value or said actual functional performance of said relevant operating parameter, wherein at the moment when said user's finger or said touch pen is removed from said virtual button, said capacity operating rate running process is instantly ceased with said capacity operating rate thereby being locked in at said instantaneous level of said last step of said capacity operating rate running process.

35. The LED security lighting system including at least one LED security light according to claim 32, wherein said capacity scale simulator is a capacity operating rate running process of said at least one capacity operating rate switching scheme comprising N different capacity operating rates, wherein N is a positive integer, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein each time when said virtual button is clicked, said free setting algorithm operates to alternately pick and play a corresponding capacity operating rate according to a sequential order of a clicking motion with an increasing pattern or with a decreasing pattern of said N different capacity operating rates in said at least one capacity operating rate switching scheme, or according to a running cycle performance from a minimum level of said capacity operating rate to increase stepwisely to a maximum level of said capacity operating rate and then from said maximum level of capacity operating rate to decrease stepwisely to said minimum level of capacity operating rate to complete said running cycle performance of said capacity operating rate switching scheme.

36. The LED security lighting system including at least one LED security light according to claim 32, wherein said capacity scale simulator is a virtual keyboard, wherein said virtual keyboard is configured with N virtual keys representing said free setting operator operable and selectable by said user, wherein N is a positive integer, wherein each virtual key is indicated with a corresponding capacity operating rate easily recognizable by said user, wherein when a virtual key is clicked by said user, the corresponding capacity operating rate is determined by said free setting algorithm, wherein when a setting decision is concluded, said user interface APP (software application) manages to generate said at least one operating variable corresponding to a selection of said at least one capacity operating rate in said at least one capacity operating rate switching scheme and accordingly operates to transmit said at least one wireless instruction signal carrying said at least one message of said at least one operating variable to said LED security light for setting said relevant operating parameter.

37. The LED security lighting system including at least one LED security light according to claim 32, wherein the capacity scale simulator is a capacity operating rate running process of said at least one capacity operating rate switching scheme comprising N different capacity operating rate, wherein N is a positive integer, wherein said free setting operator is a touch sensor configured with a sensing zone designed in a neighborhood of said indicator of said capacity operating rate on said touch screen panel of said mobile device, wherein said free setting algorithm is implemented by said touch sensor interacting with said capacity operating rate running process of said at least one capacity operating rate switching scheme and said indicator of said capacity operating rate; wherein when said user touches said sensing zone of said touch sensor to operate a forward slide on said touch screen panel of said mobile device, said free setting algorithm responsively operates to alternately select a next higher capacity operating rate according to a sequence of an increasing pattern of said N capacity operating rates in said at least one capacity operating rate switching scheme, wherein when said user touches said sensing zone of said touch sensor to operate a backward slide on said touch screen of said mobile device, said free setting algorithm responsively operates to alternately select a next lower capacity operating rate according to a sequence of a decreasing pattern of said N capacity operating rates in said at least one capacity operating rate switching scheme.

38. The LED security lighting system including at least one LED security light according to claim 31, wherein said free setting algorithm of said user interface APP comprises a voice recognition software to transform a voice instruction of said user's setting decision into at least one operating variable of said at least one operating parameter of said at least one LED security light and convert said at least one operating variable into said at least one wireless instruction signal for transmitting to said wireless signal receiver of said at least one LED security light.

39. The LED security lighting system including at least one LED security light according to claim 29, wherein said mobile device is a mobile phone, a pad, a PDA, a notebook, a smart watch, a smart speaker or a remote controller, featured with a capacity to download a user interface APP from an Internet or a cloud server for controlling and setting said at least one operating parameter of said at least one LED security light.

40. The LED security lighting system including at least one LED security light according to claim 29, wherein the power source is an AC power source, wherein said at least one semiconductor switching device is a bidirectional semiconductor switching device, wherein said controller outputs a zero-crossing point time delay pulse to control a conduction rate of said bidirectional semiconductor switching device in each half cycle of AC power, wherein said switching circuitry outputs a phase-cut AC power delivered to said light-emitting unit, wherein said light-emitting unit is designed with a capacity to convert said phase-cut AC power into DC power with a corresponding constant current for driving said at least one LED load.

41. The LED security lighting system including at least one LED security light according to claim 40, wherein said light-emitting unit is an LED bulb comprising an LED driver circuitry electrically connected with said at least one LED load, wherein said LED driver circuitry is configured with at least a rectifier and a constant current control circuit to output said DC power with said corresponding constant current for driving the at least one LED load.

42. The LED security lighting system including at least one LED security light according to claim 29, wherein said power source is a DC power source with a constant current, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power source.

43. The LED security lighting system including at least one LED security light according to claim 29, wherein said power source is an AC power source connected with an AC/DC power converter with a constant current control circuit to output a DC power with a constant current to said switching circuitry, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power.

44. The LED security lighting system including at least one LED security light according to claim 29, wherein said at least one operating parameter is a time length timer or a clock time timer.

45. The LED security lighting system including at least one LED security light according to claim 29, wherein said at least one operating parameter is said light intensity of said first level illumination.

46. The LED security lighting system including at least one LED security light according to claim 29, wherein said at least one operating parameter is a detection sensitivity of said motion sensing unit.

47. The LED security lighting system including at least one LED security light according to claim 29, wherein said at least one operating parameter is a color temperature of said first level illumination; wherein said light-emitting unit includes a first LED load emitting light with a first color temperature in a range between 2000K and 3000K and a second LED load emitting light with a second color temperature in a range between 4000K and 6500K, wherein said first LED load and said second LED load are electrically connected and covered by a light diffuser to create an effect of a mingled light color temperature; wherein said switching circuitry includes at least a first semiconductor switching device and a second semiconductor switching device respectively connected to said first LED load and said second LED load, wherein said controller outputs a first control signal to control a first conduction rate of said first semiconductor switching device to deliver a first electric power to said first LED load and a second control signal to control a second conduction rate of said second semiconductor switching device to deliver a second electric power to said second LED load to create said mingled light color temperature;

wherein said controller operates a power allocation algorithm to reversely and complementarily adjust said first conduction rate of said first semiconductor switching device and said second conduction rate of said second semiconductor switching device for tuning said mingled light color temperature of said first level illumination; wherein for tuning said mingled light color temperature to a lower mingled light color temperature said controller operates to increase said first conduction rate of said first semiconductor switching device to increase said first electric power delivered to said first LED load and simultaneously operate to decrease said second conduction rate of said second semiconductor switching device to decrease said second electric power delivered to said second LED load with the same pace such that a total light intensity generated by said light-emitting unit remains unchanged while said mingled light color temperature is accordingly adjusted to said lower mingled light color temperature; wherein for tuning said mingled light color temperature to a higher mingled light color temperature said controller operates to decrease said first conduction rate of said first semiconductor switching device to decrease said first electric power delivered to said first LED load and simultaneously operate to increase said second conduction rate of said second semiconductor switching device to increase said second electric power delivered to said second LED load with the same pace such that said total light intensity generated by said light-emitting unit remain unchanged while said mingled light color temperature is accordingly adjusted to said higher mingled light color temperature;

wherein said controller is designed with at least one mingled light color temperature switching scheme comprising a plurality of different mingled light color temperature performances with each mingled light color temperature performance being operated with a paired combination of said first conduction rate and said second conduction rate controlled by said power allocation algorithm for tuning and switching said mingled light color temperature of said first level illumination, wherein said controller in response to said at least one wireless instructional signal of said at least one operating variable received from said wireless signal receiver operates a pick and play process to select a corresponding mingled light color temperature performance in said at least one color temperature switching scheme.

48. The LED security lighting system including at least one LED security light according to claim 29, wherein said at least one operating parameter is a time length timer of said first predetermined time duration.

49. The LED security lighting system including at least one LED security light according to claim 29, wherein said at least one operating parameter is a time length timer or a clock time timer for converting said at least one LED security light from operating a motion sensing illumination mode to operating a general illumination mode or from operating said general illumination mode to operating said motion sensing illumination mode controlled by said light sensing control unit and said time length timer or said clock time timer.

50. An on line free setting method for setting at least one operating parameter of a lighting device comprising:

using a user interface APP (software application) comprising at least one free setting algorithm loaded in a mobile device to make and transform a user's setting decision into at least one operating variable of at least one operating parameter of said lighting device;

transmitting via said mobile device at least one wireless instruction signal carrying at least one message of said at least one operating variable to said lighting device for processing at least one value of said at least one operating parameter of said lighting device according to said user's setting decision; and using a controller of said lighting device, designed with a capacity to interpret said at least one wireless instruction signal received by a wireless signal receiver of said lighting device and accordingly manages to output at least one control signal to control, select or set the at least one value of said at least one operating parameter of said lighting device;

wherein when said user interface APP is activated and concluded with at least one setting decision, said user interface APP manages to transmit via said mobile device said at least one wireless instruction signal carrying said at least one message of said at least one operating variable to said lighting device, wherein said at least one operating variable is used for processing at least one value of said at least one operating parameter of said lighting device; wherein said at least one value of said at least one operating parameter is stored in a memory of said controller for a repetitive performance, wherein said at least one value of said at least one operating parameter stored is replaceable by processing a new operating variable selected by said user;

wherein said at least one operating parameter is used for controlling at least one of various functional performance settings of said lighting device including at least a timer setting, a light intensity setting, a color temperature setting, a detection sensitivity setting or an illumination performance mode switching and setting among different illumination performance modes;

wherein said user interface APP is operable on a touch screen panel of said mobile device, wherein said free setting algorithm is a capacity scale simulation process implemented by a visual configuration of a free setting operator incorporated with a capacity scale simulator and an indicator of a capacity operating rate to facilitate said user's decision making process in setting a desired level of said at least one operating parameter, wherein when said free setting operator is activated by said user to interact with said capacity scale simulator, said user interface APP responsively manages to determine a value of said capacity operating rate by selection or computation according to an instantaneous state of interaction between said free setting operator and said capacity scale simulator with said indicator of said capacity operating rate simultaneously showing an instantaneous value of said capacity operating rate, wherein said capacity operating rate shown in said indicator can be an operating percentage, an operating chart, an actual operating value of a relevant operating parameter or a selection of said illumination performance mode, wherein when a free setting motion of said free setting operator is ceased, said user interface APP manages to generate said at least one operating variable corresponding to said capacity operating rate being determined and accordingly operates to transmit said at least one wireless instruction signal carrying said at least one message of said at least one operating variable to said lighting device for execution.

51. The on line free setting method for setting at least one operating parameter of a lighting device according to claim 50, wherein said capacity scale simulator is a virtual track, wherein said virtual track can be configured with a linear virtual track or an arc virtual track, wherein said free setting algorithm is implemented by operating said free setting operator to interact with said virtual track and said indicator of said capacity operating rate, wherein said virtual track is designed on a touch screen panel of said mobile device, wherein said free setting operator is slidable by said user's finger or a touch pen along said virtual track with said indicator of said capacity operating rate simultaneously showing said instantaneous value of said capacity operating rate while said sliding motion of said free setting operator is being conducted, wherein said value shown in said indicator of said capacity operating rate can be an operating percentage, an operating chart or an actual operating value of said relevant operating parameter, wherein a full length of said virtual track represents a simulation of a value of a maximum operating capacity of said at least one operating parameter, wherein said capacity operating rate is incrementally changed according to a length of said sliding motion and is determined by a final parking location of said free setting operator on said virtual track when said sliding motion stops.

52. The on line free setting method for setting at least one operating parameter of a lighting device according to claim 51, wherein said at least one operating variable is said capacity operating rate of said at least one operating parameter selected by said user, wherein said virtual track is divided into N sensing compartments aligned from one end of said virtual track thru the other end of said virtual track, wherein each sensing compartment of said N sensing compartments is configured with a touch-sensing capacity designed to execute a different capacity operating rate valued incrementally along a sliding direction of said virtual track whenever said sensing compartment is touched during said sliding motion, wherein when said slide motion is ceased and said free setting operator is parked on a sensing compartment on said virtual track, a voltage signal of said at least one operating variable is generated by said user interface APP representing said user's selection of said capacity operating rate of said at least one operating parameter and simultaneously a selected capacity operating rate is shown in said indicator, said at least one operating variable generated is then transmitted by said mobile device to said lighting device for execution, wherein N is a positive integer.

53. The on line free setting method for setting at least one operating parameter of a lighting device according to claim 52, wherein said controller of said lighting device is designed to operate a pick and play process for processing said at least one operating variable received thru the wireless signal receiver, wherein for each operating parameter a data base comprising N sets of pre-calculated values of said operating parameter respectively corresponding to N different operating variables are stored in a memory accessible to said controller, wherein said controller operates to pick a corresponding value of said at least one operating parameter in said data base according to a value of said at least one operating variable to output at least one control signal to control a switching circuitry to accordingly adjust a functional performance of a lighting characteristic of said lighting device related to said at least one operating parameter.

54. The on line free setting method for setting at least one operating parameter of a lighting device according to claim 51, wherein said at least one operating variable of said at least one operating parameter is said capacity operating rate wirelessly transmitted to said lighting device for computing and setting a relevant operating parameter, wherein said capacity operating rate is determined by measuring a ratio of a length of said parking location on said virtual track from a starting point of said virtual track against a full length of said virtual track, wherein said ratio is further rounded off to the closest integer to become said at least one operating variable for setting said operating parameter selected by said user, wherein said controller of said lighting device is designed with a computing algorithm to convert a value of said at least one operating variable received from said wireless signal receiver into a corresponding value of said at least one operating parameter, wherein said controller outputs at least one control signal to control a switching circuitry to accordingly adjust a functional performance of a lighting characteristic of said lighting device related to said at least one operating parameter according to said value of said at least one operating parameter being produced by said computing algorithm.

55. The on line free setting method for setting at least one operating parameter of a lighting device according to claim 50, wherein said capacity scale simulator is a capacity operating rate running process of said at least one capacity operating rate switching scheme comprising N different capacity operating rates, wherein N is a positive integer, wherein said free setting operator is a virtual button, wherein said free setting algorithm is implemented by said free setting operator interacting with said capacity operating rate running process of said at least one capacity operating rate switching scheme and said indicator of said capacity operating rate, wherein each time when said virtual button is clicked, said free setting algorithm operates to alternately pick and play a corresponding capacity operating rate according to a sequential order of a clicking motion with an increasing pattern or with a decreasing pattern of said N different capacity operating rates in said at least one capacity operating rate switching scheme, or according to a running cycle performance from a minimum level of said capacity operating rate to increase stepwisely to a maximum level of said capacity operating rate and then from said maximum level of said capacity operating rate to decrease stepwisely to said minimum level of said capacity operating rate to complete said running cycle performance of said capacity operating rate switching scheme.

56. The on line free setting method for setting at least one operating parameter of a lighting device according to claim 50, wherein the capacity scale simulator is a capacity operating rate running process of said at least one capacity operating rate switching scheme comprising N different capacity operating rates, wherein N is a positive integer, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein when said virtual button is continuously touched by a user's finger or a touch pen, said free setting algorithm operates to activate said capacity operating rate running process of said at least one capacity operating rate switching scheme to stepwisely increase said capacity operating rate from a minimum level to a maximum level, or to stepwisely decrease said capacity operating rate from said maximum level to said minimum level, or to increase stepwisely from said minimum level to said maximum level and then to decrease stepwisely from said maximum level to said minimum level to complete a full running cycle performance of said at least one capacity operating rate switching scheme; wherein during said capacity operating rate running process said instantaneous state of said capacity operating rate is simultaneously shown in said indicator of said capacity operating rate, wherein said state of said capacity operating rate can be said operating percentage, said operating chart, said operating value or said actual functional performance of said relevant operating parameter, wherein at the moment when said user's finger or said touch pen is removed from said virtual button, said capacity operating rate running process is instantly ceased with sais capacity operating rate thereby being locked in at said instantaneous level of said last step of said capacity operating rate running process.

57. The on line free setting method for setting at least one operating parameter of a lighting device according to claim 50, wherein said capacity scale simulator is a virtual keyboard, wherein said virtual keyboard is configured with N virtual keys representing said free setting operator operable and selectable by said user, wherein N is a positive integer, wherein each virtual key is indicated with a corresponding capacity operating rate easily recognizable by said user, wherein when a virtual key is clicked by said user, said corresponding capacity operating rate is determined by said free setting algorithm, wherein when a setting decision is concluded, said user interface APP (software application) manages to generate said at least one operating variable corresponding to a selection of said at least one capacity operating rate in said at least one capacity operating rate switching scheme and accordingly operates to transmit said at least one wireless instruction signal carrying said at least one message of said at least one operating variable to said LED security light for setting said at least one operating parameter.

58. The on line free setting method for setting at least one operating parameter of a lighting device according to claim 50, wherein said capacity scale simulator is a capacity operating rate running process of said at least one capacity operating rate switching scheme comprising N different capacity operating rates, wherein N is a positive integer and said free setting operator is a touch sensor configured with a sensing zone designed in a neighborhood of said indicator of said capacity operating rate on said touch screen panel of said mobile device to interact with said capacity operating rate running process of said at least one capacity operating rate switching scheme, wherein when said user touches said sensing zone of said touch sensor to operate a forward slide on said touch screen panel of said mobile device, said free setting algorithm responsively operates to alternately select a next higher capacity operating rate according to a sequence of an increasing pattern of said N different capacity operating rates in said at least one capacity operating rate switching scheme, wherein when said user touches said sensing zone of said touch sensor to operate a backward slide on said touch screen panel of said mobile device, said free setting algorithm responsively operates to alternately select a next lower capacity operating rate according to a sequence of a decreasing pattern of said N different capacity operating rates in said at least one capacity operating rate switching scheme.

59. An LED security lighting system including at least one two-level LED security light comprising:
 a light-emitting unit configured with a first LED load and a second LED load;
 a loading and power control unit;
 a light sensing control unit;

a motion sensing unit; and
a power supply unit;
wherein said first LED load is configured with N number of LEDs emitting light with a first color temperature and said second LED load is configured with M number of LEDs emitting light with a second color temperature, wherein N and M are positive integers;
wherein said loading and power control unit includes a controller and a switching circuitry, wherein said switching circuitry includes a first semiconductor switching device and a second semiconductor switching device, wherein said controller is electrically coupled to said light sensing control unit, said motion sensing unit, said first semiconductor switching device and said second semiconductor switching device;
wherein said first semiconductor switching device is electrically connected with a power source of said power supply unit and said first LED load, wherein said second semiconductor switching device is electrically connected with said power source of said power supply unit and said second LED load;
wherein said controller outputs different control signals to respectively control conduction states and cutoff states of said first semiconductor switching device and said second semiconductor switching device to respectively perform at least a first illumination mode and a second illumination mode;
wherein when a nighttime signal is received by said controller defined as an ambient light detected by said light sensing control unit being lower than a first predetermined value, said controller outputs a first control signal to control a first conduction rate of said first semiconductor switching device to generate a first level illumination with said first color temperature for a first predetermined time duration;
wherein when a daytime signal is received by said controller defined as the ambient light detected by said light sensing control unit being higher than a second predetermined value, said loading and power control unit operates to switch off said light-emitting unit;
wherein when a motion signal is detected by said motion sensing unit, said controller operates to output a second control signal to control a conduction rate of said second semiconductor switching device to perform said second illumination mode to generate a second level illumination with said second color temperature for a second predetermined time duration;
wherein said first color temperature is designed with a value in a range between 2000K and 3000K, and said second color temperature is designed with a value between 4000K and 6500K; wherein a light intensity of said first level illumination is designed with a value in a range greater than 0% of a maximum light intensity but less than 50% of the maximum light intensity designed for said light-emitting unit to characterize said first level illumination, wherein a light intensity of said second level illumination is designed with a value in a range greater than 50% of said maximum light intensity but less than or equal to 100% of said maximum light intensity to characterize said second level illumination being higher than said first level illumination;
wherein said N number LEDs of said first LED load and said M number LEDs of said second LED load are respectively designed with a configuration of in series and/or in parallel connections such that when incorporated with a power level setting of a DC power an electric current passing through each LED of said first LED load and each LED of said second LED load remains at a level such that a voltage V across each LED complies with an operating constraint of $V_{th}<V<V_{max}$ featuring electrical characteristics of an LED, wherein V is a variable within a narrow dispersion range characterized by an LED voltage bin selected, where $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage.

60. The LED security lighting system including at least one two-level LED security light according to claim 59, wherein when each of said first LED load and said second LED load is configured with a plurality of LEDs electrically connected in series, or sets of in parallel connected LEDs electrically connected in series, a working voltage imposed on each of said first LED load and said second LED load is confined in a domain between a minimum voltage equal to a sum of said threshold voltages of all LEDs electrically connected in series or sets of in parallel connected LEDs electrically connected in series and a maximum voltage equal to a sum of said maximum operating voltages of all LEDs electrically connected in series or sets of in parallel connected LEDs electrically connected in series.

61. The LED security lighting system including at least one two-level LED security light according to claim 60, wherein when said plurality of LEDs are white light LEDs produced by coating at least one phosphor compound on surfaces of LEDs, said reference value of said threshold voltage Vth is estimated at 2.5 volts and said reference value of said maximum operating voltage Vmax is estimated at 3.5 volts subject to an operating condition that a temperature of each LED is controlled at or below 80 degree centigrade, wherein said voltage V across each LED of said plurality of LEDs complies with an operating constraint of 2.5 volts<V<3.5 volts, wherein said working voltage $V_N$ imposed on said first LED load is required to operate in a domain $N_S \times 2.5$ volts$<V_N<N_S \times 3.5$ volts, and said working voltage $V_M$ imposed on said second LED load is required to operate in a domain $M_S \times 2.5$ volts$<V_M<M_S \times 3.5$ volts, wherein $N_S$ and $M_S$ respectively denoting said numbers of series connected LEDs in said first LED load and said second LED load, wherein $N_S \leq N$ and $M_S \leq M$.

62. The LED security lighting system including at least one two-level LED security light according to claim 59, wherein said LED security lighting system is further configured with at least a second two-level LED security light, wherein each of said first two-level LED security light and said second two-level LED security light is further configured with a wireless remote control device comprising a wireless signal transmitter and a wireless signal receiver; wherein when said controller of one of said first two-level LED security light and said second two-level LED security light first receives said nighttime signal from said light sensing control unit, said controller operates to output said first control signal to control said first conduction rate of said first semiconductor switching device to generate said first level illumination and simultaneously said controller operates to generate a first wireless instruction signal being said nighttime signal thru said wireless signal transmitter to at least one neighboring two-level LED security light to turn on said at least one neighboring two-level LED security light to perform the same first level illumination;
wherein when said controller of one of said first two-level LED security light and said second two-level LED security light first receives said motion signal from said motion sensing unit, said controller operates to output said second control signal to conduct said second semiconductor switching device to generate said second level illumination with said second color temperature for said second predetermined time duration and simultaneously said controller operates to generate a second wireless instruction signal being said motion signal thru said wireless signal transmitter to at least one neighboring two-level LED security light to activate said at least one neighboring two-level LED security light to generate said second level illumination with said second color temperature for said second predetermined time duration;

wherein when said controller of one of said first two-level LED security light and said second two-level LED security light first receives said daytime signal, said controller operates to switch off both said first semiconductor switching device and said second semiconductor switching device to turn off said first two-level LED security light or said second two-level LED security light and at the same time the controller operates to deliver a third wireless instruction signal being the daytime signal to said at least one neighboring two-level LED security light to switch off said at least one neighboring two-level LED security light.

63. The LED security lighting system including at least a first one two-level LED security light according to claim 59, wherein said first predetermined time duration is ended at a time point when said controller receives said daytime signal at dawn.

64. The LED security lighting system including at least one two-level LED security light according to claim 59, wherein said power source is an AC power source, wherein said first semiconductor switching device is a first bidirectional semiconductor switching device and said second semiconductor switching device is a second bidirectional semiconductor switching device, wherein said controller outputs a first zero-crossing point time delay pulse to control a first conduction rate of said first bidirectional semiconductor switching device in each half cycle of AC power to deliver a first phase-cut AC power to said first LED load, wherein said first LED load is designed with a capacity to convert said first phase-cut AC power into DC power with a corresponding constant current for driving LEDs of said N number of LEDs to generate said first level illumination with said first color temperature for said first predetermined time duration, wherein said controller outputs a second zero-crossing point time delay pulse to control a second conduction rate of said second bidirectional semiconductor switching device in each half cycle of AC power to deliver a second phase-cut AC power to said second LED load, wherein second LED load is designed with a capacity to convert said second phase-cut AC power into DC power with a corresponding constant current for driving LEDs of said M number of LEDs to generate said second level illumination with said second color temperature for said second predetermined time duration.

65. The LED security lighting system including at least one two-level LED security light according to claim 59, wherein said power source is a DC power source with a constant current, wherein said first semiconductor switching device is a first unidirectional semiconductor switching device, wherein said second semiconductor switching device is a second unidirectional semiconductor switching device, wherein said controller outputs a first PWM signal (pulse width modulation signal) to control a conduction period $T_{on}$ and a cutoff period $T_{off}$ of said first unidirectional semiconductor switching device in each cycle period for delivering a first average electric current from said DC power source to said first LED load for driving said first LED load to generate said first level illumination with said first color temperature for said first predetermined time duration; wherein said controller outputs a second PWM signal (pulse width modulation signal) to control a conduction period $T_{on}$ and a cutoff period $T_{off}$ of said second unidirectional semiconductor switching device in each cycle period for delivering a second average electric current from said DC power source to said second LED load for driving said second LED load to generate said second level illumination with said second color temperature for said second predetermined time duration.

66. The LED security lighting system including at least one two-level LED security light according to claim 59, wherein said power source is an AC power source connected with an AC/DC power converter with a constant current control circuit to output a DC power with a constant current to said first semiconductor switching device and said second semiconductor switching device, wherein said first semiconductor switching device is a first unidirectional semiconductor switching device, wherein said second semiconductor switching device is a second unidirectional semiconductor switching device, wherein said controller respectively outputs a first PWM signal (pulse width modulation signal) to control a conduction period $T_{on}$ and a cutoff period $T_{off}$ of said first unidirectional semiconductor switching device and a second PWM signal to control a conduction period $T_{on}$ and a cutoff period $T_{off}$ of said second unidirectional semiconductor switching device in each cycle period for respectively delivering different average electric currents from said DC power to said first LED load and said second LED load.

67. An LED security lighting system including at least one LED security light comprising at least:
 a light-emitting unit, including at least one LED load configured with a plurality of LEDs emitting light with at least one color temperature in a color temperature range between 2000K and 6500K;
 a loading and power control unit;
 a light sensing control unit;
 a motion sensing unit;
 an external control unit comprising at least one external control device to output at least one external control signal; and
 a power supply unit;
 wherein said loading and power control unit comprises a controller and a switching circuitry, wherein said controller electrically coupled with said light sensing control unit, said motion sensing unit, said switching circuitry and said at least one external control device, wherein said switching circuitry is electrically connected with a power source of said power supply unit and said light-emitting unit to control and output an electric power to said light-emitting unit wherein said switching circuitry comprises at least one semiconductor switching device, wherein said controller outputs at least one control signal to control at least one conduction rate of said at least one semiconductor switching device to enable said switching circuitry to deliver different electric powers from said power source to said light-emitting unit for generating different illuminations characterized by at least different light intensities according to signals respectively received from said light sensing control unit, said motion sensing unit and said at least one external control device;

wherein at dusk when said light sensing control unit detects a night time signal defined as an ambient light detected by said light sensing control unit being lower than a first predetermined value, said loading and power control unit operates said switching circuitry to deliver an electric power to said light-emitting unit to perform a first illumination mode to generate a first level illumination for a first predetermined time duration, wherein when a motion signal is detected by said motion sensing unit, said loading and power control unit responsively operates said switching circuitry to increase said electric power delivered to said light-emitting unit to perform a second illumination mode to generate a second level illumination for a second predetermined time duration, wherein a light intensity of said second level illumination is higher than a light intensity of said first level illumination, wherein at dawn when said light sensing control unit detects a day time signal defined as said ambient light detected by said light sensing control unit being higher than a second predetermined value, said loading and power control unit respectively operates to switch off said light-emitting unit, wherein said at least one external control device is electrically coupled with said controller to output said at least one external control signal interpretable to said controller, wherein said controller further comprises at least one subroutine for processing said at least one external control signal for setting said at least one operating parameter used for controlling at least one lighting characteristic of said at least one LED security light including at least time length settings, light intensity settings, color temperature settings or detection range settings;

wherein a configuration of said plurality of LEDs of said at least one light-emitting unit is designed with a combination of in series and/or in parallel connections such that when incorporated with a level setting of a DC power for driving said at least one LED load, an electric current passing through each LED of said at least one LED load remains at a level such that a voltage V across each LED complies with an operating constraint of $V_{th}<V<V_{max}$ featuring an electrical characteristic of each LED, wherein $V_{th}$ is a reference value of a threshold voltage required to trigger each LED to emit light and $V_{max}$ is a reference value of a maximum operating voltage across each LED at which at least one LED construction in said plurality of LEDs is vulnerable to a thermal damage;

wherein when said at least one LED load of said light-emitting unit is configured with N pieces of LEDs electrically connected in series or N sets of in parallel connected LEDs electrically connected in series, a working voltage $V_N$ imposed on said at least one LED load for driving said plurality of LEDs is confined in a domain between a minimum voltage equal to a sum of each of said threshold voltages of all LEDs electrically connected in series or sets of in parallel connected LEDs electrically connected in series and a maximum voltage equal to a sum of each of all said maximum operating voltages of all LEDs electrically connected in series or sets of in parallel connected LEDs electrically connected in series, expressed by $N \times V_{th} < V_N < N \times V_{max}$, wherein N is a positive integer.

68. The LED security lighting system including at least one LED security light according to claim 67, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED is controlled at or below 80 degrees centigrade, wherein said voltage V across each LED of said N pieces of LEDs complies with an operating constraint of 2.5 volts<V<3.5 volts and said working voltage $V_N$ imposed on said at least one LED load is thereby confined in a domain expressed by $N \times 2.5$ volts $<V_N<N \times 3.5$ volts.

69. The LED security lighting system including at least one LED security light according to claim 67, wherein said power source is an AC power source, wherein said at least one semiconductor switching device is a bidirectional semiconductor switching device, wherein said controller outputs a zero-crossing point time delay pulse to control a conduction rate of said bidirectional semiconductor switching device in each half cycle of AC power, wherein said switching circuitry outputs a phase-cut AC power delivered to said light-emitting unit, wherein said light-emitting unit is designed with a capacity to convert said phase-cut AC power into a DC power with a corresponding constant current for driving said at least one LED load.

70. The LED security lighting system including at least one LED security light according to claim 69, wherein said light-emitting unit is an LED bulb comprising an LED driver circuitry electrically connected with said at least one LED load, wherein said LED driver circuitry is configured with at least a rectifier and a constant current control circuit to output said DC power with said corresponding constant current.

71. The LED security lighting system including at least one LED security light according to claim 70, wherein said LED bulb is configured with a first LED load emitting light with a first color temperature in a range between 2000K and 3000K and a second LED load emitting light with a second color temperature in a range between 4000K and 6500K respectively connected to said LED driver circuitry, wherein said LED driver circuitry further includes a second controller designed with a capacity to operate a power allocation of said DC power converted from said phase-cut AC power between said first LED load and said second LED load, wherein when a first phase-cut AC power is received when said light-emitting unit is in a cutoff state said LED driver circuitry operates to deliver said DC power to said first LED load to perform said first level illumination with said first color temperature for said first predetermined time duration, wherein when a second phase-cut AC power is received when said light-emitting unit is in a state of performing said first level illumination with said first color temperature, said LED driver circuitry operates to switch said DC power to said second LED load to perform said second level illumination with said second color temperature for said predetermined time duration before switching back to resume said first level illumination with said first color temperature.

72. The LED security lighting system including at least one LED security light according to claim 67, wherein said power source is an AC power source connected with an AC/DC power converter with a constant current control circuit to output a DC power with a constant current to said switching circuitry, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power.

73. The LED security lighting system including at least one LED security light according to claim 67, wherein said power source is a DC power source with a constant current, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power source.

74. The LED security lighting system including at least one LED security light according to claim 67, wherein said at least one operating parameter is a color temperature of said first level illumination or said second level illumination; wherein said light-emitting unit includes a first LED load emitting light with a first color temperature in a range between 2000K and 3000K and a second LED load emitting light with a second color temperature in a range between 4000K and 6500K, wherein said first LED load and said second LED load are electrically connected and covered by a light diffuser to create an effect of a mingled light color temperature; wherein said switching circuitry includes at least a first semiconductor switching device and a second semiconductor switching device respectively connected to said first LED load and said second LED load, wherein said controller outputs a first control signal to control a first conduction rate of said first semiconductor switching device to deliver a first electric power to said first LED load and a second control signal to control a second conduction rate of said second semiconductor switching device to deliver a second electric power to said second LED load to create said mingled light color temperature;

wherein said controller operates a power allocation algorithm to reversely and complementarily adjust said first conduction rate of said first semiconductor switching device and said second conduction rate of said second semiconductor switching device for tuning said mingled light color temperature of said first level illumination or said second level illumination; wherein for tuning said mingled light color temperature to a lower mingled light color temperature said controller operates to increase said first conduction rate of said first semiconductor switching device to increase said first electric power delivered to said first LED load and simultaneously operate to decrease said second conduction rate of said second semiconductor switching device to decrease said second electric power delivered to said second LED load with the same pace such that a total light intensity generated by said light-emitting unit remains unchanged while said mingled light color temperature is accordingly adjusted to said lower mingled light color temperature; wherein for tuning said mingled light color temperature to a higher mingled light color temperature said controller operates to decrease said first conduction rate of said first semiconductor switching device to decrease said first electric power delivered to said first LED load and simultaneously operate to increase said second conduction rate of said second semiconductor switching device to increase said second electric power delivered to said second LED load with the same pace such that said total light intensity generated by said light-emitting unit remains unchanged while said mingled light color temperature is accordingly adjusted to said higher mingled light color temperature;

wherein said controller is designed with at least one mingled light color temperature switching scheme comprising a plurality of different mingled light color temperature performances with each mingled light color temperature performance being operated with a paired combination of said first conduction rate and said second conduction rate controlled by said power allocation algorithm for tuning and switching said mingled light color temperature of said first level illumination or said second level illumination, wherein said controller in response to said at least one external control signal of said at least one external control device operates a pick and play process to select a corresponding mingled light color temperature performance in said at least one mingled light color temperature switching scheme.

75. The LED security lighting system including at least one LED security light according to claim 74, wherein said at least one external control device is a voltage divider configured with a plurality of selection switches operable by a user, wherein when one of said plurality of selection switch is connected, a voltage signal with a value is generated and detected by said microcontroller, wherein said microcontroller operate to activate a corresponding subroutine for setting and operating said at least one operating parameter according to said voltage signal with said value.

76. The LED security lighting system including at least one LED security light according to claim 74, wherein said at least one external control device is a short power interruption signal circuitry generated by operating a main power switch, wherein a power interruption detection circuit is electrically coupled with said controller, wherein when said short power interruption signal is detected by said power interruption detection circuit, said controller operate to alternately perform said corresponding mingled light color temperature performance in said mingled light color temperature switching scheme according to a prearranged sequence.

77. An LED security lighting system including at least one LED security light comprising at least:
   a light-emitting unit, including at least one LED load configured with a plurality of LEDs emitting light with at least one color temperature in a color temperature range between 2000K and 6500K;
   a loading and power control unit;
   a light sensing control unit;
   a motion sensing unit;
   an external control unit comprising at least one external control device to output at least one external control signal; and
   a power supply unit;
   wherein said loading and power control unit comprises a controller and a switching circuitry, wherein said controller is electrically coupled with said light sensing control unit, said motion sensing unit, said switching circuitry and said at least one external control device, wherein said switching circuitry is electrically connected with a power source of said power supply unit and said light-emitting unit to control and output an electric power delivered to said light-emitting unit, wherein said switching circuitry comprises at least one semiconductor switching device, wherein said controller outputs a control signal to control at least one conduction rate of at least one semiconductor switching device for delivering different electric powers from said power source to said light-emitting unit for generating different illuminations characterized by different light intensities according to signals respectively received from said light sensing control unit, said motion sensing unit and said at least one external control device; wherein at dusk when said light sensing control unit detects a nighttime signal defined as an ambient light detected by said light sensing control unit being lower than a first predetermined value, said loading and power control unit responsively operates to activate said motion sensing unit with said at least one LED security light remaining in a turned off state; wherein when a motion signal is detected by said motion sensing unit, said controller responsively operates said switching circuitry to deliver a first electric power to said light-emitting unit to perform a first illumination mode to generate a first level illumination for a first predetermined time duration, wherein a light intensity of said first level illumination is designed in a range being greater than zero but less than or equal to a maximum light intensity designed for said at least one LED security light; wherein at dawn when said light sensing control unit detects a daytime signal defined as said ambient light detected by said light sensing control unit being higher than a second predetermined value, said loading and power control unit respectively operates to switch off said at least one LED security light; wherein said at least one external control device is electrically coupled with said controller to output said at least one external control signal interpretable to said controller, wherein said controller further comprises at least one subroutine for processing said at least one external control signal for setting said at least one operating parameter being at least one lighting characteristic of said at least one LED security light including at least time length settings, light intensity settings, color temperature settings or detection range settings; wherein a configuration of said plurality of LEDs of said light-emitting unit is designed with a combination of in series and/or in parallel connections such that when incorporated with a level setting of a DC power for driving said at least one LED load, an electric current passing through each LED of said at least one LED load remains at a level such that a voltage V across each LED complies with an operating constraint of $V_{th}<V<V_{max}$ featuring an electrical characteristic of each LED, wherein Vth is a reference value of a threshold voltage required to trigger each LED to emit light and $V_{max}$ is a reference value of a maximum operating voltage across each LED at which at least one LED construction in said plurality of LEDs is vulnerable to a thermal damage; wherein when said at least one LED load of said light-emitting unit is configured with N pieces of LEDs electrically connected in series or N sets of in parallel connected LEDs electrically connected in series, a working voltage $V_N$ imposed on said at least one LED load for driving said plurality of LEDs is confined in a domain between a minimum voltage equal to a sum of each of said threshold voltages of all LEDs electrically connected in series or sets of in parallel connected LEDs electrically connected in series and a maximum voltage equal to a sum of each of all said maximum operating voltages of all LEDs electrically connected in series or sets of in parallel connected LEDs electrically connected in series, expressed by $N \times V_{th} < V_N < N \times V_{max}$, wherein N is a positive integer.

78. The LED security lighting system including at least one LED security light according to claim 77, wherein the power source is an AC power source, wherein said at least one first semiconductor switching device is a bidirectional semiconductor switching device, wherein said controller outputs a zero-crossing point time delay pulse to control a conduction rate of said bidirectional semiconductor switching device in each half cycle of AC power, wherein said switching circuitry outputs a phase-cut AC power delivered to said light-emitting unit, wherein said light-emitting unit is designed with a capacity to convert said phase-cut AC power into DC power with a corresponding constant current for driving said at least one LED load.

79. The LED security lighting system including at least one LED security light according to claim 78, wherein said light-emitting unit is an LED bulb comprising an LED driver circuitry electrically connected with said at least one LED load, wherein said LED driver circuitry is configured with at least a rectifier and a constant current control circuit to output said DC power with said corresponding constant current for driving the at least one LED load.

80. The LED security lighting system including at least one LED security light according to claim 77, wherein said power source is an AC power source connected with an AC/DC power converter with a constant current control circuit to output a DC power with a constant current to said switching circuitry, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power.

81. The LED security lighting system including at least one LED security light according to claim 77, wherein said power source is a DC power source with a constant current, wherein said at least one first semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power source.

82. The LED security lighting system including at least one LED security light according to claim 77, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED is controlled at or below 80 degrees centigrade, wherein said voltage V across each LED of said N pieces of LEDs complies with an operating constraint of 2.5 volts<V<3.5 volts and said working voltage $V_N$ imposed on said at least one LED load is thereby confined in a domain expressed by $N \times 2.5$ volts$<V_N<N \times 3.5$ volts.

83. The LED security lighting system including at least one LED security light according to claim 77, wherein said at least one operating parameter is a color temperature of said first level illumination; wherein said light-emitting unit includes a first LED load emitting light with a first color temperature in a range between 2000K and 3000K and a second LED load emitting light with a second color temperature in a range between 4000K and 6500K, wherein said first LED load and said second LED load are electrically connected and covered by a light diffuser to create an effect of a mingled light color temperature; wherein said switching circuitry includes at least a first semiconductor switching device and a second semiconductor switching device respectively connected to said first LED load and said second LED load, wherein said controller outputs a first control signal to control a first conduction rate of said first semiconductor switching device to deliver a first electric power to said first LED load and a second control signal to control a second conduction rate of said second semiconductor switching device to deliver a second electric power to said second LED load to create said mingled light color temperature;

wherein said controller operates a power allocation algorithm to reversely and complementarily adjust said first conduction rate of said first semiconductor switching device and said second conduction rate of said second semiconductor switching device for tuning said mingled light color temperature of said first level illumination; wherein for tuning said mingled light color temperature to a lower mingled light color temperature said controller operates to increase said first conduction rate of said first semiconductor switching device to increase said first electric power delivered to said first LED load and simultaneously operate to decrease said second conduction rate of said second semiconductor switching device to decrease said second electric power delivered to said second LED load with the same pace such that a total light intensity generated by said light-emitting unit remains unchanged while said mingled light color temperature is accordingly adjusted to said lower mingled light color temperature; wherein for tuning said mingled light color temperature to a higher mingled light color temperature said controller operates to decrease said first conduction rate of said first semiconductor switching device to decrease said first electric power delivered to said first LED load and simultaneously operate to increase said second conduction rate of said second semiconductor switching device to increase said second electric power delivered to said second LED load with the same pace such that said total light intensity generated by said light-emitting unit remains unchanged while said mingled light color temperature is accordingly adjusted to said higher mingled light color temperature;

wherein said controller is designed with at least one mingled light color temperature switching scheme comprising a plurality of different mingled light color temperature performances with each mingled light color temperature performance being operated with a paired combination of said first conduction rate and said second conduction rate controlled by said power allocation algorithm for tuning and switching said mingled light color temperature of said first level illumination; wherein said controller in response to said at least one external control signal of said at least one external control device operates a pick and play process to select a corresponding mingled light color temperature performance in said at least one mingled light color temperature switching scheme.

84. The LED security lighting system including at least one LED security light according to claim 83, wherein said at least one external control device is a voltage divider configured with a plurality of selection switches operable by a user, wherein when one of said plurality of selection switch is connected, a voltage signal with a value is generated and detected by said controller, wherein said controller operates to activate a corresponding subroutine for setting and operating said at least one operating parameter according to said voltage signal with said value.

85. The LED security lighting system including at least one LED security light according to claim 83, wherein said at least one external control device is a short power interruption signal circuitry generated by operating a main power switch, wherein a power interruption detection circuit is electrically coupled with said controller, wherein when said short power interruption signal is detected by said power interruption detection circuit, said controller operates to alternately perform said corresponding mingled light color temperature performance in said mingled light color temperature switching scheme according to a prearranged sequence.

86. An LED security light comprising:
a light-emitting unit comprising at least one LED load configured with a plurality of LEDs emitting light with at least one color temperature in a range between 2000K and 6500K;
a loading and power control unit;
a photo sensor;
a power supply unit; and
an external control unit, electrically coupled with said loading and power control unit;
wherein said loading and power control unit comprises a controller and a switching circuitry, wherein said controller is electrically coupled with said photo sensor, said switching circuitry and said external control unit;
wherein said switching circuitry is electrically coupled with a power source of said power supply unit and said light-emitting unit;
wherein said switching circuitry comprises at least one semiconductor switching device;
wherein said controller outputs different PWM signals (pulse width modulation signal) to control at least one conduction rate of said at least one semiconductor switching device such that the light-emitting unit respectively generates different levels of illuminations activated by said photo sensor and said external control unit;
wherein at dusk when a light intensity level of an ambient light detected by said photo sensor is lower than a first predetermined value, said loading and power control unit operates to deliver an average electric current to the light-emitting unit to perform an illumination;
wherein at dawn when the light intensity level of said ambient light detected by said photo sensor is higher than a second predetermined value, said loading and power control unit operates to cutoff said average electric current delivered to said light-emitting unit to switch off said LED security light;
wherein said external control unit is a wireless signal receiver electrically coupled with said controller to receive, decode and convert at least one wireless instruction signal into at least one value of at least one operating variable interpretable to the controller, wherein said controller is programmed with an APP (software application) for interpreting and processing said at least one value of said at least one operating variable for setting at least one operating parameter, wherein said at least one operating variable represents a setting decision by a user for choosing at least one functional performance of said at least one operating parameter of said LED security light including at least a time length setting, a light intensity setting, a color temperature setting, a detection sensitivity setting or an illumination performance mode switching and setting among a plurality of different illumination performance modes;

wherein a configuration of said plurality of LEDs of said light emitting-unit is designed with a combination of in series and/or in parallel connections such that when incorporated with a level setting of a DC power for driving said at least one LED load, an electric current passing through each LED of said at least one LED load remains at a level such that a voltage V across each LED complies with an operating constraint of $V_{th}<V<V_{max}$ featuring an electrical characteristic of each LED, wherein $V_{th}$ is a reference value of a threshold voltage required to trigger each LED to emit light and $V_{max}$ is a reference value of a maximum operating voltage across each LED at which at least one LED construction in said plurality of LEDs is vulnerable to a thermal damage;

wherein when said at least one LED load of said light-emitting unit is configured with N pieces of LEDs electrically connected in series or N sets of in parallel connected LEDs electrically connected in series, a working voltage $V_N$ imposed on said at least one LED load for driving said plurality of LEDs is confined in a domain between a minimum voltage equal to a sum of each of said threshold voltages of all LEDs electrically connected in series or sets of in parallel connected LEDs electrically connected in series and a maximum voltage equal to a sum of each of all said maximum operating voltages of all LEDs electrically connected in series or sets of in parallel connected LEDs electrically connected in series, expressed by $N \times V_{th} < V_N < N \times V_{max}$, wherein N is a positive integer;

wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED is controlled at or below 80 degrees centigrade, wherein said voltage V across each LED of said N pieces of LEDs complies with an operating constraint of 2.5 volts<V<3.5 volts and said working voltage $V_N$ imposed on said at least one LED load is thereby confined in a domain expressed by $N \times 2.5$ volts$<V_N<N \times 3.5$ volts.

87. The LED security light according to claim 86, wherein said power source is an AC power source, wherein said at least one semiconductor switching device is a bidirectional semiconductor switching device, wherein said controller outputs a zero-crossing point time delay pulse to control a conduction rate of said bidirectional semiconductor switching device in each half cycle of AC power, wherein said switching circuitry outputs a phase-cut AC power delivered to said light-emitting unit, wherein said light-emitting unit is designed with a capacity to convert said phase-cut AC power into DC power with a corresponding constant current for driving said at least one LED load.

88. The LED security light according to claim 87, wherein said light-emitting unit is an LED bulb comprising an LED driver circuitry electrically connected with said at least one LED load, wherein said LED driver circuitry is configured with at least a rectifier and a constant current control circuit to output said DC power with said corresponding constant current for driving the at least one LED load.

89. The LED security light according to claim 86, wherein said power source is an AC power source connected with an AC/DC power converter with a constant current control circuit to output a DC power with a constant current to said switching circuitry, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power.

90. The LED security light according to claim 86, wherein said power source is a DC power source with a constant current, wherein said at least one semiconductor switching device is a unidirectional semiconductor switching device, wherein said controller outputs a PWM signal (pulse width modulation signal) to control a conduction period $T_{on}$ and a cutoff period $T_{off}$ of said unidirectional semiconductor switching device in each cycle period for delivering different average electric currents to said at least one LED load from said DC power source.

91. The LED security light according to claim 86, wherein the LED security light is designed with an on line free setting method working in conjunction with a mobile device for setting said at least one operating parameter of said LED security light, comprising:

using a user interface APP (software application) comprising at least one free setting algorithm loaded in a mobile device to transform a user's setting decision into at least one operating variable of said at least one operating parameter of said LED security light;

transmitting via said mobile device at least one wireless instruction signal carrying at least one message of said at least one operating variable to said LED security light according to said user's setting decision; and using a controller of the LED lighting device designed with a capacity to interpret and convert said at least one wireless instruction signal into said at least one operating variable of said at least one operating parameter and accordingly manage to output at least one control signal to control a switching circuitry of said LED security light to control, adjust and/or select a functional performance of said at least one operating parameter;

wherein when said user interface APP is activated and concluded with at least one setting decision, said user interface APP manages to transmit via said mobile device said at least one wireless instruction signal carrying said at least one message of said at least one operating variable to said LED security light, wherein said at least one operating variable is used for controlling, adjusting and/or selecting said functional performance of said at least one operating parameter of said LED security light;

wherein said at least one operating variable of said at least one operating parameter is stored in a memory of said controller for a repetitive performance, wherein said at least one operating variable of said at least one operating parameter stored is replaceable by processing a new operating variable reset by said user;

wherein said user interface APP is operable on a touch screen panel of said mobile device, wherein said free setting algorithm is configured with a capacity scale simulation process implemented by a visual configuration of a free setting operator working in conjunction with a capacity scale simulator and an indicator of a capacity operating rate to facilitate said user's decision making process in setting a desired level of said functional performance of said at least one operating parameter, wherein said free setting algorithm is configured with at least one capacity operating rate switching scheme comprising a plurality of different capacity operating rates, wherein when said free setting operator is activated by said user to interact with said capacity scale simulator, said user interface APP responsively manages to determine a value of said capacity operating rate in said at least one capacity operating rate switching scheme by selection or by computation according to an instantaneous state of an interaction between said free setting operator and said capacity scale simulator with said indicator of said capacity operating rate simultaneously showing an instantaneous value of said capacity operating rate or an illumination performance mode of said at least one operating parameter, wherein said instantaneous value of said capacity operating rate or said illumination performance mode of said at least one operating parameter shown in said indicator can be an operating percentage, an operating chart, an operating value, an actual functional performance or a performance mode selection code of a relevant operating parameter, wherein when a free setting motion of said free setting operator is ceased, said user interface APP manages to generate said at least one operating variable corresponding to said capacity operating rate or said illumination performance mode being determined and accordingly operates to transmit said at least one wireless instruction signal carrying said at least one message of said at least one operating variable to said LED security light for execution;

wherein said capacity scale simulator is implemented by dividing a full operating capacity of said at least one operating parameter into N capacity operating rates ranging from a minimum capacity operating rate greater than 0% of said full operating capacity to a maximum capacity operating rate equal to 100% of said full operating capacity of said at least one operating parameter, wherein said free setting algorithm is configured with said at least one capacity operating rate switching scheme comprising said N capacity operating rates respectively and alternatively activated and selected by said free setting operator, wherein N is a positive integer.

92. The LED security light according to claim 91, wherein said capacity scale simulator is a virtual track, wherein said virtual track can be configured with a linear virtual track or an arc virtual track, wherein said free setting algorithm is implemented by operating said free setting operator to interact with said virtual track and said indicator of said capacity operating rate, wherein said free setting operator is slidable by a user's finger or a touch pen along said virtual track with said indicator of said capacity operating rate simultaneously showing said instantaneous state of said capacity operating rate while a sliding motion of said free setting operator is being conducted, wherein said state shown in said indicator of said capacity operating rate can be said operating percentage, said operating chart, said operating value or a selection of an illumination performance mode of said relevant operating parameter, wherein a full length of said virtual track represents a simulation of a value of said full operating capacity of said at least one operating parameter, wherein said capacity operating rate is incrementally changed according to a length of said sliding motion and is determined by a final parking location of said free setting operator on said virtual track when said sliding motion stops; wherein said capacity scale simulator is further designed with at least one capacity operating rate switching scheme comprising N different capacity operating rates with each capacity operating rate corresponding to a parking location on said virtual track, wherein N is a positive integer.

93. The LED security light according to claim 91, wherein said capacity scale simulator is a capacity operating rate running process of said at least one capacity operating rate switching scheme, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein when said virtual button is continuously touched by a user's finger or a touch pen, said free setting algorithm operates to activate said capacity operating rate running process of said at least one capacity operating rate switching scheme to stepwisely increase said capacity operating rate from a minimum level to a maximum level, or to stepwisely decrease said capacity operating rate from said maximum level to said minimum level, or to increase stepwisely from said minimum level to said maximum level and then to decrease stepwisely from said maximum level to said minimum level to complete a full running cycle of said capacity operating rate running process of said at least one capacity operating rate switching scheme; wherein during said capacity operating rate running process said instantaneous state of said capacity operating rate is simultaneously shown in said indicator of said capacity operating rate, wherein said state of said capacity operating rate can be said operating percentage, said operating chart, said operating value or said actual functional performance of said relevant operating parameter, wherein at the moment when said user's finger or said touch pen is removed from said virtual button, said capacity operating rate running process is instantly ceased with said capacity operating rate thereby being locked in at said instantaneous level of said last step of said capacity operating rate running process.

94. The LED security light according to claim 91, wherein said capacity scale simulator is a capacity operating rate running process of said at least one capacity operating rate switching scheme, wherein said free setting operator is a virtual button, wherein said free setting algorithm is implemented by said virtual button interacting with said capacity operating rate running process and said indicator of said capacity operating rate, wherein said virtual button is designed on said touch screen panel of said mobile device, wherein each time when said virtual button is clicked, said free setting algorithm operates to alternately pick and play a corresponding capacity operating rate according to a sequential order of a clicking motion with an increasing pattern or with a decreasing pattern of said N different capacity operating rates in said at least one capacity operating rate switching scheme, or according to a running cycle performance from a minimum level of said capacity operating rate to increase stepwisely to a maximum level of said capacity operating rate and then from said maximum level of capacity operating rate to decrease stepwisely to said minimum level of capacity operating rate to complete said running cycle performance of said capacity operating rate switching scheme.

95. The LED security light according to claim 91, wherein said capacity scale simulator is a virtual keyboard, wherein said virtual keyboard is configured with N virtual keys representing said free setting operator operable and selectable by said user, wherein each virtual key is indicated with a corresponding capacity operating rate easily recognizable by said user, wherein when a virtual key is clicked by said user, the corresponding capacity operating rate is determined by said free setting algorithm, wherein when a setting decision is concluded, said user interface APP (software application) manages to generate said at least one operating variable corresponding to a selection of said at least one capacity operating rate in said at least one capacity operating rate switching scheme and accordingly operates to transmit said at least one wireless instruction signal carrying said at least one message of said at least one operating variable to said LED security light for setting said at least one operating parameter.

96. The LED security light according to claim 91, wherein the capacity scale simulator is a capacity operating rate running process of said at least one capacity operating rate switching scheme, wherein said free setting operator is a touch sensor configured with a sensing zone designed in a neighborhood of said indicator of said capacity operating rate on said touch screen panel of said mobile device, wherein said free setting algorithm is implemented by said touch sensor interacting with said capacity operating rate running process of said at least one capacity operating rate switching scheme and said indicator of said capacity operating rate; wherein when said user touches said sensing zone of said touch sensor to operate a forward slide on said touch screen panel of said mobile device, said free setting algorithm responsively operates to alternately select a next higher capacity operating rate according to a sequence of an increasing pattern of said N different capacity operating rates in said at least one capacity operating rate switching scheme, wherein when said user touches said sensing zone of said touch sensor to operate a backward slide on said touch screen panel of said mobile device, said free setting algorithm responsively operates to alternately select a next lower capacity operating rate according to a sequence of a decreasing pattern of said N different capacity operating rates in said at least one capacity operating rate switching scheme.

97. The LED security light according to claim 86, wherein said wireless signal receiver is a Wi-Fi wireless signal receiver, a Blue Tooth wireless signal receiver, a Zig Bee wireless signal receiver or a RF wireless signal receiver.

98. The LED security light according to claim 86, wherein said at least one operating parameter is a time length timer or a clock time timer for performing a manual override illumination mode.

99. The LED security light according to claim 86, wherein said at least one operating parameter is a color temperature of said illumination; wherein said light-emitting unit includes a first LED load emitting light with a first color temperature in a range between 2000K and 3000K and a second LED load emitting light with a second color temperature in a range between 4000K and 6500K, wherein said first LED load and said second LED load are electrically connected and covered by a light diffuser to create an effect of a mingled light color temperature; wherein said switching circuitry includes at least a first semiconductor switching device and a second semiconductor switching device respectively connected to said first LED load and said second LED load, wherein said controller outputs a first control signal to control a first conduction rate of said first semiconductor switching device to deliver a first electric power to said first LED load and a second control signal to control a second conduction rate of said second semiconductor switching device to deliver a second electric power to said second LED load to create said mingled light color temperature;
wherein said controller operates a power allocation algorithm to reversely and complementarily adjust said first conduction rate of said first semiconductor switching device and said second conduction rate of said second semiconductor switching device for tuning said mingled light color temperature of said illumination; wherein for tuning said mingled light color temperature to a lower mingled light color temperature said controller operates to increase said first conduction rate of said first semiconductor switching device to increase said first electric power delivered to said first LED load and simultaneously operate to decrease said second conduction rate of said second semiconductor switching device to decrease said second electric power delivered to said second LED load with the same pace such that a total light intensity generated by said light-emitting unit remains unchanged while said mingled light color temperature is accordingly adjusted to said lower mingled light color temperature; wherein for tuning said mingled light color temperature to a higher mingled light color temperature said controller operates to decrease said first conduction rate of said first semiconductor switching device to decrease said first electric power delivered to said first LED load and simultaneously operate to increase said second conduction rate of said second semiconductor switching device to increase said second electric power delivered to said second LED load with the same pace such that said total light intensity generated by said light-emitting unit remain unchanged while said mingled light color temperature is accordingly adjusted to said higher mingled light color temperature;
wherein said controller is designed with at least one mingled light color temperature switching scheme comprising a plurality of different mingled light color temperature performances with each mingled light color temperature performance being operated with a paired combination of said first conduction rate and said second conduction rate controlled by said power allocation algorithm for tuning and switching said mingled light color temperature of said illumination, wherein said controller in response to said at least one wireless instructional signal of said at least one operating variable received from said wireless signal receiver operates a pick and play process to select a corresponding mingled light color temperature performance in said at least one color temperature switching scheme.

100. The LED security light according to claim 86, wherein said mobile device is a mobile phone, a PDA, a notebook, a smart watch, a smart speaker or a remote controller, featured with a capacity to download a user interface APP from an internet or a cloud server for controlling and setting said at least one operating parameter of said LED security light.

101. The LED security light according to claim 86, wherein said free setting algorithm of a user interface APP comprises a voice recognition software to transform a voice instruction of said user's setting decision into said at least one operating variable of said at least one operating parameter of said LED security light and convert said at least one operating variable into said at least one wireless instruction signal for transmitting to said wireless signal receiver of said LED security light.

\* \* \* \* \*